United States Patent
Smith

(10) Patent No.: US 9,114,340 B2
(45) Date of Patent: Aug. 25, 2015

(54) LIQUID REMOVAL APPARATUS WITH MOVING TRANSPORT DECK FOR FILTER BELT

(75) Inventor: Gary Lewis Smith, Thames (NZ)

(73) Assignee: Stevenson Group Limited, Auckland (NZ)

( * ) Notice: Subject to any disclaimer, the term of this patent is extended or adjusted under 35 U.S.C. 154(b) by 950 days.

(21) Appl. No.: 12/936,387

(22) PCT Filed: Apr. 6, 2009

(86) PCT No.: PCT/US2009/039698
§ 371 (c)(1),
(2), (4) Date: Nov. 22, 2010

(87) PCT Pub. No.: WO2009/124323
PCT Pub. Date: Oct. 8, 2009

(65) Prior Publication Data
US 2011/0089122 A1 Apr. 21, 2011

(30) Foreign Application Priority Data
Apr. 5, 2008 (NZ) ........................................ 566710

(51) Int. Cl.
*B01D 33/04* (2006.01)
*B01D 33/056* (2006.01)
*B01D 33/74* (2006.01)

(52) U.S. Cl.
CPC .............. *B01D 33/745* (2013.01); *B01D 33/04* (2013.01); *B01D 2201/204* (2013.01)

(58) Field of Classification Search
CPC .... B01D 33/04; B01D 33/048; B01D 33/056; B01D 33/37; B01D 33/41; B01D 33/466; B01D 33/58; B01D 33/646; B01D 33/705; B01D 33/74; B01D 24/00; B01D 24/30; B01D 24/34; B01D 29/09; B01D 2201/204

USPC ......... 210/137, 400, 401, 406, 248, 391, 398, 210/770, 774, 783
See application file for complete search history.

(56) References Cited

U.S. PATENT DOCUMENTS 3,943,233 A * 3/1976 Swanson et al. ............... 423/332
4,137,169 A * 1/1979 El-Hindi ......................... 210/97
(Continued)

FOREIGN PATENT DOCUMENTS

FR 2787035 A1 * 9/1998 ........... B01D 33/056
FR 2787035 A1 * 6/2000 ........... B01D 33/056

OTHER PUBLICATIONS

EPO Machine Translation of Filtres, FR2787035A1.*
(Continued)

*Primary Examiner* — Lore Jarrett
*Assistant Examiner* — Patrick Orme
(74) *Attorney, Agent, or Firm* — Stephen M. De Klerk

(57) ABSTRACT

A liquid removal apparatus adapted to separate liquid from a composite slurry of liquid and solids. The apparatus includes a movable, permeable membrane having opposing first and second sides. A 'loaded belt portion' of the second side is configured to receive the slurry. A permeable membrane support system is configured to provide movable support for the loaded belt portion and includes a transport deck located in contact with the first side of the permeable membrane below the loaded belt portion. The liquid removal apparatus has a housing with a low-pressure chamber in sealing contact with the first side of the permeable membrane. A pressure conditioning system applies a differential pressure via the housing to generate a lower pressure on the first filter belt side than on the second side. The transport deck is located within the low pressure chamber.

15 Claims, 55 Drawing Sheets

(56) References Cited

U.S. PATENT DOCUMENTS

| | | | |
|---|---|---|---|
| 4,168,236 A * | 9/1979 | Bahr | 210/294 |
| 4,908,136 A * | 3/1990 | Chou et al. | 210/661 |
| 5,171,368 A * | 12/1992 | Mazakas | 118/70 |
| 5,985,159 A * | 11/1999 | Strid et al. | 210/783 |
| 6,622,870 B1 * | 9/2003 | Prinssen | 210/398 |
| 2007/0084862 A1 * | 4/2007 | Jakab et al. | 220/4.01 |

OTHER PUBLICATIONS

FR 2787035 A1, Benacchio, David, USPTO English Translation.*

* cited by examiner

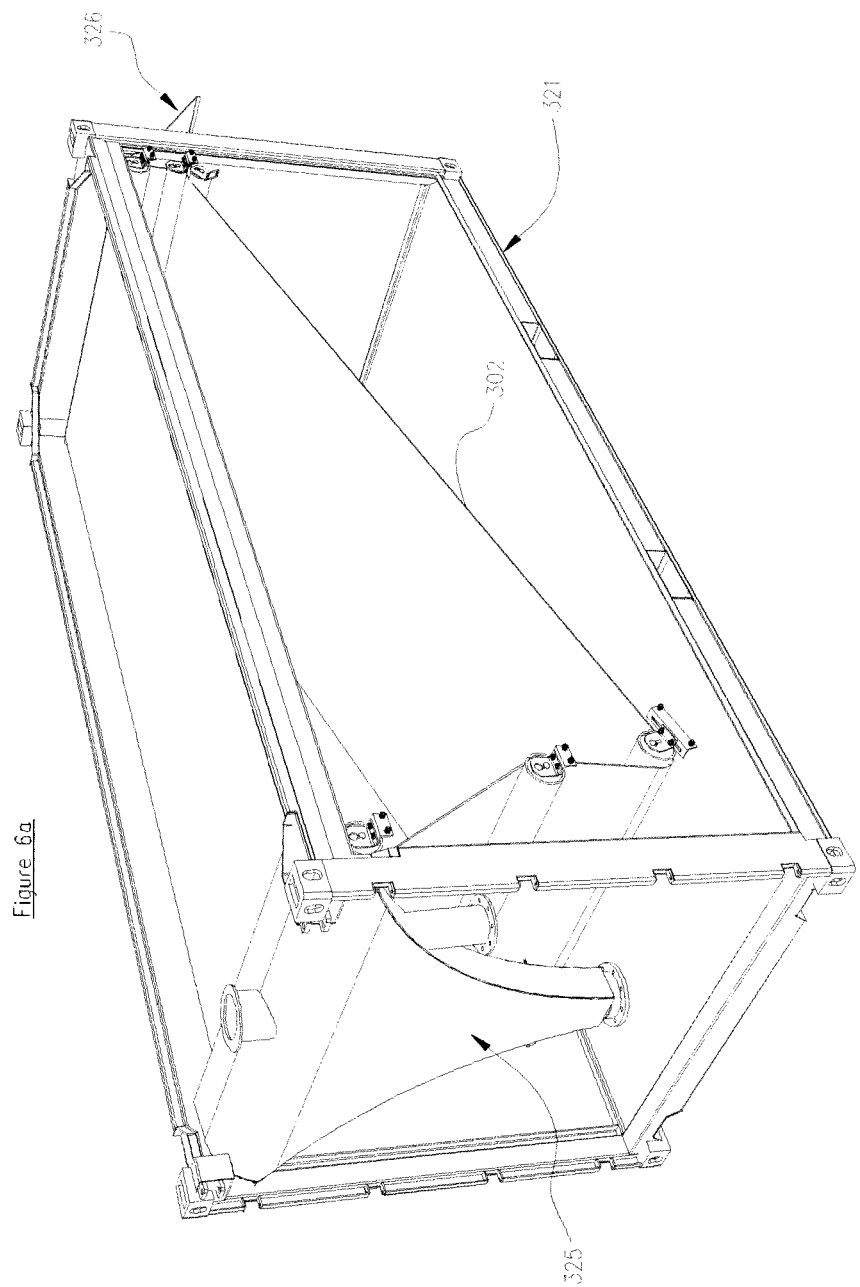

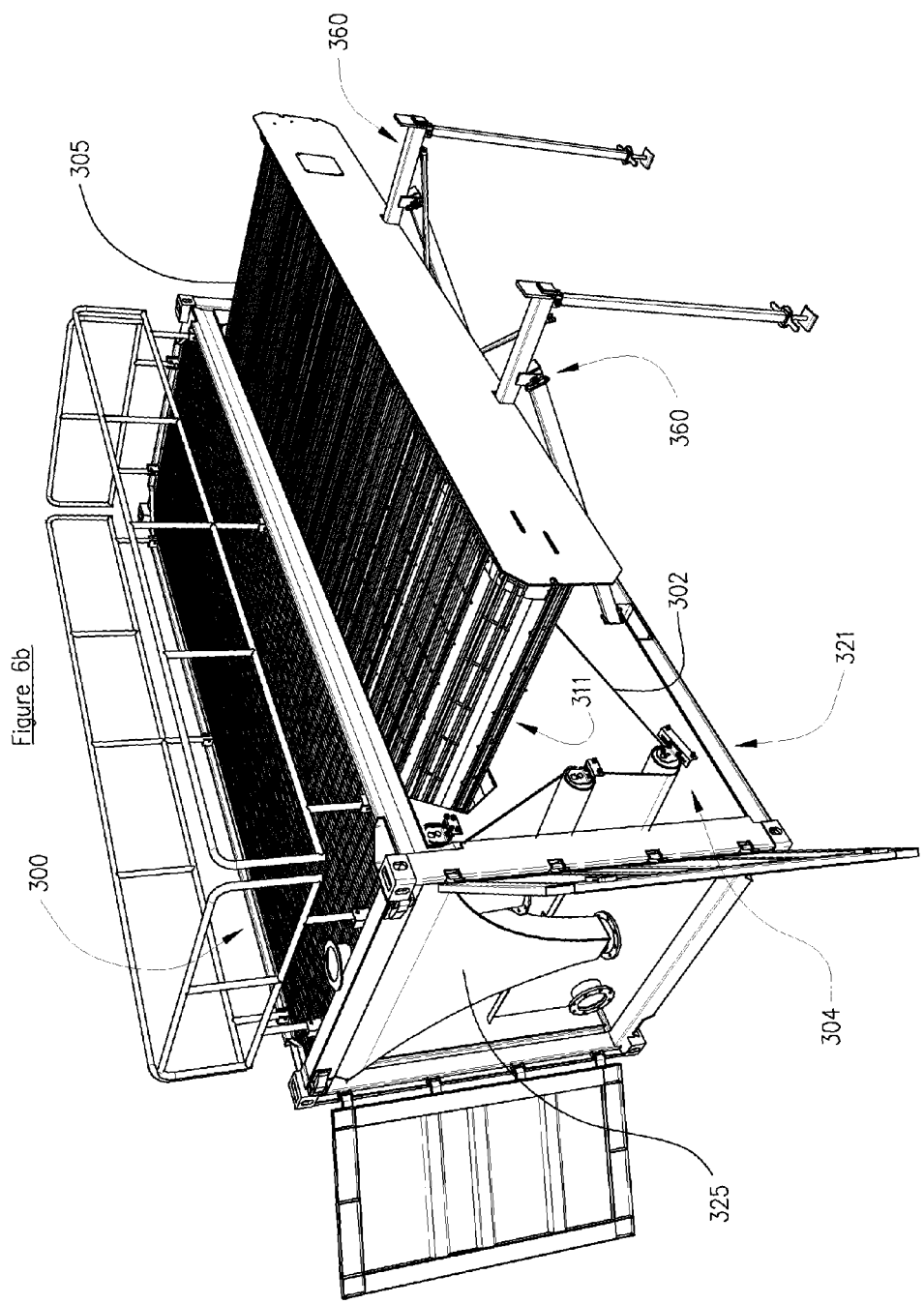

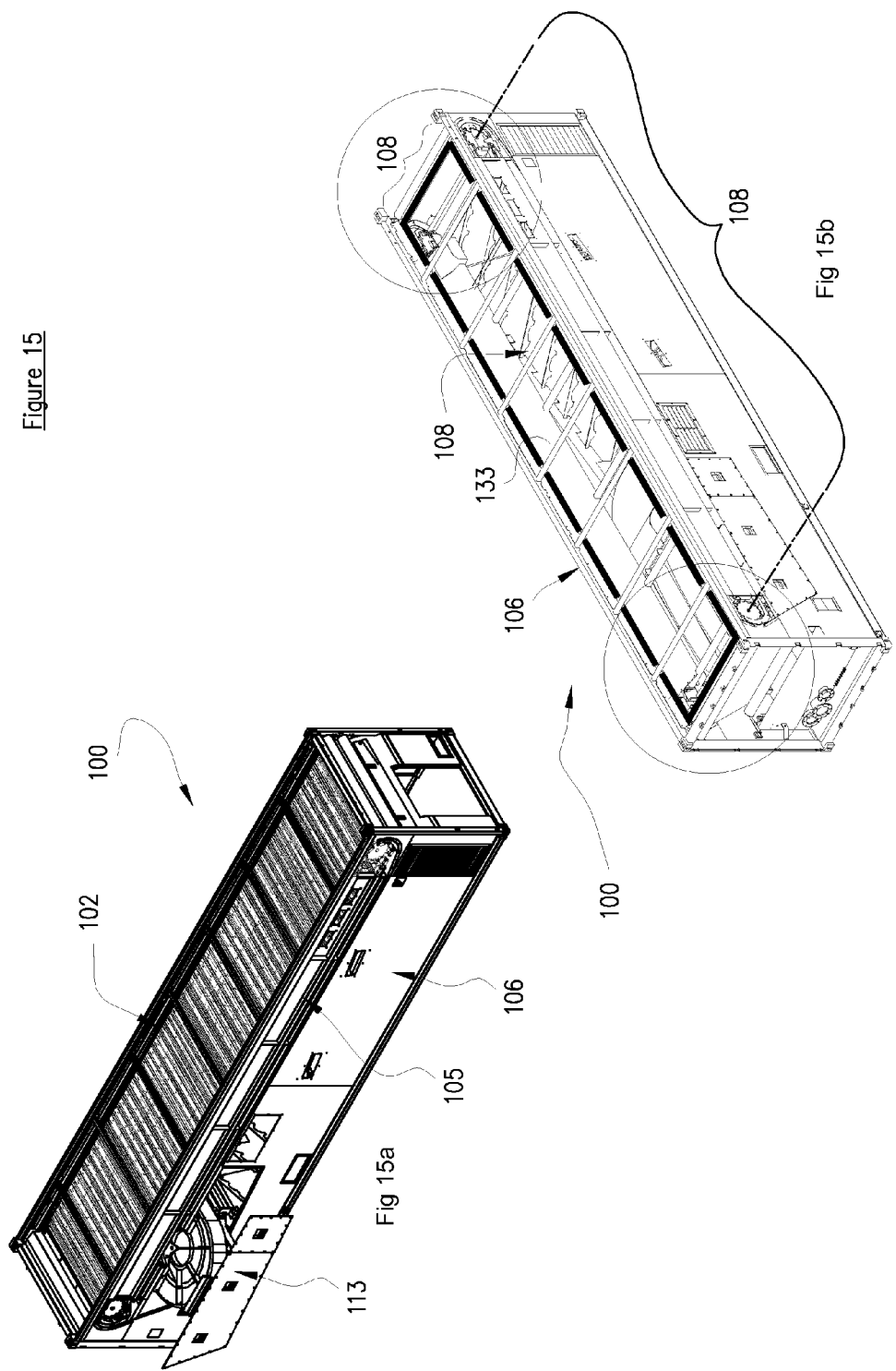

Figure 16
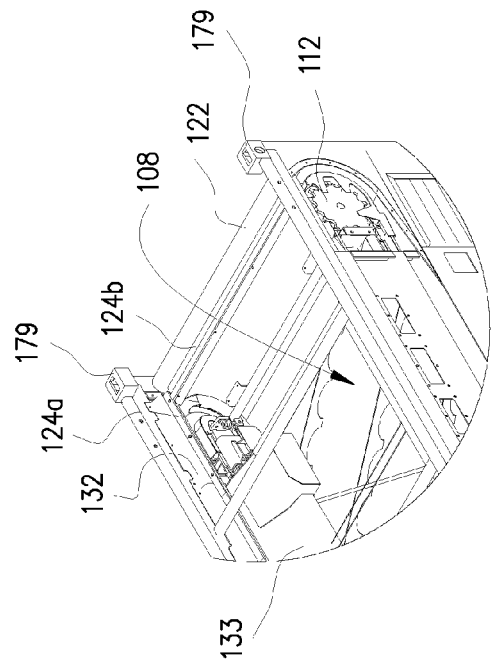
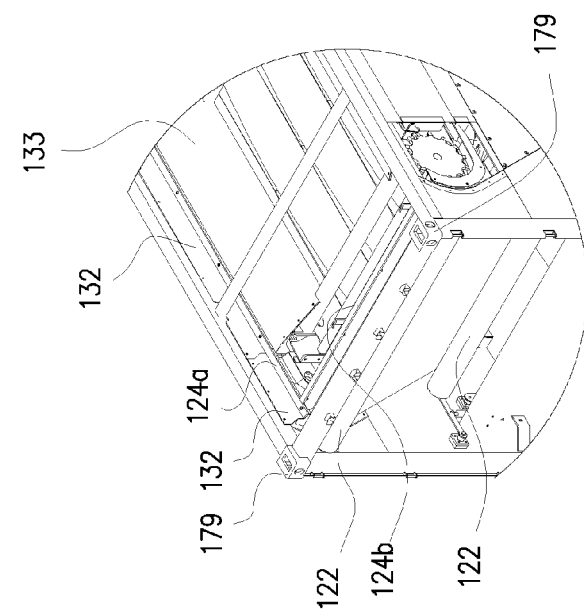

(Section B-B)

(Section A-A)

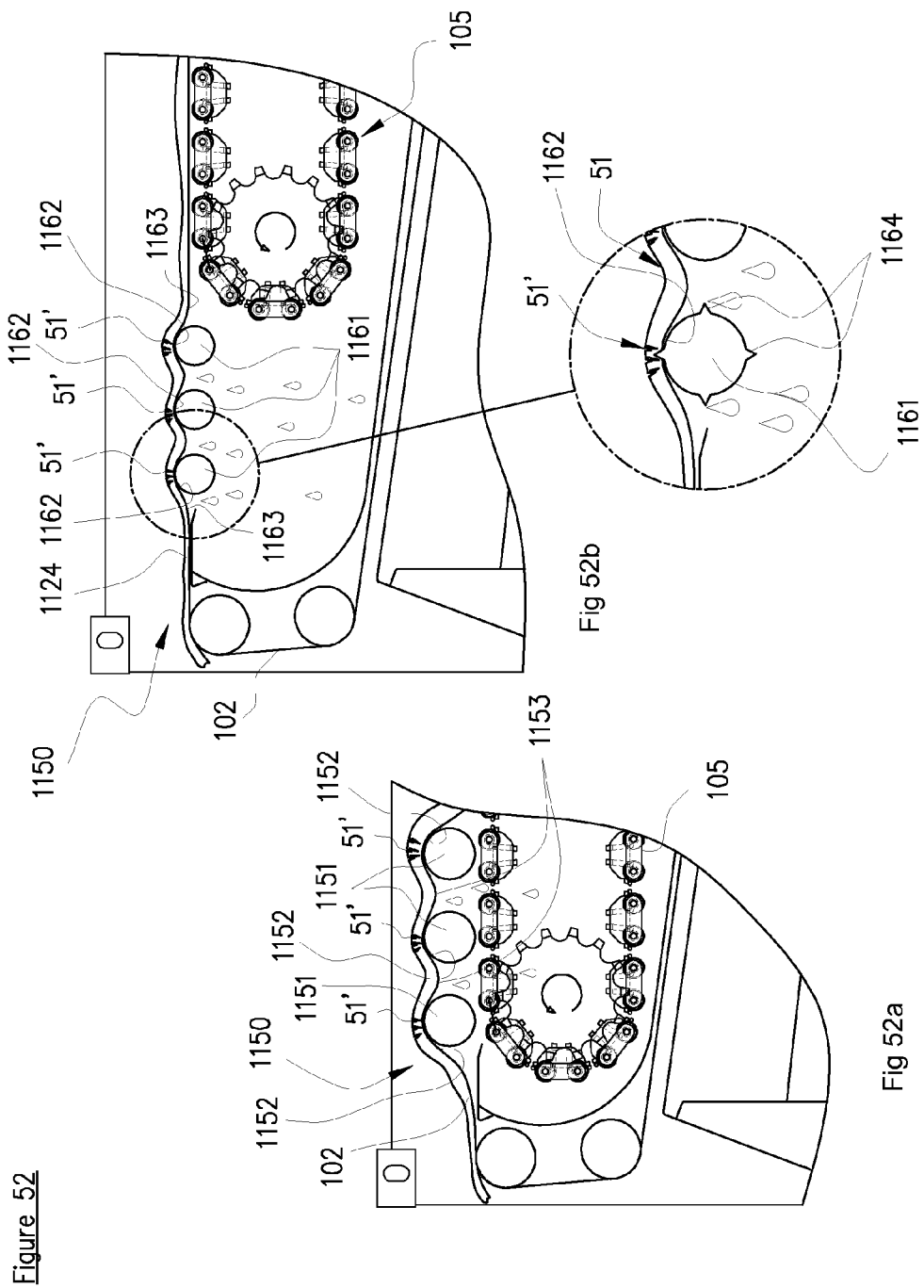

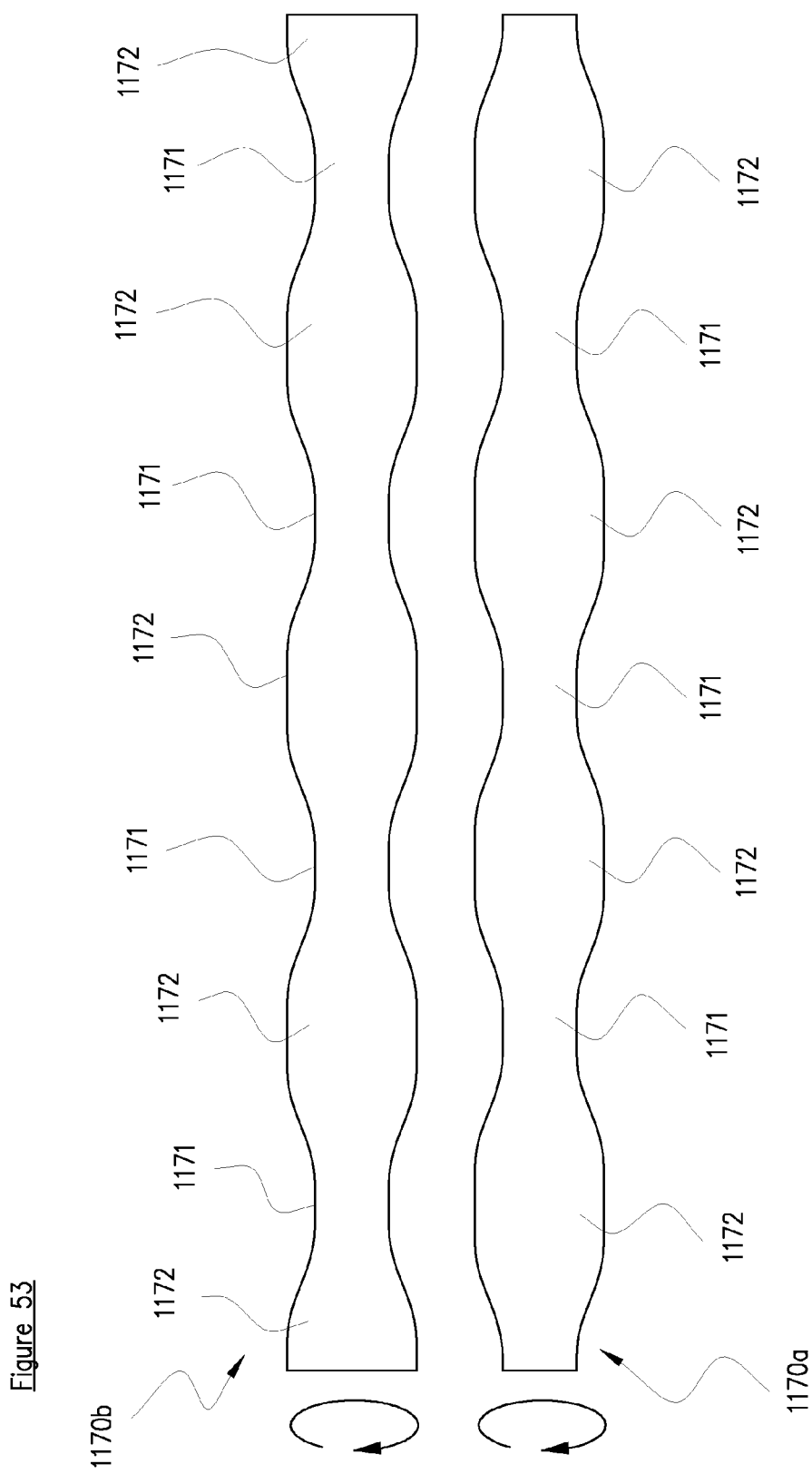

LIQUID REMOVAL APPARATUS WITH MOVING TRANSPORT DECK FOR FILTER BELT

TECHNICAL FIELD

This invention relates to a liquid removal apparatus, and in particular, but not exclusively, to a dewatering apparatus for use in removing a significant proportion of the water from a sludge or slurry composed of liquids and solids.

STATEMENT OF RELATED APPLICATIONS

This application claims priority from the provisional specification filed with respect to New Zealand patent application number 566710 and the content of this document is herein incorporated by reference.

BACKGROUND ART

There are many applications where it is necessary to remove a liquid from a mixture of solids and liquids. The solids are typically suspended in the liquid or, in low liquid concentrations, the liquid may be bound to the solids, e.g. absorbed by the solids.

A common example of these applications is in the recycling of liquid and solids from industrial by-products or waste. Here, the liquid may be used as a transport medium for the solids or used in the processing of a product, e.g. as a coolant/lubricant for machine apparatus. Alternatively, the liquid may be present as part of the product or waste, e.g. water in organic waste.

This waste typically forms as a 'slurry' or 'sludge'. A 'sludge', as referred to herein, has a higher concentration of solids in suspension than a corresponding 'slurry'.

One method of solid-liquid separation is to deposit the mixture in settling ponds where the suspended solids settle into defined layers over time depending on their density relative to the liquid. Sewerage treatment facilities and an ash slurry from a coal-fired boiler installation use such a system.

Prior to processing, the solids from these mixtures, the water content must be significantly reduced, e.g. from around eighty percent by weight to less than twenty percent. The slurry is thus transformed into a lower volume, damp, semi-solid sludge that is easier to handle and lighter to transport, or which can be more easily processed.

There are many existing techniques for removing liquid from a solid-liquid mixture and the following examples are typical of the prior art:
  Evaporation or heat extraction—In this process the mixture is heated to evaporate the liquid from the solids. The evaporated liquid is then condensed and recycled.
  Centrifugal—The mixture can also be placed in a centrifuge chamber with a liquid-permeable filtrate about a periphery thereof. On activation of the centrifuge, the liquid thus passes through the filtrate and the solids can then be removed from the chamber.
  Compression—The mixture may be compacted by being passed between two conveyor belts with a constricting space therebetween, the liquid being forced from the solid.
  Filtration—The mixture may be passed over a filtrate medium or grating that is liquid-permeable so as to allow the liquid to drain from the mixture.

It will be clear that each of the aforementioned methods have attendant advantages and disadvantages in processing different mixture-types, e.g. compression techniques may not be suitable for mixtures with a low solids concentration and a centrifugal method may not be suitable where the solids are sharp and abrasive.

The following description will be focused on filtration methods which prove most useful in a variety of mixture-types.

There are a number of different filtration techniques that can be used, though they generally comprise passing the mixture over one side of a liquid-permeable filtrate membrane and then applying a force to press the mixture against the filtrate to force the liquid therethrough. The force may be applied passively e.g. gravity, and/or actively, e.g. by a vacuum on the opposing side of the filtrate or a compression chamber on the mixture side. The filtrate may also be agitated to encourage liquid separation.

Known types of such vacuum filtrate systems are described in U.S. Pat. Nos. 4,137,169 and 4,880,538 by El Hindi, U.S. Pat. No. 4,154,686 by Ootani et al., U.S. Pat. No. 7,334,688 by Pahl et al. and U.S. Pat. No. 6,622,870 by Prinssen. Similar systems are also described in Canadian Patent No. 991094 by van Oosten and PCT publication No. WO2001/097948 by Marchal. French patent No. 2,787,035 by Benacchio describes another vacuum filtrate system.

The Thissen, Prinssen and Marchal devices are all similar systems that generally comprise a conveyor system onto which the mixture to be filtered is deposited. The conveyor system has two rollers about which an endless supporting belt is located to provide a movable supporting area between the rollers. The belt supports a filter medium which also passes about the rollers. The belt has a number of apertures allowing passage of liquid through the filter medium and below the belt. The belt is also formed with a series of transverse troughs which help guide the mixture toward the apertures situated in the troughs. A vacuum chamber (or "suction box") is placed under the belt between the rollers and forms a pressure gradient through the cloth and belt to suck the liquid from the mixture via the cloth and apertures. The vacuum chamber of Prinssen, Thissen and Marchal systems is configured to reciprocate between the rollers to move with the belt in order to maximise the time of suction in each cycle.

The Thissen and Prinssen devices also use a compression chamber on the opposing side of the cloth to the vacuum in order to provide a greater pressure gradient, or in the Prinssen system, pressurise the entire apparatus to prevent gasification of mixture components.

While such prior art systems may be effective at achieving a high reduction in water content in most applications, there are a number of inherent disadvantages in using such complex systems, as described below.

Belt-based systems such as the Thissen, Prinssen and Marchal systems can prove expensive as the supporting rubber belts used often need replacing as they become stretched or damaged under the large stresses caused by the vacuum and weight of the mixture. Replacing belts can prove costly in terms of materials and operational delay.

Moreover, such systems typically only apply the vacuum via the apertures in the belts, which can be small or narrow, thus potentially not evacuating liquid evenly through the filter medium.

In contrast, the Pahl et al. and El-Hindi systems do not use rubber belts and instead use a chain mesh belt or screen with the filter medium only passing over the upper surface of the screen. Thus, the problem of confined suction and replacing belts is somewhat mitigated.

However, the vacuum chamber is inherently more difficult to seal against the mesh screen of the El-Hindi systems and thus requires a complicated sealing mechanism in order to function properly. Such sealing mechanisms are described in U.S. Pat. No. 4,880,538 by El-Hindi, U.S. Pat. No. 4,147,635 by Crowe and U.S. Pat. No. 7,334,688 by Pahl et al.

It is therefore an object of the present invention to provide a liquid removal apparatus which will at least go some way towards overcoming the above-mentioned problems, or at least provide the public with a useful choice.

It should be appreciated that the discussion of the references herein states what their authors assert, and the applicants reserve the right to challenge the accuracy and pertinence of any cited documents. It will be clearly understood that, although a number of prior art publications are referred to herein; this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Further aspects and advantages of the present invention will become apparent from the ensuing description which is given by way of example only.

DISCLOSURE OF INVENTION

According to one aspect, the present invention provides a liquid removal apparatus adapted to at least partially separate liquid from infeed composite slurry of liquid and solids, the apparatus including:
- a movable, permeable membrane (hereinafter termed a 'filter belt') having a first side and an opposing second side, at least a portion (hereinafter termed the 'loaded belt portion') of said second side configured to receive said slurry;
- a permeable membrane support system configured to provide a movable support for said loaded belt portion, said support system including;
    - at least one transport deck located adjacent or in contact with at least part of said first side of the filter belt below the loaded belt portion;
- a housing configured to allow a pressure differential to be applied between the first and second sides of the filter belt, such that said first side is at a low pressure with respect to the second side; said housing including:
    - at least one low-pressure chamber with a first aperture in sealing contact with said first side of the filter belt below the loaded belt portion
- a pressure conditioning system for applying said differential pressure via the housing to generate a lower pressure on the first filter belt side than the second side;
wherein the or each said transport deck is entirely located within said low pressure chamber.

As used herein, the following terms are defined as:
- a "slurry" includes any mixture containing liquid and solids, including, but not limited to, particles, sediment, fibres, fines, grains, dyes, stains, colouring, ash, pulp, sand, clays, salt, effluent and the like;
- a "permeable membrane-filter belt" is any porous, liquid permeable, material or layer including belts, chains, mesh, flexible sheets, woven materials, felts, and the like etc;
- a "pressure conditioning apparatus" includes any apparatus capable of providing a pressure difference between two sides of a filter belt. It will be apparent to one skilled in the art that this may be achieved by applying a vacuum to said first side via the low pressure chamber, or applying a high pressure (relative to the first side) to said second side or both. It is thus possible that both the first and second side may still maintain a respective pressure differential while both sides are either above, or below atmospheric pressure. It will be equally clear that application of any super-atmospheric pressure to said second side requires said housing to also seal the second side from atmospheric pressure.
- a "low-pressure chamber" includes any chamber, aperture, conduit or assembly capable of maintaining an applied low pressure (with respect to the second side) from the pressure conditioning apparatus. Consequently, the low-pressure chamber includes, but is not restricted to, vacuum chambers and the like.

Thus, according to one aspect of the present invention, the pressure conditioning apparatus further includes a high-pressure chamber, configured to allow an elevated pressure (with respect to the first side of the filter belt) to be applied to the second side of the filter belt, said elevated pressure preferably including super-atmospheric pressures. Preferably, said pressure chamber is in communication with at least part of said second side of filter belt, preferably at least partially in communication with a portion of said second side overlapping said first aperture.

It should be further understood both the terms "low-pressure chamber" and "high-pressure chamber" are intended to encompass individual and collective meanings, covering both an individual or multiple structures, housings, dustings, vessels or the like.

To aid clarity and ease of comprehension, the specification will predominantly refer to the pressure conditioning apparatus being in the form of a vacuum applied to the low pressure chamber in the form of a vacuum chamber on said first side of the filter belt with the second side open to atmospheric pressure. It should be understood however that unless explicitly stated to the contrary, the invention is not restricted to such an embodiment and its use is exemplary only.

Placing at least one transport deck entirely within the low pressure chamber enables a pressure differential to be applied across the whole surface area of the loaded belt portion supported by the transport deck. This creates a significant advantage over the prior art systems which are typically constrained to apply a vacuum to a restricted area of the loaded belt portion. The throughput of the fluid separation apparatus is directly governed by the magnitude of the pressure differential and the surface area to which it is applied. Consequently, maximising the surface area of the loaded belt portion subjected to the pressure differential provides a commensurate improvement in throughput.

However, to realise this potential, the apparatus must withstand the substantial forces generated by even modest pressure differentials over such large surface areas. This is addressed in the present invention by the configuration of the transport deck(s).

Thus, according to one embodiment, the transport deck includes:
- one or more continuous flexible drive members; and
- a plurality of support beams.

Although the support beams make take a variety of forms, it is advantageous for use in a continuous cyclic conveyor arrangement that the beams are arranged substantially transversely to the direction of movement of the filter belt. This enables the plurality of beams to individually transversely span a large first aperture and withstand high loadings, while being collectively articulated to move on an endless rotatable loop by said flexible drive members.

Preferably, said drive members include belts, chains and the like.

Preferably, the transport deck further includes one or more rollers

Preferably one or more of the rollers is a driven roller. According to one aspect of the invention, a flexible continuous member in the form of a pair of endless roller chains constrained in parallel orbits by two or more rollers, with the plurality of transverse support beams attached therebetween, are rotated about said constrained orbit by at least one driven roller provided with a sprocket. The upper-most run of the support beam/chain assembly thus preferably runs in a plane directly across the first aperture in the vacuum chamber.

This core configuration may be adapted to operate with a wide variety of slurry and used in conjunction with additional apparatus/features to accommodate and manipulate the infeed to maximise the liquid extraction.

The various configurations and variations are thus considered according to the following classification:
1. Core functionality and characteristics
   a) Apparatus portability/versatility
   b) Filter belt support and wear characteristics
   c) Gas/liquid/oil separation
   d) Low pressure conditioning apparatus configuration
   e) Vacuum & water mechanical governor valve
   f) Multi stage filtration
2. Slurry manipulation
   a) Infeed conditioning
   b) Apparatus transition
   c) Outfeed management
3. Super-atmospheric pressure differential applications
4. Solids fluid regulator 1a) Core Functionality—Apparatus Portability/Versatility A subtle, but significant consequence of the above core configuration is the ability to package the present invention in a portable configuration. In many existing liquid removal or dewatering applications, the sheer scale of the slurry volumes requiring treatment and the attendant size of the prior art apparatus necessary to accommodate such slurry volumes requires use of an in-situ, fixed apparatus. Consequently, there are clear adverse implications on the flexibility, cost overheads and real-estate resources in comparison to portable apparatuses.

In contrast, by virtue of the highly efficient liquid extraction ratio per unit area of the apparatus footprint, a fully function apparatus may be configured to fit within the dimensions of an international standard ISO shipping container. Such containers are defined by standardised widths and two lengths—either 20' or 40'. Thus, in equivalent metric terms, it is highly desirable to be able to configure a portable industrial apparatus with footprint dimensions of (2.44 m)×(6.058 m or 12.2 m). Achieving sufficient compactability to fit within these dimensions provides a paradigm change in the treatment of liquid extraction applications. Effective de-watering of contamination management may be treated on-site in a rapid and effective manner without need to transport the slurry to a fixed liquid treatment plant. The apparatus may be re-located to the site to match changing environmental considerations and removed when no longer required, thus not incurring the overhead of an idle apparatus.

The primary factors pertaining to the compactability and practicality of a portable embodiment of the present invention are:

the high ratio of filter belt area exposed to a pressure differential per footprint area of the apparatus housing;

placement of the transport decks inside of, and at the top of, the low-pressure chamber, and high tolerance to different infeed slurry compositions.

Thus, according to one aspect, the present invention provides a liquid removal apparatus adapted to at least partially separate liquid from an infeed composite slurry of liquid and solids, as described herein, the apparatus being configured with external dimensions coterminous with, or within international standards for shipping containers. Preferably, the apparatus is provided with standardised ISO shipping container twist-lock fittings at the apices of a substantially cuboid housing apparatus configuration.

As used herein, the apparatus housing footprint is used to denote the area and shape of apparatus in plan view.

1b) Core Functionality—Filter Belt Support and Wear Characteristics

It is particularly advantageous for the filter belt to move at the same rate as the movement of the or each transport deck support beams to minimise the destructive effects of wear and tear on the filter belt. For example, any difference between the velocity of the support beams and the filter belt whilst under vacuum subjects the filter belt to high shear forces causing wear and damage. When a vacuum is applied to the first side of the filter belt, the potential area of the vacuum chamber first aperture in contact with the filter belt is extensive and exposes the filter belt to high loads. Atmospheric pressure forces the slurry on the filter belt onto the underlying support beams and the interleaved spaces between adjacent beams.

In one embodiment, the filter belt is independently driven, preferably in conjunction with the motion of the support beams. Coordinating the velocity of the filter belt drive and the drive roller powering the support beams requires some form of velocity and/or position sensors and control system. However, it has been found the present invention allows such complications to be dispensed with.

Due to the high pressure forcing the filter belt and slurry onto the support beams, the filter belt can moved solely by virtue of being 'clamped' to the support beams by the pressure of the pressure of the pressure differential between the first and second sides of the filter belt. A supplementary drive may be used to initiate movement of the filter belt before a significant pressure differential has been established across the two sides of filter belt.

One of more supplementary layers may be interposed between the filter belt and support beams to provide additional mechanical support or other desired characteristics e.g. a support mesh, coarse filter fabric, strengthening material and/or an electrically charged layer.

1c) Core Functionality—Gas/Liquid/Oil Separation

In use, the liquid slurry infeed is pumped into the liquid removal apparatus via a feed conditioning system manifold and distributed over the second side of the moving filter belt thereby defining said loaded belt portion. As the filter belt rotates about its constrained path, the slurry is continuously moved along the upper surface of the or each transport deck. Although multiple transport decks may be incorporated in said permeable membrane support system, for the sake of readability, the following description refers to usage of a single transport deck unless otherwise specifically indicated. It will be understood however the invention is not limited to same.

Due to the advantageous sealing configuration of the vacuum chamber discussed above, the present invention is configurable with the upper run of the filter belt extending for the predominant proportion of the width and length of the low-pressure chamber portion of said housing. As the slurry is spread across the width of the filter belt and travels along the length of the apparatus, the filter liquid (or filtrate) passes through the filter belt under the effects of gravity and the applied pressure differential across the first and second sides of belt before passing into the lower-pressure chamber for collection/expulsion. The solids in the slurry are retained on the upper surface of the filter belt as a particulate product and transported along the filter belt to a discharge point.

As used herein, when the slurry liquid has been at least partially extracted from the particulate solids, the resultant slurry is also referred to as a 'particulate product' or simply as 'product'. This is not by way of an exacting definition, rather it is indicative that the 'product' is closer in nature to a wet, moist of even relatively dry particulate substance or 'product'. The term product is thus figurative and not intended to imply any specific degree of liquid removal from the slurry.

In preferred embodiments, the filter belt may travel in a continuous endless loop with a substantially planar upper run-portion (providing said loaded belt portion for receiving the slurry) or be formed as a disposable belt wound between two reels. A convenient point for discharging the particulate product after liquid removal is at the end of the planar travel of the filter belt before it loops downwards beneath the low-pressure chamber before re-joining the upper planar upper run. As the filter belt abruptly changes inclination, the particulate product (typically formed into a cake) is ejected onto an inclined conveyor of other suitable receptacle.

As used herein the term particulate product is used to encompass any form of the residual particulate remaining on the filter belt after the slurry undergoes liquid extraction while traversing the loaded belt portion. If sufficient liquid is extracted, the particulate product may form a friable cake with semi-cohesive material properties.

1d) Core Functionality—Fan Positioning/Low Pressure Conditioning Apparatus Configuration/Vacuum Filtrate Liquid Relief Valve In operation, liquid is drawn through the filter belt and filtered solids by application of a differential pressure across the filter belt. In configurations where the relatively lower pressure on the first side of the filter belt is generated by applying a vacuum to the low pressure chamber, it is desirable to avoid contaminating the vacuum supply (typically an extraction fan or vacuum pump) with filtrate liquid. Furthermore, the filtrate itself may be of commercial value and is collected for further use. Consequently, in a preferred embodiment of the present invention, a gas outlet to the vacuum chamber is positioned above a liquid outlet. Preferably, said liquid outlet is positioned at a gravitational drainage low-point in a portion of the vacuum chamber shaped to collect filtrate. According to a further aspect, said liquid outlet is releasably sealed by a pressure relief valve exhausting to atmosphere. Although the relief valve may take several forms, one effective, simple and reliable configuration is a resiliently biased valve member such as a simple spring-biased flap valve.

The above vacuum chamber and relief valve configuration provides an extremely reliable visual indicator of the strength of the differential pressure across the filter belt; in effect acting as a vacuum gauge. The head of filtrate fluid required to open the relief valve is directly proportional to the closure force of the resiliently biased valve member. Thus, the vacuum level in the vacuum chamber may be pre-set by adjusting the closure force to an equivalent value. In use, after the liquid removal apparatus reaches its operational vacuum level, the increased weight of any additional collected filtrate fluid will cause the relief valve to open until the head of fluid falls to a level insufficient to keep the relief valve open and the cycle is repeated.

The gas outlet is preferably formed as a large diameter extraction fan in a shrouded enclosure, shaped to prevent the intake of any liquid falling from the filter deck assembly overhead.

Preferably, said extraction fan shroud is provided with a gas outlet aperture orientated substantially downwards.

1e) Core Functionality—Multi Stage Filtration

The degree of solids removal from the slurry may be enhanced by utilising the filtrate fluid itself as a part of the filtration process. The apparatus housing may include a low-pressure chamber with two or more compartments or partitions, each configured to collect filtrate from a predetermined portion of the loaded belt portion, wherein collected filtrate from at least one compartment is re-circulated to a further predetermined portion of the loaded belt portion. Preferably, at least one said predetermined portion collected from one compartment is re-applied to a predetermined portion of the loaded belt portion corresponding to another compartment.

It will be apparent this technique may be used in a multi-stage configuration whereby successive low-pressure chamber compartments (except the distal compartment from the slurry infeed) recycle a portion of their collected filtrate onto a portion of the loaded belt portion corresponding to the adjacent compartment. Slurry inputs such as wood pulp and types of quarry grain mixtures, particularly other mixtures containing large solids are suited to such a technique. After the initial layer of slurry with large particles is laid over the filter belt, the extracted filtrate will include finer particles and when these are reapplied to the upper surface of the filter belt they provide a correspondingly finer filter. Re-applying the filtrate in a three-stage process have been found to remove virtually all the solids not in solution, e.g. resins dyes, etc. An additive such as PolyEthelyne Oxide PEO may then be introduced in the final re-cycling stage to flocculate with the resin colouring.

Thus, according to a further aspect, the present invention provides a method of at least partially separating liquid from an infeed composite slurry of liquid and solids using a filter membrane and a apparatus for providing a pressure differential across the filter membrane, said method including the steps of:

applying said slurry across the membrane forming a loaded portion;

applying a pressure differential across the filter membrane;

collecting liquid filtrate from a region of the load portion membrane, the liquid being drawn through the slurry by said pressure differential;

re-applying at least a portion of said collected filtrate onto a further region of said loaded portion.

As polymer flocculants additive such as PEO are expensive when used on industrial scales, a further advantage of the present invention is cost-savings achieved by significant reduction in the quantity of fine particles, the quantity of PEO (or the like) required is vastly reduced, even for a simple two-stage re-cycling.

2. Product Manipulation

2a. Infeed Conditioning

In order to obtain optimum liquid extraction from the infeed slurry, it is important to distribute the slurry uniformly across the width of the filter belt and this may be achieved in a variety of means. Moreover, certain slurry compositions are suitable for the pre-filtering of a large percentage of the liquid content which permits uses of further conditioning means.

In one embodiment, the present invention includes a feed conditioning system configured to manipulate the slurry infeed onto said filter belt, said feed conditioning system further including:

an infeed distribution manifold, configured to laterally distribute the infeed slurry across the filter belt.

Preferably, said manifold includes an inlet capable of receiving said slurry and an enlarged outlet positioned adjacent the start of the loaded belt portion and extending laterally across the filter belt, preferably for substantially the whole width of the filter belt. In order to exercise further control over the distribution of the solids within the slurry liquid, the infeed distribution manifold may further incorporate at least one of:

a spreader;
a directional guide;
a gas agitator/aerator and/or
an outflow control.

A spreader both distributes the slurry laterally and agitates the solids within the slurry liquid. In one embodiment, the spreader is an elongated rotatable shaft equipped with outer projections orientated to defect the slurry evenly across the filter belt. Preferably, said projections include tines, bristle, and/or blades, walls or the like. In one embodiment, the spreader is a formed as a pair of auger sections about a common rotating shaft, wherein the helical flanges forming said auger section are reciprocally orientated away from each other from a central shaft position. The helical/spiral configuration also prevents solid debris becoming lodged on the spreader in addition to distributing the slurry laterally. The spreader may be rotated in either direction causing the slurry distribution to be moved inward or outwards from the slurry flow centre as required.

The orientation of the infeed distribution manifold directional guides is preferably adjustable externally from the manifold. They would typically be adjusted at the start of a operating cycle to correct for any lateral offset in the slurry distribution to the filter belt. The gas agitator/aerator may be configured as a series of air stones, piccolo tubes or other means of generating streams of bubbles. As the slurry passes through the bubble streams, the solids are agitated and segregated according to their inertial resistance to the upward force from the rising gas bubbles.

Consequently, in general, the lighter, smaller, more buoyant particles are moved to the upper portion of the slurry flow, with the larger, heavier, less buoyant particles collecting towards the lower portion. This vertical segregation of finer particles above the larger particles creates an enhanced filter structure for liquid extraction than the un-segregated random homogenous mixture. Thus, according to one aspect of the present invention, said infeed distribution manifold vertically segregates slurry particles by size as the slurry passes over streams of bubble generated by the gas agitator/aerator prior to being deposited onto said loaded portion of the filter belt.

Optionally, the manifold may further include a mixing plate for use with slurry composition requiring the use of flocculent additives (e.g. polyacrylamide). It is well known in the art to use a flocculant or coagulant in liquid filtration to agglomerate the particulate into an aggregate that prove easier to separate from the liquid than a disperse particulate in suspension. Though the terms "coagulant" and "flocculant" may refer to agglomeration agents that function differently, for clarity and ease of reference the term "Flocculant" will be used to refer to both flocculants and coagulants.

Well-known flocculants include: alum, aluminium chlorohydrate, aluminium sulphate, calcium oxide, calcium hydroxide, iron(III) chloride, iron(II) sulphate, polyacrylamide, polyDADMAC, sodium aluminate, sodium silicate and PolyEthelyne Oxide (PEO). It will be appreciated that the most effective flocculant used will vary depending on the composition and electrostatic charge of the particulate to be filtered. For filtration of industrial waste and wastewater the most common flocculants used include polyacrylamide, polyDADMAC, PolyEthelyne Oxide (PEO), other polyelectrolytes or combinations of same.

The present invention may thus also make use of a flocculant(s) to improve filtration. Thus, in preferred embodiments a flocculant is added to the mixture before filtration to improve liquid filtration.

Alternative infeed distribution manifolds may be utilised in some feed conditioning systems for slurry composition with high mass/size solids such as sand and the like. In such applications, it is desirable to achieve the necessary degree of lateral dispersion of the slurry to uniformly cover the filter belt before the slurry is subjected to the full effects of the pressure differential restrict any further lateral movement.

Thus, accordingly to one embodiment, the feed conditioning system includes;

1. an infeed distribution manifold provided with a variable nozzle outlet;
2. a dispersion chute, inclined downwards from the manifold outlet nozzle towards the filter belt, and optionally 3. one of more directional guides.

Preferably, said variable nozzle outlet is adjustable for at least one of:

outlet size;
outlet orientation;
outlet slurry dispersion, and/or
outlet cover closure biasing force.

In one embodiment, the above-described feed conditioning system would be implemented in the form of:

an infeed distribution manifold in the form of a conduit with an outlet nozzle equipped with an outlet cover closure biasing force provided by a sealing cover resiliently biased to the closed position; said outlet nozzle located at the apex of, an fan-shaped chute inclined downwards to the filter belt with one or more directional guides located therebetween;

said nozzle outlet capable of being tilted and/or raised/lower to vary the size and shape of the outlet, and consequently, the volume and shape of the slurry outflow.

The nozzle outlet may for example be a simple fan-shaped cover on a substantially upward facing conduit with the nozzle opening being substantially in the plane of the inclined dispersion chute. Thus, varying the opening size and angle between the outlet and the cover shapes the direction taken by the deflected slurry onto the dispersion chute. In an alternative embodiment, the outlet cover may be replaced by the dispersion chute itself with the manifold outlet orientated downwards adjacent the surface of the dispersion.

The direction and quantity of the slurry outflow through the nozzle may thus be regulated by varying the height and inclination of the manifold. The dispersion of the slurry down the chute may be further control and directed by adjustment of the directional guides positioned on the inclined chute surface. Lateral ramps, guides, channels and the like may be used to further direct the slurry flow onto the filter belt.

Certain slurry constituents lend themselves to a pre-filtering treatment in the infeed distribution manifold to remove a large proportion of the liquid content. Slurries such as biological sludge are typically combined with a flocculant additive creating larger, more readily filtered particles. Where the vast majority of such particles are of a similar mass or buoyancy and relatively uniform, the pre-filtering apparatus may be used to remove the pre-filtered liquid. This leaves the remaining 'thickened' product to pass through the manifold outlet and through any other conditioning system elements before deposition onto the filter belt.

According to a preferred embodiment, said feed conditioning system includes an infeed distribution manifold with a pre-filtering chamber, said chamber including:

said distribution manifold slurry inlet and outlet capable of receiving and discharging said slurry;
a liquid extraction outlet;
at least a first and second substantially horizontal strata
a segregation mechanism, configured to constrain said slurry solids to said first horizontal strata within said pre-filtering chamber, wherein said slurry liquid located in said second horizontal strata is removed via the extraction outlet.

In one embodiment, the segregation mechanism includes:
a plurality of aerators, positioned beneath the slurry flow to subject the slurry to a substantially continuous stream of gas bubbles, thereby biasing said solids to an upper first horizontal strata;
a gas-permeable membrane interposed between said first strata and a second lower strata, and
a liquid extraction outlet, positioned below said gas-permeable membrane.

The gas-permeable membrane may take any suitable form including synthetic, woven, perforated or mechanical barriers, e.g. metallic wedge-wire. In use, as the flocculated slurry flows into the pre-filtering chamber and is subjected to the effects of the rising gas bubbles as the slurry flows towards the outlet. In one embodiment, the pre-filtering chamber is divided into a lifting portion and an extraction chamber. The lifting portion is configured to be of sufficient length to allow the rising bubbles to lift the solids to the upper first strata above the height of the gas-permeable membrane. The remaining slurry liquid is substantially clean liquid is removed from the extraction outlet, leaving the remaining slurry with a substantially higher solids content. The liquid removal apparatus thus receives a slurry product with a significantly lower liquid content, enhancing the product control that may be exercised during the further liquid extraction stages.

In an alternative embodiment, the segregation mechanism includes:
a flocculant additive mixed with the slurry;
a suspended liquid-permeable, solids barrier interposed between said first strata and a second lower strata, and
at least one baffle within said pre-filtering chamber, positioned to impede and attenuate said slurry flow and also flocculation between said flocculant additive and the slurry solids;
a pre-filtering chamber configuration providing a variable surface area for said suspended solid barrier as the slurry flow varies, and
a liquid extraction outlet, positioned above said liquid-permeable barrier.

Preferably, said solids barrier is formed as a 'blanket' layer of flocculant additive material, preventing passage of the slurry solids flocculated to the flocculant additive. Preferably said pre-filtering chamber configuration includes a portion with a variable horizontal cross-sectional area (i.e. an at least partially tapered, inclined or conical portion, herein referred to as the 'expansion' section), such that as slurry flow rates vary, the suspended solids barrier moves up or down said expansion section with a corresponding variation in the surface area occupied by the barrier. The liquid extraction outlet is preferably configured to collect settled clear liquid overflowing from said upper strata of the pre-filtering chamber.

Thus, a key operational characteristic is the interaction between the inflow and outflow to and from the pre-filtering chamber, which in this embodiment also corresponds to the manifold inlet/outlet flows respectively. Once the apparatus is initiated and slurry flows into the chamber, the flocculant additive binds with the slurry solids and the heavier flocked solids settle to the chamber floor and pass out of the manifold chamber outlet. The more turbulent part of the slurry flow impinges on said baffle(s) and a blanket layer of coagulated flocked solids forms at a level defined by the competing forces of the slurry flow up-thrust and the buoyancy of the layer against the effects of gravity. Clear liquid is able to pass freely through the barrier layer until it reaches the extraction outlet.

The slurry flow through the pre-filtering chamber may be adjusted to maintain a dynamic equilibrium, in which a manageable rate of slurry output from the manifold (with a high settled-solids content) is maintained in balance by the flow rate of liquid through the solids barrier and the corresponding height of the barrier within the expansion section. Preferably, said fluid extraction outlet includes a flow control valve, capable of regulating liquid flow from the pre-filtering chamber.

Related designs are known as either "sludge blanket" or "solids-contact" clarifiers though these operate typically as stand-alone device and not as dynamic component in a slurry flow control/pre-filtering of a liquid extraction apparatus.

It can be thus seen that the two examples of pre-filtering chamber segregation mechanisms are each suited for use with differing types of slurry solids, depending on their relative buoyancy/mass. Thus, according to a further aspect, the present invention provides a method for selecting a segregation mechanism for a pre-filtering chamber according to the step of;

determining the relative buoyancy of the slurry particles after flocculation;
determining if majority of said flocculated particles are capable of being maintained in an elevated strata by rising gas bubbles;
if determination is yes, selecting the former segregation mechanism described above;
if determination is no, selecting the latter segregation mechanism described above.

In applications with low slurry infeed flow rates or where the slurry infeed can is suitable for pre-extracting large proportion of the liquid before the remaining flow passes through the apparatus (as described above), a number of addition features may be combined with the above described infeed distribution manifold. Thus, according to a further embodiment, the infeed distribution manifold may be used in combination with one or more of:

a surface wiper, positioned adjacent the distribution manifold outlet, configured to apply an at least partially compressive, frictional force onto an upper surface of slurry solids exiting the manifold outlet;
a rigid cake former, positioned adjacent the distribution manifold outlet and configured to at least partially compress and extrude slurry solids exiting the manifold outlet into a particulate product cake;
a vacuum former;
an attenuated atmospheric pressure slurry former;
flow rate control, configured to controllably attenuate the flow of slurry onto the filter belt from the manifold The surface wiper is formed as a substantially inclined sheet or member producing an elongated tapering slot between the lower wiper surface and the upper filter belt surface (said second side). Consequently, the surface wiper applies a slight compressive force onto the upper surface of the slurry/particulate-product exiting the manifold, forcing some liquid through the slurry solids. The wiper also applies a frictional, abrasive force to the upper surface of the product, causing the upper layer of particles to shear from their adjacent lower layer and generating small cracks and fissure in the upper product surface. These surface cracks provide air and liquid channels through the product and prevent the upper surface forming an effectively impenetrable layer.

Preferably, the surface wiper may be formed from a flexible or semi flexible material such as an elastomer sheet. Although a rigid wiper construction would be possible, a flexible sheet such as rubber has been found to be particularly effective.

The rigid cake former receives slurry product which has been at least partially thickened, compressed or de-watered by an earlier process performed by the manifold. The product passing through the former is shaped and compressed into a desired cross-sectional profile which may include ridges, or grooves to define the eventual fracturing behaviour of the product exiting the apparatus. Where both are present, the former is placed between the flow-rate control and the surface wiper.

The vacuum former utilises a sealed enclosure to apply a localised vacuum to the upper surface of the slurry on the filter belt exiting the manifold nozzle outlet, said surface being constrained by a liquid permeable barrier. The localised vacuum pulls further liquid from the surface of the product. As the localised vacuum and the low-pressure chamber force are in opposition, the effects on the product are less intense and allow the product cake to form a more stable structure.

In another aspect, an attenuated atmospheric pressure slurry former may be provided that is capable of controlling said pressure differential across a localised portion of said loaded belt portion. Preferably, said slurry former includes a chamber including a gas permeable membrane locatable in contact with slurry on said permeable membrane second side, the chamber further including an adjustable-size opening. Preferably, said opening includes a valve biased towards an occluding configuration preventing gas passing into opening, the valve configured to at least partially open when the pressure differential exceeds a predetermined level. Thus, the valve will open to allow some gas into chamber and thus provide a pressure differential that varies with the bias of the valve.

The flow rate control is primarily used in conjunction with other flow control means (detailed below) implemented by the manifold to maintain the slurry flow rate within the fluid extraction capacity of the machine. Essentially the flow control acts as a valve or throttle, regulating the flow of slurry onto the filter belt and may in its simplest form consist of a rigid beam extending laterally across the width of the apparatus. A variable force is applied vertically to the beam applying pressure to a movable portion of the manifold outlet to vary the outlet constriction. Preferably, the movable manifold nozzle portion is formed from a flexible elastomeric material and/or hinged to a rigid manifold portion.

It can this be seen that the present invention thus provides a variety of means to manage the transition of a turbulent, un-processed flow of slurry (typically from an elongated, comparatively narrow conduit such as a pipe) into a flow distributed homogenously across the width of the filter belt. Furthermore, in any application where high pressure differentials are used across a filter belt type medium, there is a need to manage the effects of the pressure differential on the initial portions of the slurry exposed to the pressure effects. It will also be appreciated that such slurry product management of may be applied to a wide variety of vacuum filter applications, flat-bed-filters and the like.

A germane factor common to the various means of slurry control onto the filter belt is minimising contamination of the filtrate by the smallest solid particles under initial the effects of a pressure differential. Thus, according to one embodiment, the present invention provides a slurry management system for use with liquid removal apparatus substantially as herein described, utilising one or more of the above-described feed conditioning system elements.

2 b) Slurry Manipulation—Apparatus Transition

As noted above, a pervasive problem in effective fluid extraction through a bed of slurry solids on the filter belt is the creation of a substantially impassable slurry upper surface. A graduated filter bed layering of increasing sized solid particles provides effective filtering and avoids finer solid particles passing through the product and filter belt. However, an upper surface composed predominately of the finest solids can present an effectively impassable barrier to slurry liquid to easily penetrate. Thus, is desirable to provide means to provide localised imperfections, cracks, fissures, gaps, channels or the like in the product surface, preferably extending at least partially through the depth of the slurry solids.

According to one aspect, the present invention provides a method of liquid separation from a composite slurry of liquid and solids using liquid removal apparatus including:
  a movable, permeable membrane having an opposing first side and a second side, at least a portion of said second side configured to receive said slurry;
  a housing configured to allow a pressure differential to be applied between the first and second sides of the filter belt, such that said first side is at a low pressure with respect to the second side; said housing including:
    at least one low-pressure chamber with a first aperture in sealing contact with said first side of the movable filter belt below the loaded belt portion
  a pressure conditioning system for applying said differential pressure via the housing to generate a lower pressure on the first filter belt side than the second side;
wherein said method includes the steps of:
  moving the permeable membrane over said first aperture at a first velocity;
  applying said slurry to the first side of the filter membrane;
  applying a pressure differential between the first and second sides of the filter belt;
characterised in that said first velocity of the moving membrane is cyclically pulsed to apply a variable impetus to the slurry on the filter membrane.

As used herein, the terms "cyclically pulsed" encompasses any synchronous or asynchronous velocity fluctuations, jerks, fluctuations, stopping and starting, agitations, direction reversals, vibrations or any other means of applying a variable impetus to the slurry.

Applying the variable impetus causes the slurry product to sway or shake. The slurry product closest to the filter belt has the least inertia to the cyclic impetus pulse. Consequently, the changes in velocity cause the uppermost levels of the product to undergo greater momentum changes leading to the creation of surface cracks and then like. This provides access channels for the slurry liquid to be forced through the product by the pressure differential.

It will be appreciated this technique may be applied to any flat bed filter vacuum filters or any other comparable filtration/liquid separation using a moving filter belt and a pressure differential.

In an alternative application, the said variable impetus is provided by mechanical agitation or vibration of filter belt in the plane orthogonal to said permeable membrane movement. This may take the form of a vibrating platform under the filter membrane operated by an actuator or a rotating eccentrically crank or the like.

The present invention also provides an additional number of slurry product management mechanisms applicable during the transit of the slurry across the loaded belt portion. It will be appreciated that liquid separation apparatus such as the present invention have operating tolerances for slurry flow rates that are i) high enough to processed with any detrimental effects on the filtrate quality or ii) too low to achieve effective functioning of the liquid extract techniques and provide a cost-effective commercial returns on operating the apparatus. The present invention thus provides a simple, yet effective means of adjusting the effective flow rate of the slurry though the entire path through the apparatus.

Accordingly to a preferred embodiment, the present invention further provides at least one elevator mechanism, capable of raising and lowering a distal end of the apparatus. Raising or lowering either distal end (i.e., the infeed or outfeed apparatus end) causes the slurry flow to increase or decrease. In an alternative embodiment, both distal ends of the apparatus may selectively raised, thus omitting the need to build the apparatus on a excessively raised platform to permit a single elevator mechanism at one end to raise or lower that end above or below the horizontal. Typically, an elevator mechanism would consist of a hydraulic drives fitted to the lower corners of the apparatus.

A further means of managing the slurry liquid separation utilises one or more vacuum felt rollers. As previously discussed, certain slurry constituents require treatment with flocculants to create solids which sufficiently sized to be separable from the liquid using physical techniques. Polymer flocculant posses an electrical charge which attracts them to the slurry solids causing them to bind, or 'flocculate'. The felt vacuum roller may make use of this property by combining a highly absorbent material (e.g. wool) with a hard-wearing synthetic guard material with a repulsive electrical charge to the flocculant. As a result, the rollers may be used to absorb liquid, whilst repelling the solids. It will be appreciated alternative construction may be utilised with similar resultant properties, e.g., a homogenous material which is both liquid absorbent and solids/flocculant repulsive.

In a preferred embodiment, the present invention provides a cylindrical roller with an inner vacuum chamber, and a rotatable outer surface provided with a liquid-absorbent material sleeve, said inner vacuum chamber being in communication with at least a portion of said absorbent sleeve. Preferable, aid outer surface is perforated and said communication means is provided by a longitudinal conduit extending from the inner chamber to said rotatable outer surface. In one embodiment, the conduit is fixed in a position substantially confronting a contact point of said absorbent material with slurry on a filter belt. As the filter belt is moved by the transport deck, a roller placed in a light friction contact with the upper slurry surface is rotated solely by the frictional contact with the slurry.

The felt material is slightly compressed by the initial contact with slurry, while also receiving ingress of liquid drawn from the slurry by the vacuum in the roller. As the roller passes forward, the compressed portion of the felt material expand and sponges further liquid from the slurry. Furthermore, the slightly compressive nature of the roller presses some liquid through the filter belt from the slurry in contact adjacent the filter belt.

The vacuum rollers have been found to operate at an optimum level with slurries within a certain range of liquid content. Thus, the rollers may be positioned at a distance along the loaded portion of the filter belt matching the desired slurry liquid composition. Optionally, the rollers may be used in pairs above the filter belt. A pair of contra-rotating rollers may be used to capture and treat the product outfeed, with the roller still being connected to the apparatus vacuum supply.

It has been found in practice that initial liquid removal performance of the rollers is improved by pre-soaking with liquid. It will be apparent to one skilled in the art such rollers may be applied to other liquid removal apparatus, such as belts presses and the like.

According to another aspect, the liquid removal apparatus may include:
at least two said low-pressure chambers with respective first apertures in sealing contact with said first side of the filter belt below the loaded belt portion, and
at least one pressure conditioning system for applying said differential pressure via the housing to generate a lower pressure on the first filter belt side than the second side
wherein the or each transport deck is entirely located within a said low pressure chamber.

According to one aspect of the present invention, the liquid removal apparatus may include at least two said transport decks, each in contact with at least part of said first side of the filter belt below the loaded belt portion.

Preferably, the liquid removal apparatus includes a first said transport deck and a second said transport deck, the first and second transport decks respectively entirely located within a first said low pressure chamber and a second said low pressure chamber.

Preferably, said first and second low pressure chambers have a first and second pressure conditioning system respectively. Preferably, said first and/or second pressure conditioning system is configured to:
evacuate gas from said first and/or said second low pressure chamber respectively, and
pass said evacuated gas through a portion of said filter belt between said first and second transport decks.

Preferably the first and second low pressure chambers are maintained at different pressures relative to atmosphere. Preferably, the slurry is firstly deposited onto the first transport deck above the first low pressure chamber, the first low pressure chamber being maintained at a higher pressure than the second low pressure chamber. The pressure differential across the filter belt above the first low pressure chamber is thus less than that over the filter belt above the second low pressure chamber.

According to a yet further aspect, the present invention may optionally includes one or more rollers configured and positioned to deliberately applying a 'rippling' effect to the slurry on the loaded belt portion. Although this may be achieved in a variety of means, each operates according to essentially the same principle, i.e. creating a localised distortion to the slurry product cake by protruding a roller into the plane of the filter belt. As the filter belt is drawn over the roller, the resultant tension causes the slurry cake to stretch at the surface, causing cracks and the like. If a plurality of rollers is placed at intervals under the filter belt, the slurry also undergoes a 'squeezing effect as the filter belt is drawn downwards between the rollers, applying compression to the filter cake. The cracking of the slurry cakes provides improved drainage channels for the liquid to be drawn into the low-pressure chamber. Equally, the slurry cake compression between rollers causes liquid to be squeezed from the solids. The beneficial effect of the undulating motion of the filter belt across a plurality of rollers placed along the path of the filter belt movement may be realised in both the longitudinally and transversely. Configuring each roller with a plurality of enlarged and constricted portions across the filter belt width creates a similar undulating effect. Adjacent rollers may be placed with their respective constricted and enlarge portions aligned, or off-set.

In one embodiment, said roller(s) are positioned between the filter belt and the transport deck.

In alternative embodiment, said roller(s) are interposed between the transport deck and a perimeter of the first aperture sealing contact across the filter belt width.

To increase the effectiveness of the manipulation of the filter belt, the rollers may be provided with longitudinal ridges that extend along the length of each roller. Such ridges increase the curvature change undertaken by the filter belt passing over the ridge thus magnifying the stretching and cracking of the slurry product on the raised portions.

3. Super-Atmospheric Pressure Differential Applications

According to one aspect, the present invention provides a liquid removal apparatus adapted to at least partially separate liquid from an infeed composite slurry of liquid and solids, the apparatus including:
- a movable, permeable membrane (hereinafter termed a 'filter belt') having a first side and an opposing second side, at least a portion (hereinafter termed the 'loaded belt portion') of said second side configured to receive said slurry;
- a permeable membrane support system configured to provide a movable support for said loaded belt portion, said support system including;
  - at least one transport deck located adjacent or in contact with at least part of said first side of the filter belt below the loaded belt portion;
- a housing configured to allow a pressure differential to be applied between the first and second sides of the filter belt, such that said first side is at a low pressure with respect to the second side; said housing including:
  - at least one low-pressure chamber with a first aperture in sealing contact with said first side of the filter belt below the loaded belt portion;
  - at least one super-atmospheric chamber above said loaded belt portion;
- at least one pressure conditioning system for applying said differential pressure via the housing to generate a lower pressure on the first filter belt side than the second side;
wherein the or each said transport deck is entirely located within said low pressure chamber.

This liquid removal apparatus may thus provide a stronger differential pressure across the filter belt by using a low-pressure chamber, e.g. vacuum on the first side along with a super-atmospheric chamber, e.g. compression chamber, on the opposing side.

In one preferred embodiment said housing is substantially sealed from atmosphere and forms said super-atmospheric chamber. The liquid removal apparatus may thus be used with slurries that have liquid components that may gasify in atmospheric pressure as the entire housing may be pressurised and therefore prevents gasification of such components.

In an alternative embodiment, said super-atmospheric chamber is provided in sealing contact with a gas permeable membrane located above said filter belt and is configured to allow passage of said slurry between said gas permeable membrane and said filter belt.

There is a well established inter-relationship (often represented by phase diagrams) between pressure temperature and volume which defines the state of a substance at any given pressure, temperature, volume levels. In respect of the present invention, the volume of the pressure chambers of the pressure conditioning system is essentially fixed. However, axiomatically the pressure in the low-pressure chamber may be reduced below atmospheric and, when present, the pressure in the high pressure chamber may be elevated above atmospheric. However, the efficiency of liquid removal from the slurry may be enhanced by also varying the slurry temperature. Transforming a liquid into its gas state is an effective means of removing the liquid from the slurry solids. Once vaporised or evaporated, the gases fluid is far more readily extracted through the filter belt into the low pressure chamber.

According to a yet further aspect, the present invention provides a method including the steps wherein; the pressure conditioning system applying said differential pressure generates a pressure on the first filter belt side in the low-pressure chamber within a first predetermined pressure level range; heating the slurry received on to the loaded belt portion to a temperature within a first predetermined temperature level range; characterised in that said first predetermined pressure and temperature levels are selected to transform said slurry liquid passing through the filter belt into a gas. The transformation of the slurry liquid may be by vaporisation or evaporation.

There are large quantities of oil reserves entrapped as bitumen oil sands, or tar sands. The excessive difficulty in extracting the oil without uneconomic energy input requirements or adverse environmental issues have mitigated the potential of these vast reserves. The present invention provides an alternative means of oil extraction which offers potentially lower energy input top remove a given quantity of bitumen oils. Thus, according to one embodiment, the present invention provides a method of extracting bitumen oils from a slurry including bitumen oil sands using the liquid removal apparatus as hereinbefore described, said method including the steps;
- pre-heating said slurry;
- capturing heated gas from said pre-heating;
- placing said slurry on the loaded belt portion;
- applying said captured heated gas into said high-pressure chamber; and
- collecting molten and/or liquid oils passing through said filter belt into the low-pressure chamber under effects of said applied differential pressure.

Due to the difficulties in manipulating and processing the oil sand directly, supplementary liquids may be added to the slurry such as hot water, solvents and the like to aid in the oils separation. Further process may then be required to process the resulting filtrate.

In a further embodiment, all slurry fluid pathways in said pressure conditioning system and any portion of the apparatus in physical contact with said slurry is/are provided with a non-metallic surface, wherein said physical contact includes contact from any gas emissions from the slurry. Such an embodiment would be suited to liquid removal applications involving reactive or toxic chemicals which may react with, or damage exposed, metallic passageways in the apparatus.

4. Solids Fluid Regulator

According to another aspect of the present invention, there is provided a method for controlling the solids-to-liquids ratio of an infeed composite slurry of liquid and solids, said slurry to be separated by a liquid removal apparatus, the method including:
a) passing a first portion of said infeed slurry to said liquid removal apparatus;

b) at least partially separating a liquid filtrate from said first portion of slurry with said liquid removal apparatus, said liquid filtrate including liquids from said first portion of slurry;

c) recirculating said liquid filtrate into a second portion of said infeed slurry to alter the solids-to-liquids ratio of said second portion of infeed slurry;

d) passing said second portion of infeed slurry said liquid removal apparatus.

Preferably steps a)-d) are repeated to adjust the solids-to-liquids ratio of the infeed slurry. Preferably, the solids-to-liquids ratio of the infeed slurry is measured and steps a)-d) repeated to maintain the solids-to-liquids ratio within a predetermined range.

According to another aspect of the present invention, there is provided a method for controlling the solids-to-liquids ratio of an infeed composite slurry of liquid and solids, said method as aforementioned and including the step of:

adding a flocculant to said infeed slurry.

According to another aspect of the present invention, there is provided a filtrate recirculation system for re-circulating liquid filtrate from a liquid removal apparatus capable of removing a liquid filtrate from a composite slurry of liquids and solids, the filtrate recirculation system including:

a) a recirculation conduit fluidly connected to a liquid filtrate outlet of said liquid removal apparatus and to a slurry inlet of said liquid removal apparatus;

b) at least one control valve selectively blocking passage of liquid filtrate from said liquid filtrate outlet to said slurry inlet;

wherein in use, said control valve is selectively opened to permit passage of liquid filtrate from said liquid filtrate outlet to said slurry inlet to alter the solid-to-liquid ratio of slurry therein.

Preferably, one or more sensors are provided for measuring the solids-to-liquids ratio of said infeed slurry. In a further embodiment, a controller capable of receiving feedback from said sensors and controlling said recirculation system to selectively re-circulate said liquid filtrate to maintain the solids-to-liquids ratio of the infeed slurry It is important in many liquid removal applications, e.g. in liquid removal from sewerage slurry, that the solids-to-liquids ratio is maintained generally constant when entering a corresponding liquid removal apparatus as the liquid removal process may not be effective if the solids-to-liquids ratio is not within an acceptable working range. For example, a flocculant is typically added to slurries to create floc from the solids therein.

The larger particulate floc is easier to filter than the particulate and thus the liquids are thus easier to remove. However, if a slurry has too high a solids content, the flocculant may not disperse sufficiently through the slurry and therefore the slurry may not be effectively filtered. While water or other liquid can be added to the infeed slurry to solve this problem, this will require an external water/liquid supply.

It will be appreciated that the aforementioned method for controlling the solids-to-liquids ratio and/or said filtrate recirculation system may be used with the liquid removal apparatus(es) as aforementioned or may be used with known liquid removal apparatus(es).

It will also be apparent that the above described embodiments of the present invention may also be incorporated in a fixed liquid separation plant.

The invention may also broadly be said to consist in the parts, elements and features referred to or indicated in the specification of the application, individually or collectively, and any or all combinations of any two or more of the parts, elements or features, and where specific integers are mentioned herein which have known equivalents, such equivalents are incorporated herein as if they were individually set forth.

BRIEF DESCRIPTION OF DRAWINGS

Further aspects of the present invention will become apparent from the following description which is given by way of example only and with reference to the accompanying drawings in which:

FIGS. 6a & 6b show a cutaway isometric view of a liquid removal apparatus according to a third preferred embodiment of the present invention without and with a removable permeable membrane support system respectively;

FIGS. 15a and 15b show isometric views of the liquid removal apparatus of FIGS. 7-13

FIGS. 16a and 16b show enlarged partial isometric view of the ends of the liquid removal apparatus of FIGS. 15a and 15b;

FIGS. 52a and 52b show alternative embodiments of a transport deck, and

FIG. 53 shows a pair of filter belt manipulating rollers according to another embodiment.

BEST MODES FOR CARRYING OUT THE INVENTION

Figure 1:
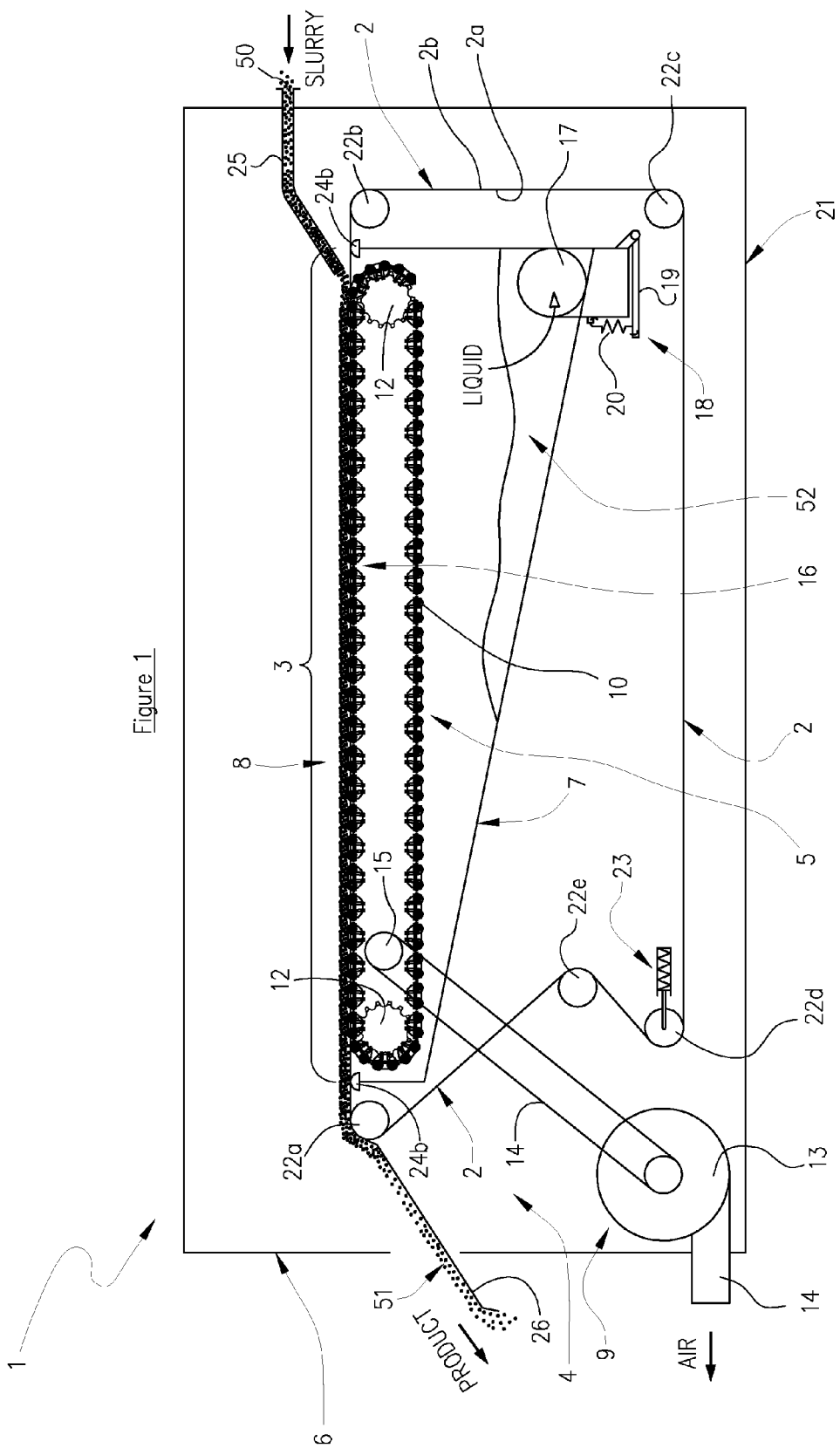
FIG. 1 is a side elevation cross sectional view of a liquid removal apparatus according to a first preferred embodiment of the present invention.

FIGS. 1 to 4 show a first example of a liquid removal apparatus (1) according to one preferred embodiment of the present invention. The liquid removal apparatus (1) is adapted to at least partially separate liquid from an infeed composite slurry (50) of liquid and solids.

The liquid removal apparatus (1) has a movable, permeable membrane provided in the form of filter belt (2) having a first side (2a) and an opposing second side (2b). At least a portion (hereinafter termed the 'loaded belt portion' (3)) of the second side (2b) is configured to receive the slurry (50). The filter belt (2) is liquid permeable but substantially impermeable to the solid content of the slurry (50) such that the majority of the solids content is prevented from passing through.

The liquid removal apparatus (1) has a permeable membrane support system (4) configured to provide a movable support for the loaded belt portion (3). The support system (4) has a transport deck (5) located in contact with a portion of the first side (2a) of the filter belt (2) below the loaded belt portion (3). The transport deck (5) is configured to move synchronously with the filter belt (2) so that there is little or no friction therebetween which may otherwise damage the filter belt (2). The transport deck (5) has an 'upper-most run' (16) over which the filter belt first side (2a) is supported.

A housing (6) is provided and configured to allow a pressure differential to be applied between the first (2a) and second (2b) sides of the filter belt (2), such that the first side (2a) is at a low pressure with respect to the second side (2b). The housing (6) includes a low-pressure chamber (7) with a first aperture (8) in sealing contact with the portion of the filter belt first side (2a) below the loaded belt portion (3). The first aperture (8) is shown more clearly in the embodiment shown in FIG. 15 and its perimeter is defined by the upper sealing strips (24) that extend around the perimeter of the vacuum chamber (7).

In the embodiment shown in FIGS. 1-4, a pressure conditioning system is provided in the form of vacuum (9) for applying the differential pressure via the housing (6) to generate a lower pressure on the first filter belt side (2a) relative to the filter belt second side (2b).

The transport deck (5) is entirely located 'within' the low pressure or 'vacuum' chamber (7) that extends from the first side (2a) of filter belt (2) between the seals (24) and to liquid outlet (17). Placing the transport deck (5) entirely within the low pressure chamber (7) enables a pressure differential to be applied across the whole surface area of the loaded belt portion (3) supported by the transport deck (5). This creates a significant advantage over the prior art systems which are typically constrained to apply a vacuum to a restricted area of the equivalent loaded belt portion.

The throughput of the liquid removal apparatus (1) is directly governed by the magnitude of the pressure differential and the surface area to which it is applied. Consequently, maximising the surface area of the loaded belt portion (3) subjected to the pressure differential provides a commensurate improvement in throughput.

The loaded belt portion (3) of the filter belt (2) is shown as extending substantially horizontal. However, the transport deck may be inclined in some applications to control the flow of slurry (50) over the loaded belt portion (3).

In the example shown in FIGS. 1-4, the transport deck (5) has continuous flexible drive members provided in the form of two drive chains (10). Only one drive chain (10) is shown in FIGS. 1-4. A number of support beams (11) extend between the two drive chains (10) (i.e. into the page of FIG. 1) and are arranged substantially transverse to the direction of movement of the filter belt (2). Other forms of flexible drive members may also be used, e.g. cables, wires, ropes, belts, or other flexible members to which the support beams (11) can be attached.

The transport deck (5) also has two driven rollers (12) for supporting and driving the drive chains (10) and support beams (11). These drive rollers (12) may be formed as sprockets which engage the drive chains (10). In a preferred embodiment, the filter belt (2) is moved solely by virtue of being 'clamped' to the chain (10) and support beams (11) by the pressure differential between the first (2a) and second (2b) sides of the filter belt (2) thus eliminating the requirement for a synchronised drive for driving the filter belt (2).

The support beams (11) span the open void of the first aperture (8) in a direction substantially transverse to the direction of travel of the filter belt (2). The transversely extending beams (11) thus individually span a large transverse first aperture (8) and can withstand high loadings while being collectively articulated to move on an endless rotatable loop by the rollers (12) and drive chains (10).

The vacuum (9) has an extraction fan or vacuum pump (13) in an exhaust duct (14) that extends from atmosphere to a gas outlet (15) in the low pressure chamber (7). When the vacuum (9) is operated, air/gas in the low pressure chamber (7) is evacuated via gas outlet (15), pump (13) and duct (14).

When the apparatus (1) is in use, and a pressure differential exists between the first (2a) and the second (2b) filter belt sides, significant forces experienced by the filter belt (2) can act to push the filter belt (2) onto the support beams (11). For example, even if the pressure differential is only a kilogram per square meter, as the loaded belt portion (3) that extends across the first aperture (8) will generally have a large surface area (i.e. the size of aperture (8)), the effective total force exerted on the filter belt (2) will thus be multiplied by the size of loaded belt portion (3). For this reason the support beams (11) are relatively closely spaced (most clearly seen in FIG. 4) and are robust enough to withstand the forces thereon.

It is this pressure differential force exerted on the infeed slurry (50) travelling on the second side (2b) of the filter belt (2) that results in the liquid content of the slurry (50) being forced through the liquid permeable filter belt (2) and into the vacuum chamber (7) as liquid filtrate (52) while the solid content or 'product' (51) is prevented from passing through filter belt (2) and therefore passes from the apparatus (1) as dried product (51). Gravity also forces the liquid through the filter belt (2), though to a much lesser extent than the pressure differential.

The liquid removal apparatus housing (6) can be formed as a container (21), such as for example a typical modified twenty foot or forty foot shipping container, or could be constructed to be transportable in the same way as a shipping container, e.g. by including twist-lock fittings in the apices of the container.

In a preferred embodiment, the gas outlet (15) in the low pressure chamber (7) is positioned above a liquid outlet (17) to reduce the likelihood of the liquid filtrate (52) contaminating the vacuum pump (13). Correspondingly, the liquid outlet (17) is positioned at a gravitational drainage low-point in a portion of the low pressure chamber (7) shaped to collect filtrate (52).

The liquid outlet (17) is releasably sealed by a pressure relief valve (18) exhausting to atmosphere. The relief valve (18) is shown as a spring-biased flapper relief valve with flap (19) biased to a closed position by a spring (20). In use, after the liquid removal apparatus (1) reaches its operational vacuum level, the increased weight of any additional collected filtrate (52) will cause the relief valve (18) to open until the liquid head (52) falls to a level insufficient to keep the relief valve (18) open and the cycle is repeated. The flap (19) opens when liquid pressure/weight exceeds the 'closure force' on the flap (19) thus effectively controlling the level of liquid head (52) in the low pressure chamber (7).

The closure force is partly dependent on the spring bias but is mainly dependent on the pressure differential between the low pressure chamber (7) and atmosphere. The head of filtrate (52) required to open the relief valve (18) (and therefore level of liquid filtrate (52)) is directly proportional to the closure force of the low pressure chamber (107). This relief valve (18) thus provides an extremely reliable visual indicator of the strength of the differential pressure across the filter belt (2); in effect acting as a vacuum gauge.

It will be appreciated that the liquid outlet (17) need not be lower than the gas outlet (15) to avoid ingress of liquid filtrate. For example, in the embodiment shown in FIG. 7, the vacuum chamber may be partitioned into sections that collect liquid filtrate and drain to liquid outlets which are above a gas outlet at a lower point but in a different section. The liquid filtrate thus drains from each section at a higher point than the vacuum in the lower adjacent section.

The filter belt (2) in the housing (6) extends around a belt support system formed by a series of belt rollers (22a-e) that are part of the permeable membrane support system (1). A belt tensioning system is provided in the form of a linear actuator (23) which adjusts the position of a belt roller (22d) to adjust the tension of the filter belt (2). The belt tensioning system (23) allows the belt tension to be reduced when placing the belt on the belt rollers (22a-e), replacing a worn belt, or adjusting the tension during operation. The pressure differential that holds the filter belt (2) onto the support beams (11) may not be sufficient to allow the support beams (11) to drive the filter belt (2) during a start up phase when the filter belt (2) is not covered with the slurry (50). Thus, in some applications, one or more of the belt rollers (22a-e) can be driven to drive the filter belt (2) synchronously with the motion of the support beams (11). An example of a driven roller is shown in the embodiment shown in FIG. 16.

The aperture (8) to the low pressure chamber (7) has a width (transverse to the direction of slurry travel) that substantially corresponds to the distance between the two drive chains (10), and a length similar to the length of the low pressure chamber (7) and housing (6). As aforementioned, the first side (2*a*) of the filter belt (2) extends over the first aperture (8) and is 'sucked' against the support beams (11) when the vacuum (9) is operated.

In order to seal the low pressure chamber (7) from atmosphere, sealing members (24) are provided about the perimeter of the first aperture (8). The sealing members (24) (more clearly shown in FIGS. 3 and 4) are formed as a series of plastic sealing strips including two longitudinal strips (24*a*) and two transverse strips (24*b*) which together extend about the perimeter of the first aperture (8). This provides a substantially rectangular first aperture (8). The sealing strips (24) may be made from, for example, ultra-high molecular weight polyethylene (UHMWPE) or Teflon® which has a relatively low coefficient of friction and reasonable wear resistance. The sealing members (24) define the perimeter of the first aperture (8) and extend above the two drive chains (21) and between the belt rollers (22*a*, 22*b*) at each end.

Figure 3:
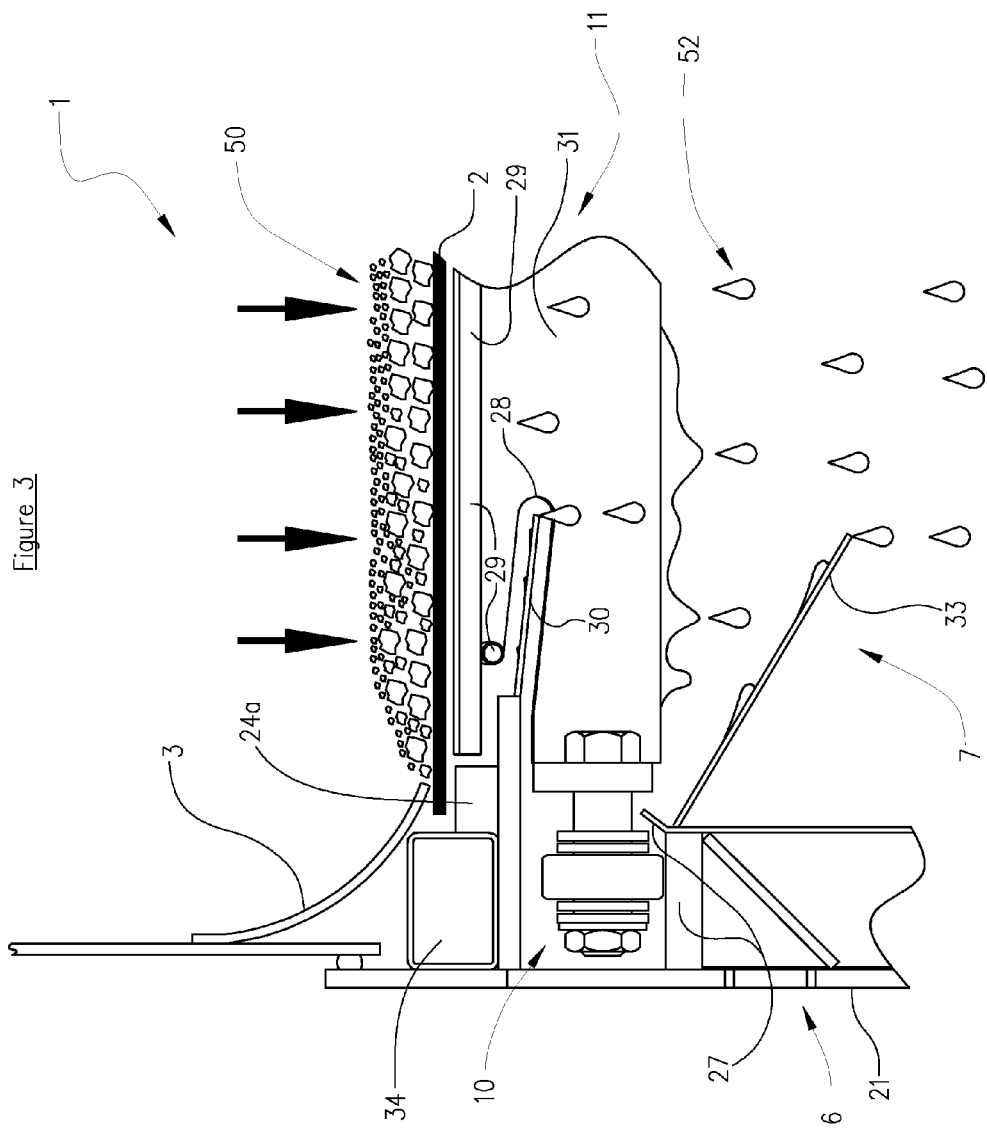
FIG. 3 is a partial side elevation cross-sectional view showing an enlarged view of part of a transport deck of the liquid removal apparatus of FIGS. 1 and 2.
Figure 4:
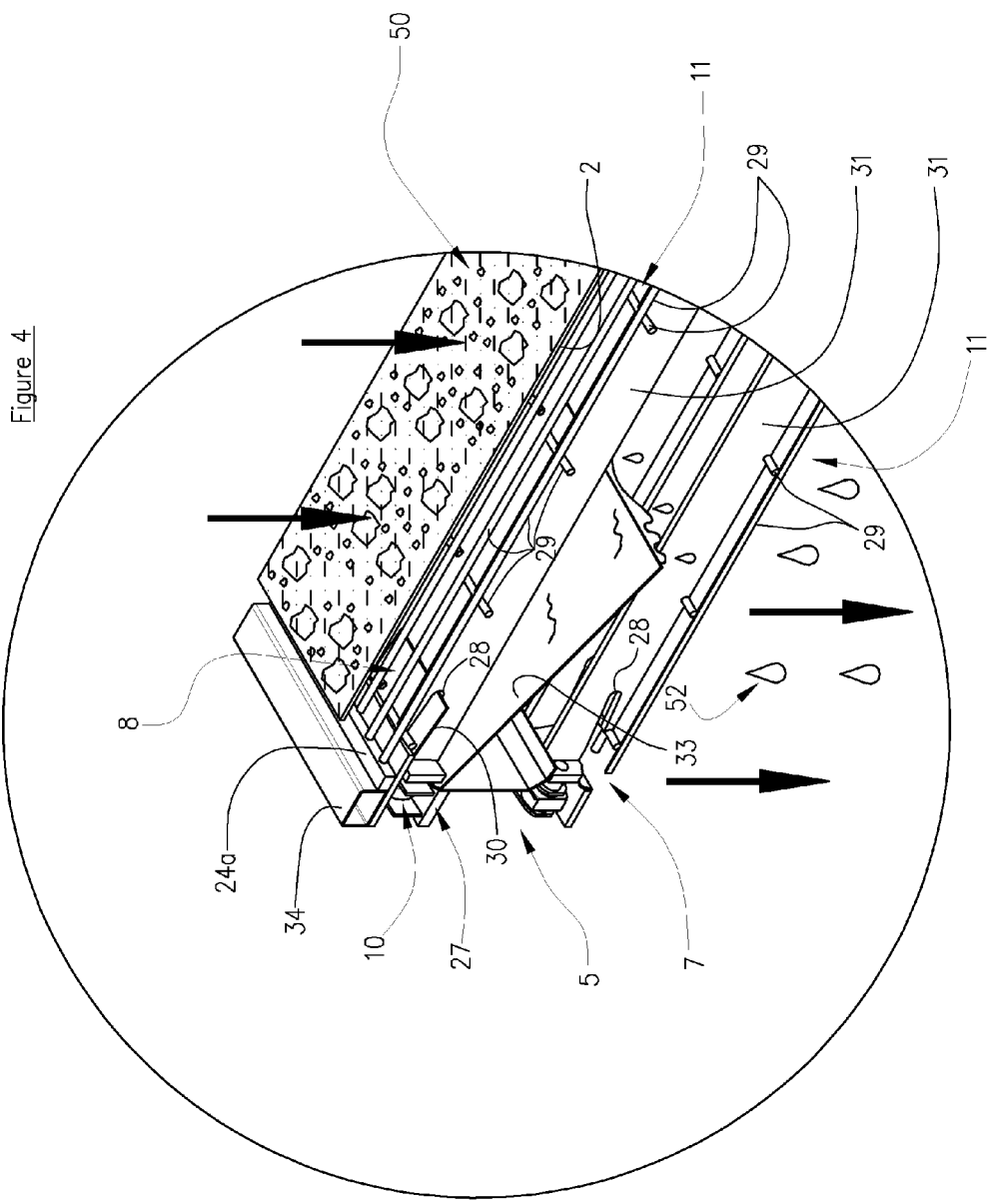
FIG. 4, is a partial cutaway isometric view showing the transport deck as shown in FIG. 3.

FIGS. 3 and 4 show partial transverse cutaway views of the sealing members (24) and one end of a support beam (11) and one drive chain (10). Each drive chain (10) is supported in a chain guide (27) that is attached to the inside of the housing (6). A longitudinally extending skirt (32) (shown in FIG. 3) is provided above each longitudinal sealing strip (24*a*) to minimise the migration of slurry (50) toward the edge of the filter belt (2) and onto sealing member (24*a*). The sealing member (24*a*) is fitted above the drive chain (10) such that in use the filter belt (2) is drawn downwards to contact the sealing member (24) and will thereby seal the periphery of the aperture (8) against filter belt (2) to maximise the differential pressure across the filter belt (2).

The weight of the slurry (50) on the filter belt second side (2*b*) may also press the filter belt first side (2*a*) against sealing strip (24*a*). The support beam (11) is bolted to the drive chain (10) and includes a recess (28) within which deflector strips (30) extend from the side of housing (6). The deflector strips (30) extend above the drive chain (10) and thus help to prevent any liquid or slurry (50) from travelling from the lateral edges of the filter belt (2), between the filter belt (2) and sealing member (24) and onto the drive chain (10) which may cause damage to the drive chain (10), or at the very least reduce lubrication and efficiency. Further lower deflectors (33) are provided below the support beams (11) and drive chain (10) to direct the liquid filtrate (52) (shown as drops) away from the lower opposing portion of the drive chain (10).

The support beams (11) consist of support bars (29) welded to support plates (31) which are bolted to the drive chain (10). These support bars (29) and plates (31) form the support beams (11) which provide the support for the filter belt (2) while permitting liquid transfer through the gaps between support bars (29). The beams (11) are spaced from each other to maximise the liquid flow passing therethrough while still providing sufficient support for the weight of the filter belt (2), slurry (50) and the differential pressure force acting on the belt (2). Reinforcing side beams (34) extend longitudinally adjacent the lateral edges of the filter belt (2) and help to strengthen the overall housing (6) and support system (1).

Figure 2:
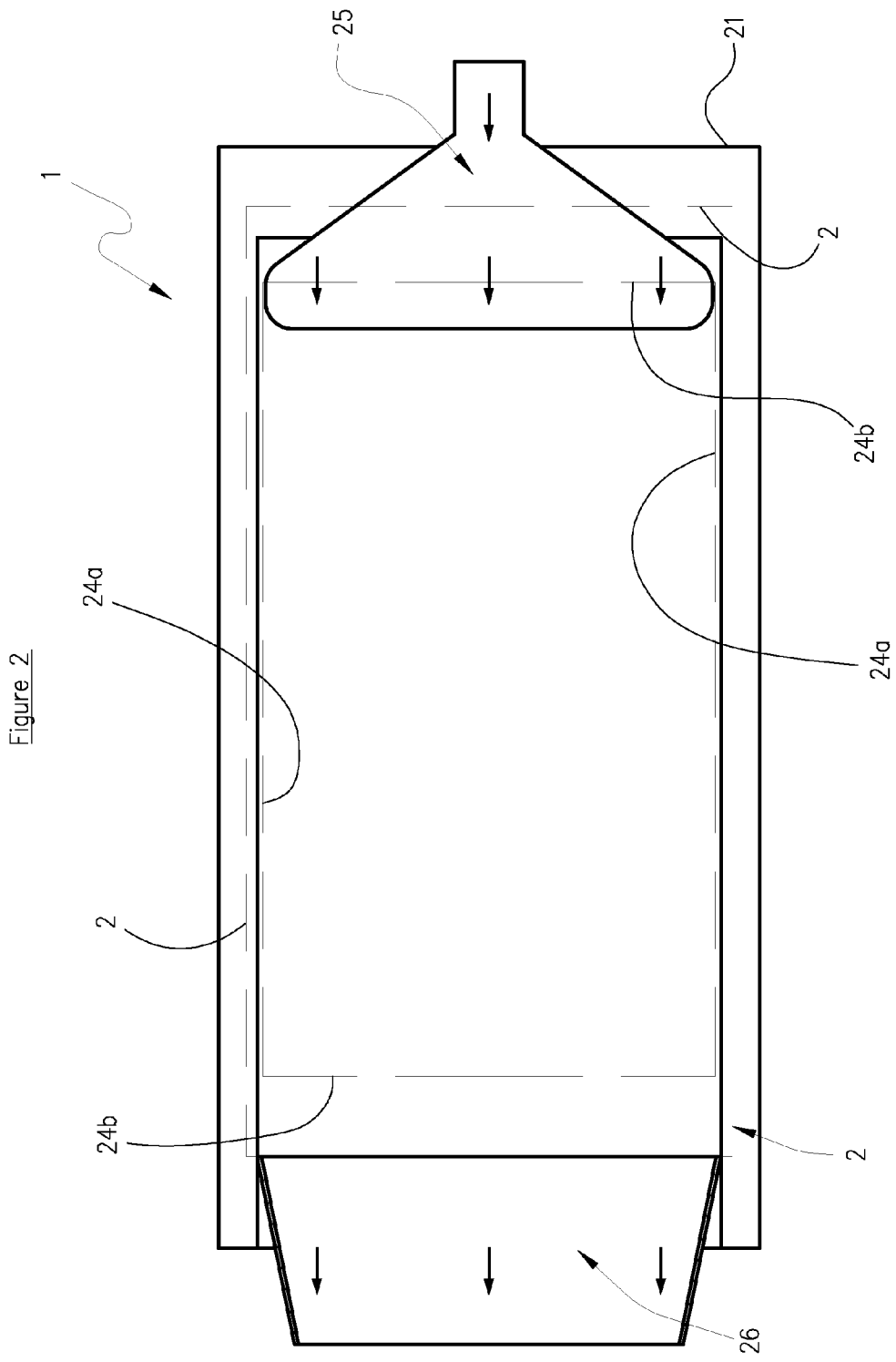
FIG. 2 is a plan elevation view of the liquid removal apparatus of FIG. 1.

In operation, the slurry (50) passes onto the filter belt (2) via manifold (25), the liquid content (52) is then filtered from the slurry (50) via filter belt (2) and the remaining solid content (51) is passed to a product outlet chute (26) to be recycled or disposed of. As shown in FIG. 2, the manifold (25) has diverging sides so that the slurry (50) is spread evenly across the width of the filter belt (2) so that the pressure differential is substantially consistent throughout the slurry. The rate of liquid removal is thus also relatively even. This even spreading ensures the product (51) has a generally consistent remainder liquid content. It will be appreciated that the ideal thickness of slurry (50) on the filter belt (2) for maximum liquid removal will depend on the solid to liquid ratio in the slurry (50), the size of the particles and the chemical composition of slurry being processed. Thus, the volume flow-rate of slurry flow via manifold (25) is adjustable to vary the thickness of the slurry (50) on the filter belt (2).

Figure 5:
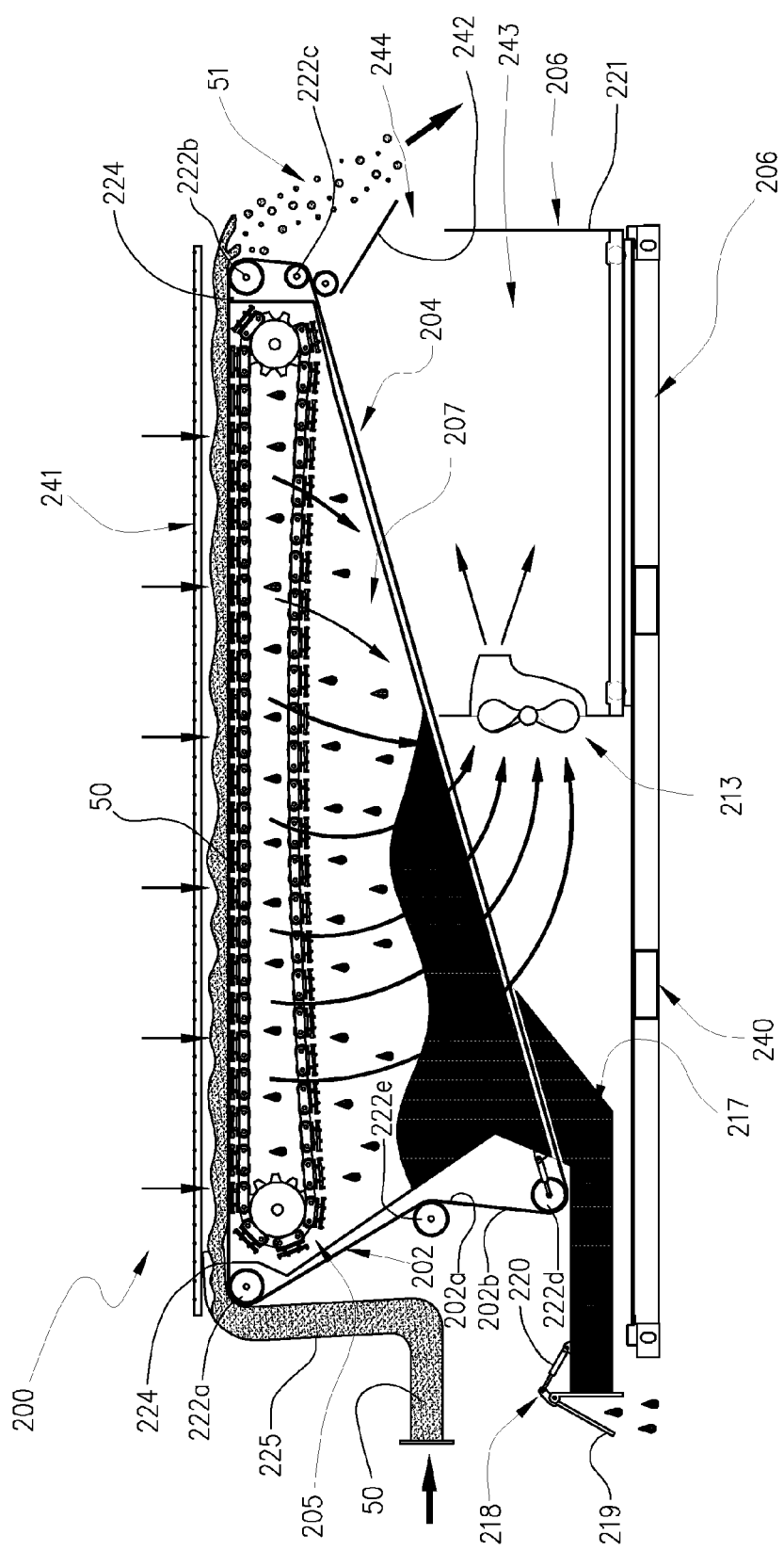
FIG. 5 is a side elevation cross sectional view of a liquid removal apparatus according to a second preferred embodiment of the present invention.

FIG. 5 is a schematic diagram of a liquid removal apparatus (200) according to a second preferred embodiment of the present invention. The liquid removal apparatus (200) of the second embodiment is similar in function to the liquid removal apparatus (1) of the first embodiment and consists of generally the same components, e.g. a filter belt (202) having a first side (202*a*) and an opposing second side (202*b*), a permeable membrane support system (204), a transport deck (205), inside a low pressure chamber (207), a housing (206) with sealing members (224), a manifold (225), product outlet chute (226), filter belt rollers (222*a-e*) and a liquid outlet (217) with valve (218). The vacuum is shown as a ducted fan (213) that is fluidly connected to the low pressure chamber (207) above the liquid outlet (217) via a pipe (not shown).

The liquid removal apparatus (200) also has a different liquid outlet valve (218) mechanism that uses a hydraulic ram (219) instead of the spring (19) shown in FIGS. 1-4. The ram (219) is actuated to open the flap (220) when the level of filtrate (52) in the low pressure chamber (207) reaches a particular height and/or the pressure differential reaches a particular level.

A vacuum control is provided in the form of flap (242) that closes an opening (244) to atmosphere in an evacuation chamber (243). The pressure differential across the filter belt (202) is dependent on the volume and rate of air moved by the fan (213). Thus, by adjusting the size of the opening (244) to atmosphere with flap (242), the volume of airflow is restricted and therefore the pressure differential across filter belt (202) can be controlled.

The liquid removal apparatus (200) otherwise differs little from liquid removal apparatus (1). For example, minor differences include the shape and position of the vacuum (209), liquid outlet (217), and manifold (225) configuration differs to the respective components shown in FIGS. 1-4. The housing (206) is formed as a shipping container (221) with a base (240) and upper walkway (241) which thus aid in transport and maintenance respectively.

FIGS. 6*a* and 6*b* show a liquid removal apparatus (300) according to a third preferred embodiment. This liquid removal apparatus (300) differs from the first and second embodiments only in minor aspects, e.g. the shape and configuration of the manifold (325) and will therefore not be described in detail. FIGS. 6*a* and 6*b* respectively show the liquid removal apparatus (300) without and with the transport deck (305) in place. A sliding framework (360) is used to assist in moving the permeable membrane support system (304) in and out of the container (321) for maintenance and/or assembly/disassembly. The filter belt (302) is shown as a separate component to the permeable membrane support system (304).

FIGS. 7-13 show a liquid removal apparatus (100) according to a fourth preferred embodiment of the present invention. The components of the liquid removal apparatus (100) are generally similar to those of the first (1), second (200) and third (300) liquid removal apparatus embodiments and like parts will herein be referenced and described similarly.

The parts common to all embodiments are listed below. The components are each labelled in the drawings with the list number following the embodiment number, e.g. the "2. Filter Belt" is labelled as "2" in the first embodiment and then 202, 302 and 102 in the second, third and fourth embodiments respectively. Such corresponding labelling occurs for all common or equivalent parts. However, the slurry (50), product (51) and filtrate (52) are identically referenced in each embodiment.
1. Liquid removal apparatus (1, 200, 300, 100)
2. Permeable membrane, e.g. Filter belt (2, 202, 302, 102)
3. Loaded belt portion (3, 203, 103)
4. Permeable membrane support system (4, 204, 304, 104)
5. Transport deck (5, 205, 305, 105)
6. Housing (6, 206, 306, 106)
7. Low pressure chamber (7, 207, 307, 107)
8. First aperture (8, 208, 308, 108)
9. Pressure conditioning system, e.g. vacuum (9, 209, 109)
10. Drive chains (10, 210, 310, 110)
11. Support Beams (11, 211, 311, 111)
12. Drive chain Rollers/Sprockets (12, 212, 312, 112)
13. Extraction fan/Vacuum (13, 213, 313, 113)
14. Gas outlet duct (14, 214, 314, 114)
15. Gas outlet (15, 215, 315, 115)
16. Upper-Most Run (16, 216, 316, 116)
17. Liquid outlet (17, 217, 317, 117)
18. Liquid outlet valve (18, 218, 318, 118)
19. Liquid outlet valve flap (19, 219, 319, 119)
20. Liquid outlet valve Spring/Ram (20, 220, 320, 120)
21. Container (21, 221, 321, 121)
22. Filter belt rollers (22, 222, 322, 122)
23. Filter belt tensioning mechanism (23, 223, 323, 123)
24. Sealing strips (24, 224, 324, 124)
25. Manifold (25, 225, 325, 125) and outlet
26. Product outlet chute (26, 226, 326, 126)
27. Drive chain guide (27, 227, 327, 127)
28. Support beam plate recess (28, 228, 328, 128)
29. Support beam bars (29, 229, 329, 129)
30. Upper deflector (30, 230, 330, 130)
31. Support beam plate (31, 231, 331, 131)
32. Skirt (32, 232, 332, 132)
33. Lower deflector (33, 233, 333, 133)
34. Reinforcing side beams (34, 234, 334, 134)

Figure 7:
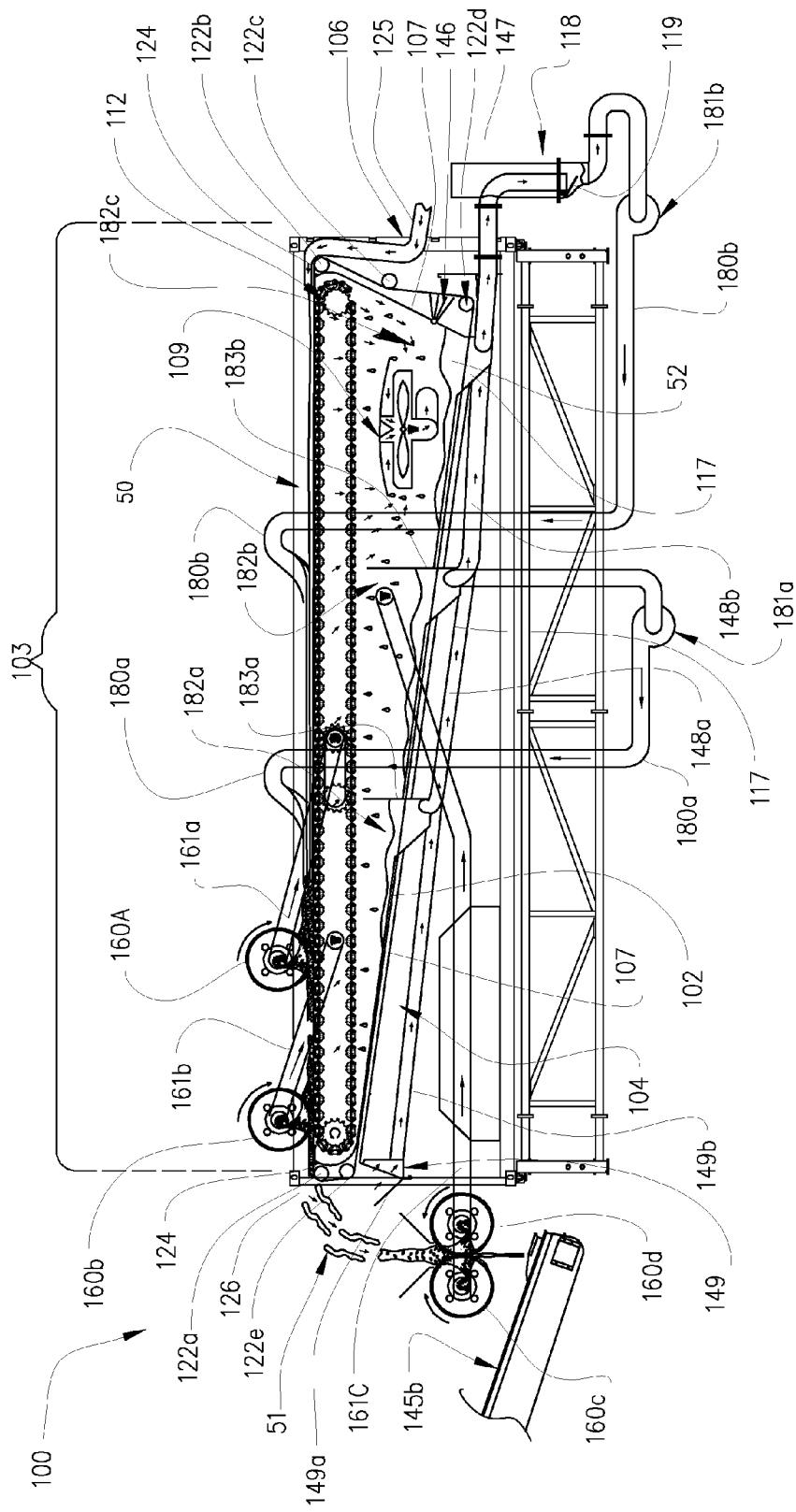
FIG. 7 is a side elevation of a longitudinal cross-section of a liquid removal apparatus according to a fourth preferred embodiment of the present invention.
Figure 8:
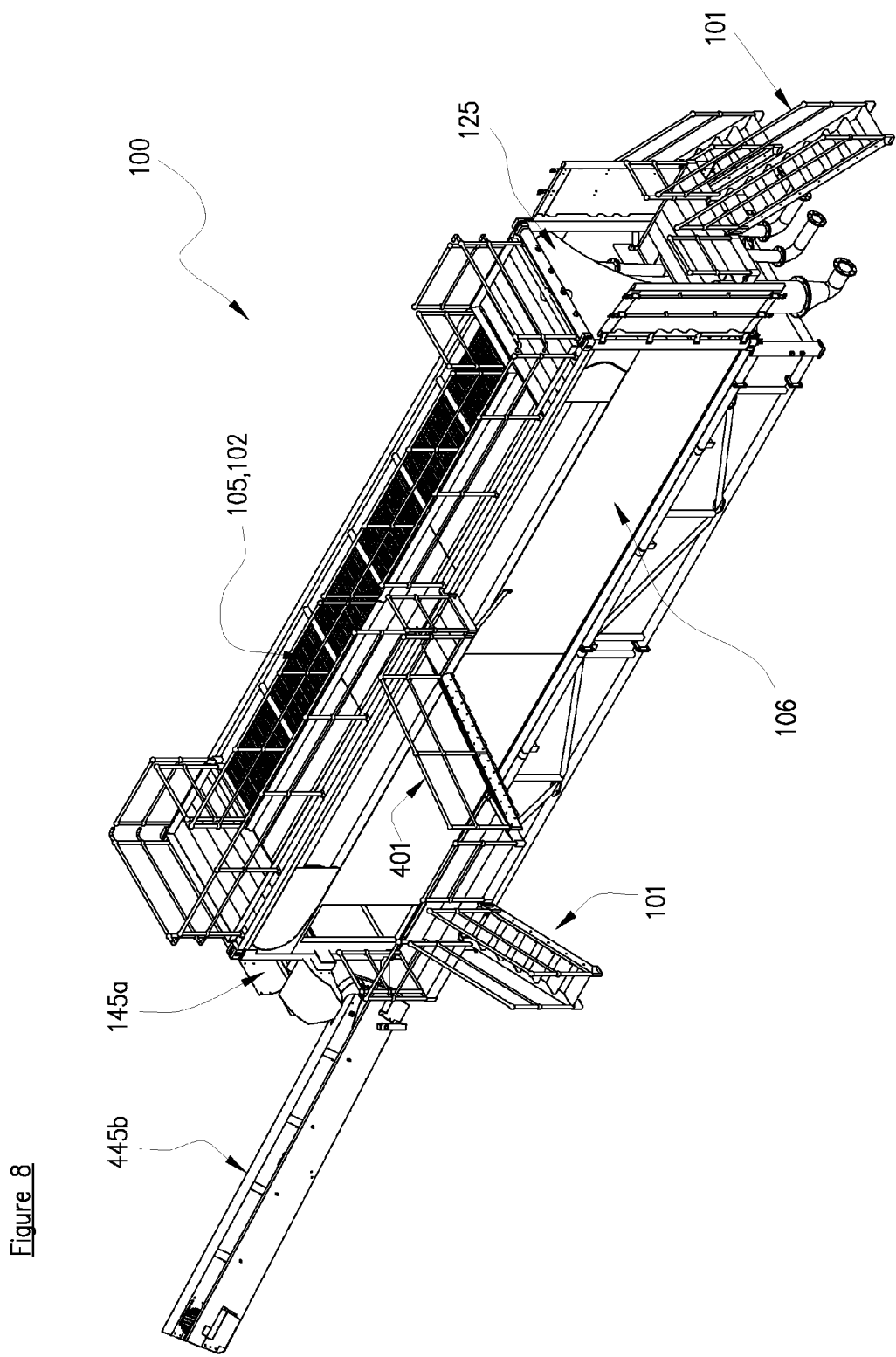
FIG. 8 is a top-left isometric view of the liquid removal apparatus of FIG. 7.
Figure 9:
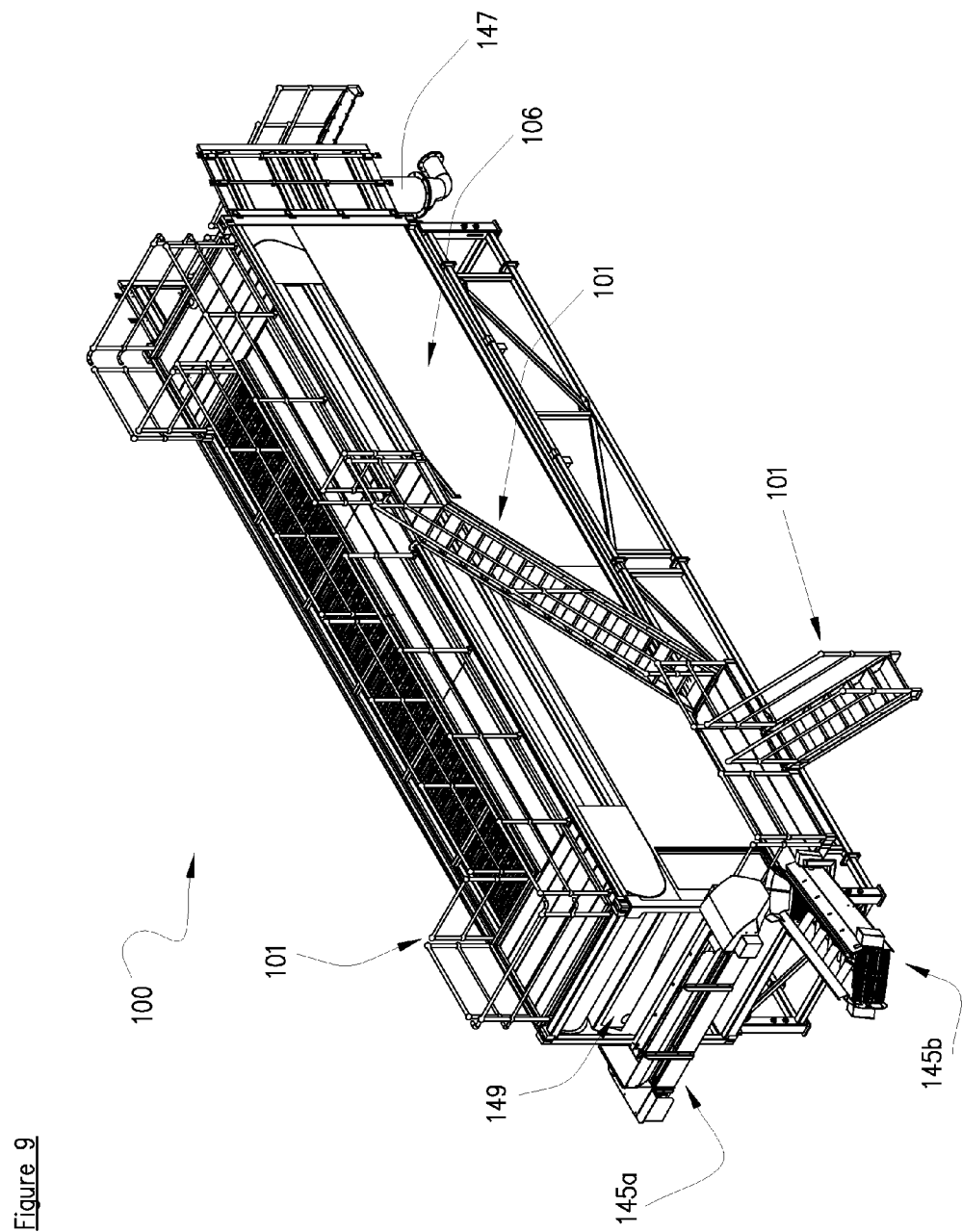
FIG. 9 is another top-left isometric view of the liquid removal apparatus of FIG. 8 from the opposing end.
Figure 10:
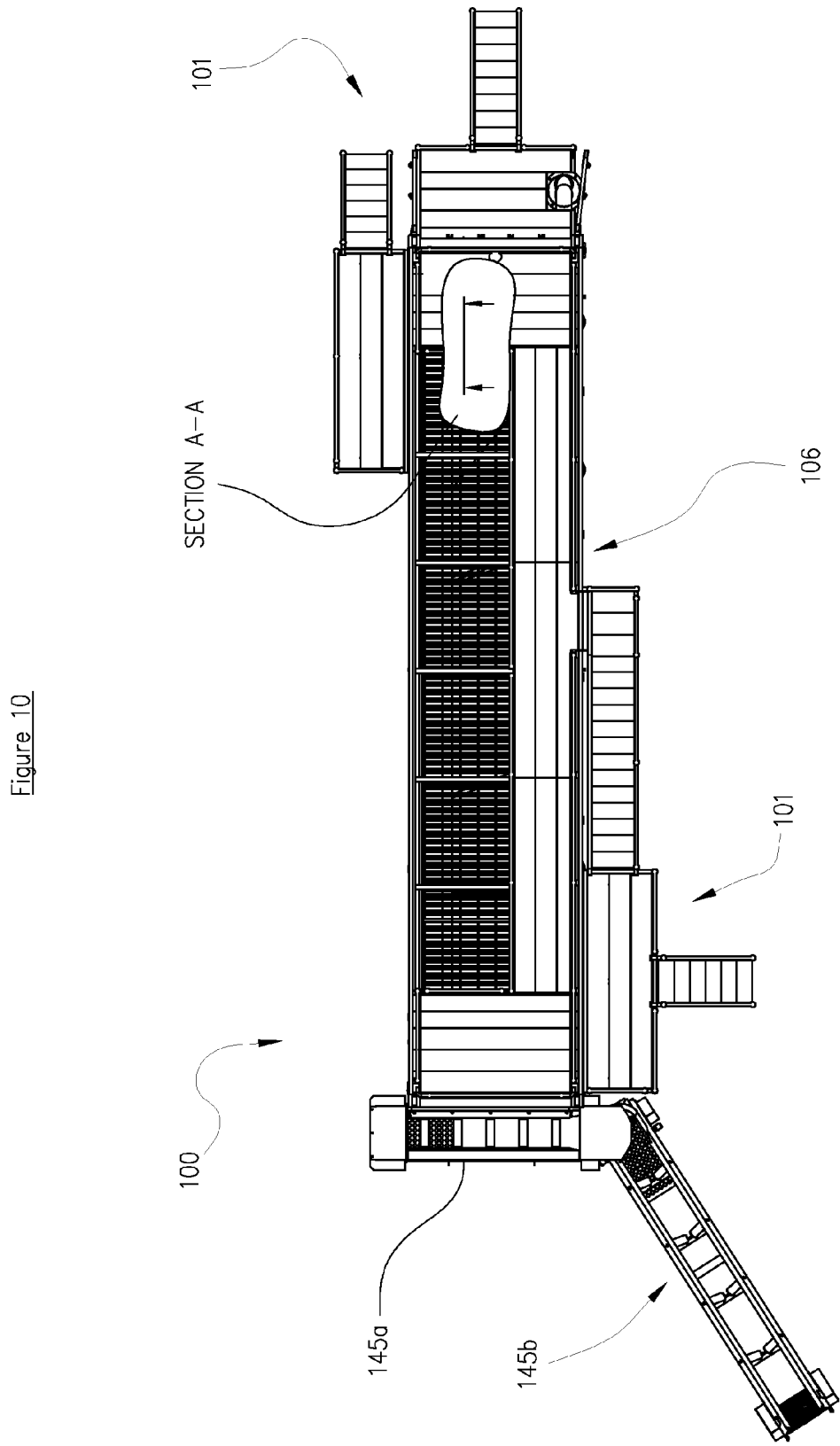
FIG. 10 is a plan view of the liquid removal apparatus of FIGS. 7-9.

FIG. 7 is a side elevation of a longitudinal cross-section of another preferred embodiment of a liquid removal apparatus (100) and thus shows the details of the main working components.

As the operation of the liquid removal apparatus (100) is generally the same as that of the liquid removal apparatus' (1, 200, 300) only the differences and/or additional features will be described below.

As with the previously mentioned embodiments, the liquid removal apparatus (100) is adapted to at least partially separate liquid from an infeed composite slurry (50) of liquid and solids.

The apparatus (100) has in addition to low pressure chamber (107) and vacuum (109), four vacuum filter rollers (160a-d) which are shown in more detail in FIGS. 24-27 and correspondingly described. Each vacuum roller (160a-d) is connected to the low pressure chamber (107) via respective ducts (161a-c). The dual vacuum rollers (160c & 160d) are connected to the same duct (161c). Filtrate re-circulation pipes (180a, 180b) and corresponding pumps (181a, 181b) are provided for taking the liquid filtrate (52) and re-circulating onto the slurry (50) as shown more clearly in FIG. 23. The degree of solids removal from the slurry may thus be enhanced by utilising the liquid filtrate (52) itself as a part of the filtration process.

The low-pressure chamber (107) has three sub-compartments (182a, 182b, 182c), separated by partitions (183a, 183b) each configured to collect liquid filtrate (52) from a predetermined portion of the loaded belt portion (103). The collected filtrate from compartments (182b, 182c) may be re-circulated to the loaded belt portion (103) above compartments (182a, 182b) respectively. If sufficiently 'clean', the filtrate in compartments (182a and 182b) may be respectively passed to liquid filtrate outlet pipes (148a, 148b) for recycling. It will be apparent this technique may be used in a multi-stage configuration whereby successive low-pressure chamber compartments (182b, 182c) (except the distal compartment (182a) from the inlet manifold (125)) recycle a portion of their collected filtrate onto a portion of the loaded belt portion (103) corresponding to the adjacent compartment. Slurry inputs such as wood pulp and types of quarry grain mixtures, particularly mixtures containing large solids are suited to such a technique. After the initial layer of slurry with large particles is laid over the filter belt, the extracted filtrate will include finer particles and when these are reapplied to the upper surface of the filter belt provide a correspondingly finer filter. Re-applying the filtrate in a three-stage process has been found to remove virtually all the solids not in solution. An additive such as PolyEthelyne Oxide PEO may then be introduced in the final re-cycling stage to flocculate with the resin colouring.

A conveyor (145) is provided beneath the product outlet (126) and includes a lateral conveyor (145a) and a longitudinal conveyor (145b) (shown in FIGS. 8-13) for receiving the filtered product (51) and conveying to a transport vehicle or further processing/filtering. Depending on the slurry type, the filtered product (51) may be useful for other applications and could therefore be recycled. Alternatively, the filtered products could be re-processed, re-filtered or passed as waste.

In some instances the liquid removal apparatus (100) may not remove liquid, e.g. failure of vacuum (109) or blockage of filter belt (102). In such instances it is detrimental to pass the unprocessed slurry to conveyors (145) and thus an emergency 'dump' chute (149) is provided for deflecting unprocessed slurry. The dump chute (149) is positioned below the outlet (126) and above lateral conveyor (145a) and consists of a pivoting deflector (149a) that opens above lateral conveyor (145a) to redirect product from outlet (126) into pipe (149b) which passes back to the slurry source or a holding tank for re-processing.

In a preferred embodiment, the dump chute (149) may be connected to a controller (not shown) configured to open the deflector (149a) automatically in response to detecting failure of components or liquid levels at outlet (126) exceeding predetermined thresholds. Alternatively, the dump chute (149) may be activated manually by a user.

FIGS. 7-13 also show a vent tank (147) open at tits upper end to atmosphere. The vent tank (147) allows air into pipe (180b) when recirculating filtrate when relief valve (118) is closed which allows pump (181) to pump the filtrate through pipe (180b) without working against a vacuum.

As the vent tank (147) is at atmospheric pressure, when the vacuum (109) operates, the flap (119) will be held closed. The liquid filtrate (52) is then drawn into the low pressure chamber compartment (182c) until it reaches a level where the weight of the liquid filtrate on the flap (119) exceeds the pressure differential between the low pressure chamber (107) and atmosphere. The flap (119) will then open and allow liquid filtrate to exit until the weight of liquid filtrate on flap (119) falls below the pressure differential wherein the flap (119) closes. In this way, the level of liquid filtrate is maintained at a substantially constant level during operation and thus does not rise and enter the vacuum (109) or rise to immerse the transport deck (105) or filter belt (102). The use of such a flapper relief valve (118) avoids the need for complicated pumping and valve configurations for removing filtrate. While not shown, similar flapper relief valves are provided for the liquid outlets (117) in the other compartments (182a, 182b). It will be appreciated that such a flapper relief valve (119) may be used on any vacuum-base liquid removal apparatus and not just the liquid removal apparatus embodiments described herein.

A series of filter belt rollers (122a-e) support and tension the filter belt (102) and one of the rollers (122a) may be driven (shown more clearly in FIG. 16) to assist the transport deck (105) in moving filter belt (102).

In a preferred embodiment, a belt washer (146) is provided which sprays water or other cleaner onto the filter belt (2) as it passes to clean off slurry residue thereon.

FIGS. 8-13 are partial external views of the liquid removal apparatus (100).

The liquid removal apparatus (100) has a series of access walkways (101) that facilitate maintenance and observation during operation and a conveyor (145) for carrying away filtered product.

The liquid removal apparatus (100) is sufficiently efficient that it can be sized similar to an ISO standard 20 ft or 40 ft shipping container while still achieving a throughput and an adaptability comparable to large in-situ systems or multiple systems. This reflects the significance of providing a liquid removal apparatus (100) with a highly efficient liquid removal configuration, i.e. as the liquid removal apparatus (1, 200, 300, 100) is very efficient, it is capable of being packaged in a portable configuration, in contrast to many of the prior art apparatus.

In many existing liquid removal or dewatering applications, the sheer scale of the slurry volumes requiring treatment and the attendant size of the prior art apparatus necessary to accommodate such slurry volumes requires use of an in-situ, fixed apparatus. Consequently, there are clear adverse implications on the flexibility, cost overheads and real-estate resources in comparison to portable apparatuses.

As shown most clearly in FIGS. 1-13, the housing (106) is sized as a conventional ISO standard twenty or forty foot container and includes twist-lock fittings (179) at the six apices of the housing (106). The twist-lock fittings (179) can thus be connected to twist-locks on trucks, train cars, ships or other transporters. The liquid removal apparatus (100) is thus easily transportable.

The liquid removal apparatus (100) has a high ratio of filter belt (102) area exposed to a pressure differential per footprint area of the apparatus housing (106) as the transport deck (105) is located entirely within the low-pressure chamber (107) and at the top thereof.

In the aforementioned preferred embodiments of liquid removal apparatus (1, 100, 200, 300,) shown in FIGS. 1-13 the transport deck (5, 105, 205 or 305) includes a number of transverse support beams (11, 111, 211 or 311) that can be circulated to move with and support the respective filter belt (2, 102, 202 or 302). In an alternative embodiment (not shown) it is envisaged that the transport deck (5) could have a series of rollers for supporting the filter belt (2, 102, 202 or 302) instead of the support beams (11), at least one of the rollers being driven.

In a further alternative embodiment, a liquid permeable support belt (e.g. a woven material, metal or plastics chain-link belt) could be used instead of the support beams (11, 111, 211 or 311) to support the filter belt (102).

Figure 14A:
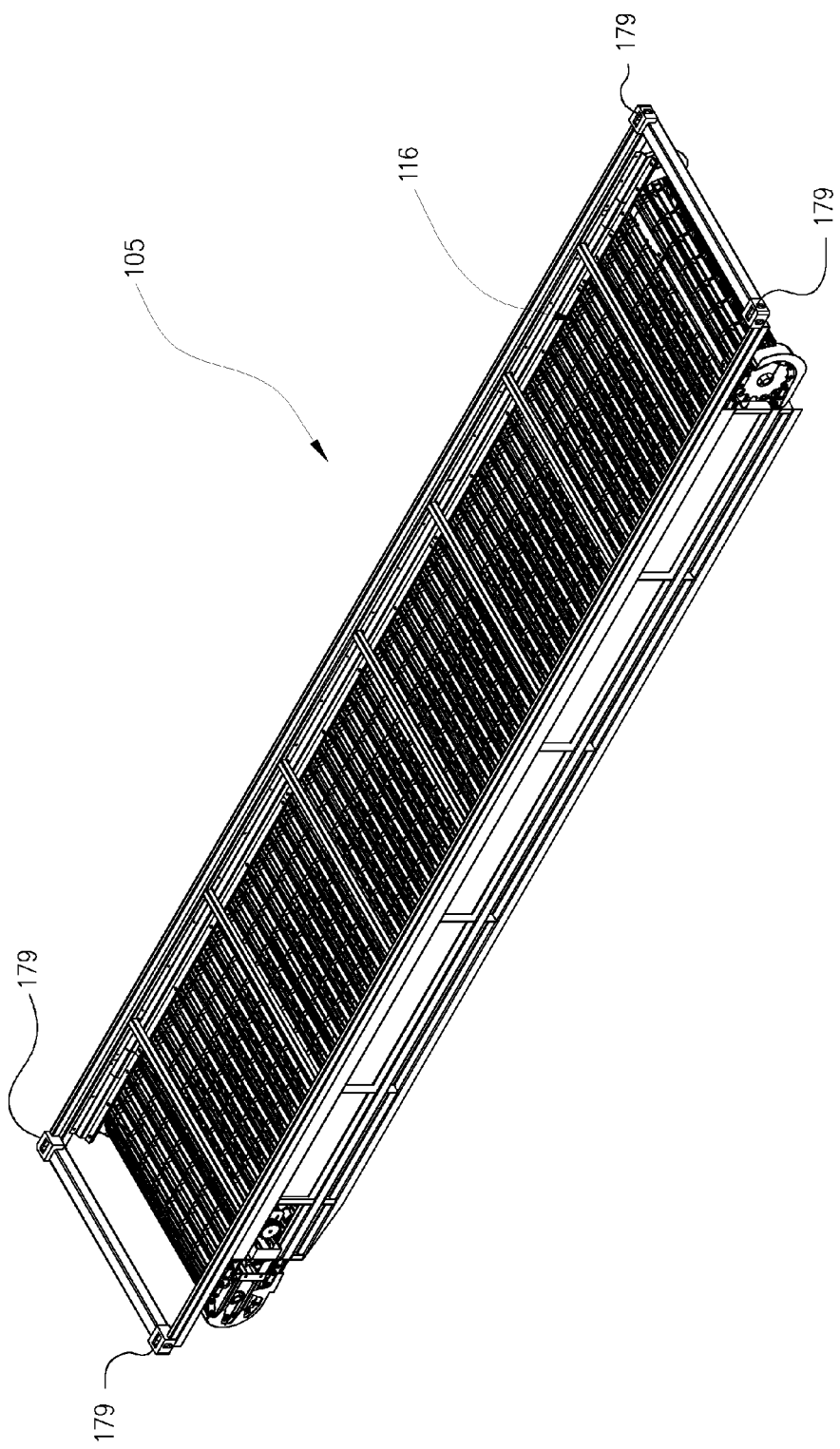
FIGS. 14a and 14b respectively show an isometric and plan view of a transport deck for use in the liquid removal apparatus shown in FIGS. 7-13.
Figure 14B:
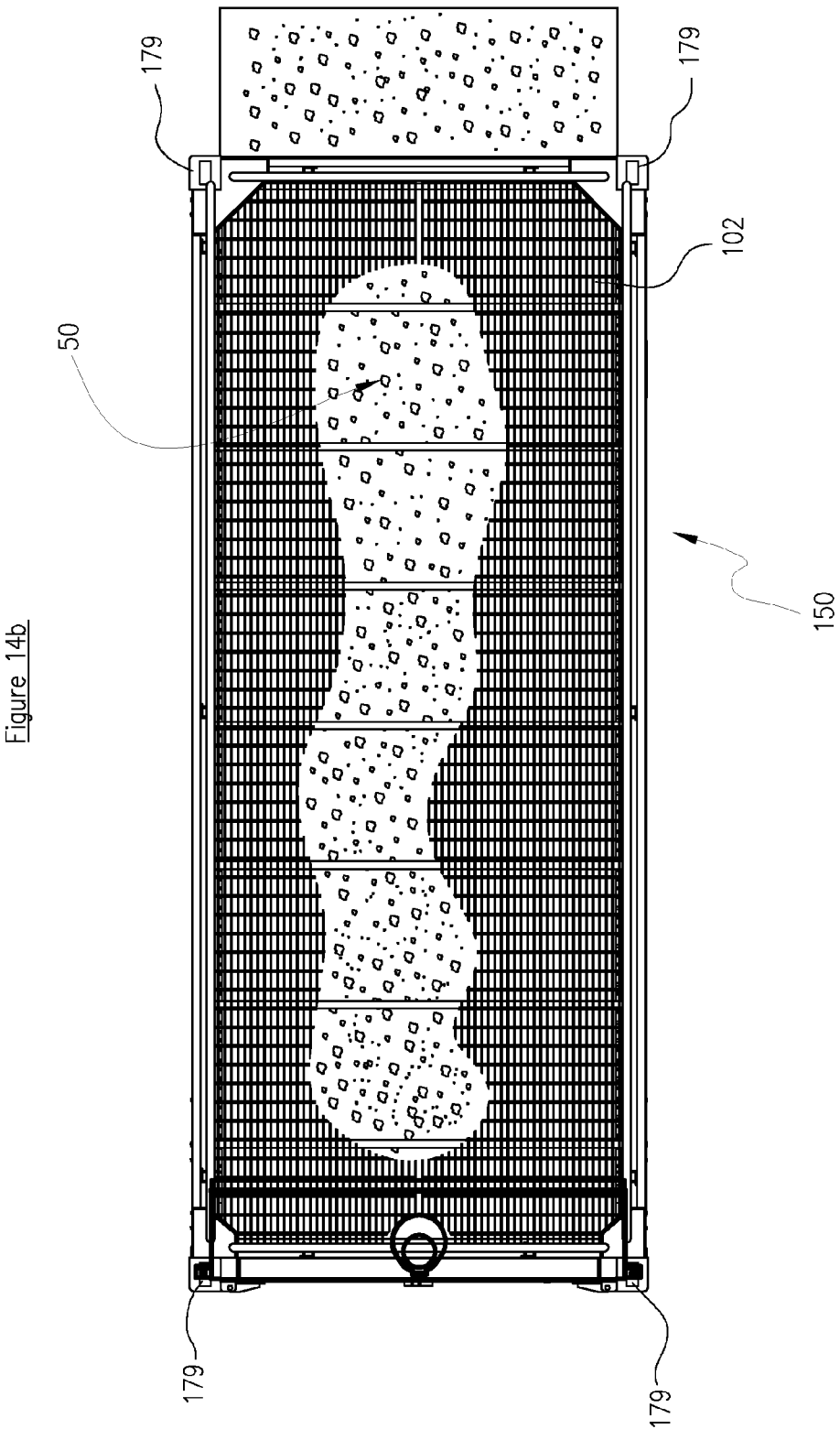

FIGS. 14a and 14b show enlarged views of the transport deck (105) and upper twist-lock fittings (179).

FIG. 15 shows an isometric view of the liquid removal apparatus (100) with the filter belt (102) in place (FIG. 15a) and with the upper level of the transport deck (105) removed (FIG. 15b) so that the first aperture (108) can be clearly seen. The perimeter of the first aperture is bounded by the emphasised bold black lines which correspond to the edges of the four sealing strips (124a, 124b) which define the upper perimeter of the low pressure chamber (107). It can be seen that the first aperture (108) extends over almost the entire housing (106).

FIGS. 16a and 16b show enlarged isometric views of either end of the liquid removal apparatus (100) shown in FIG. 15b.

Figure 17:
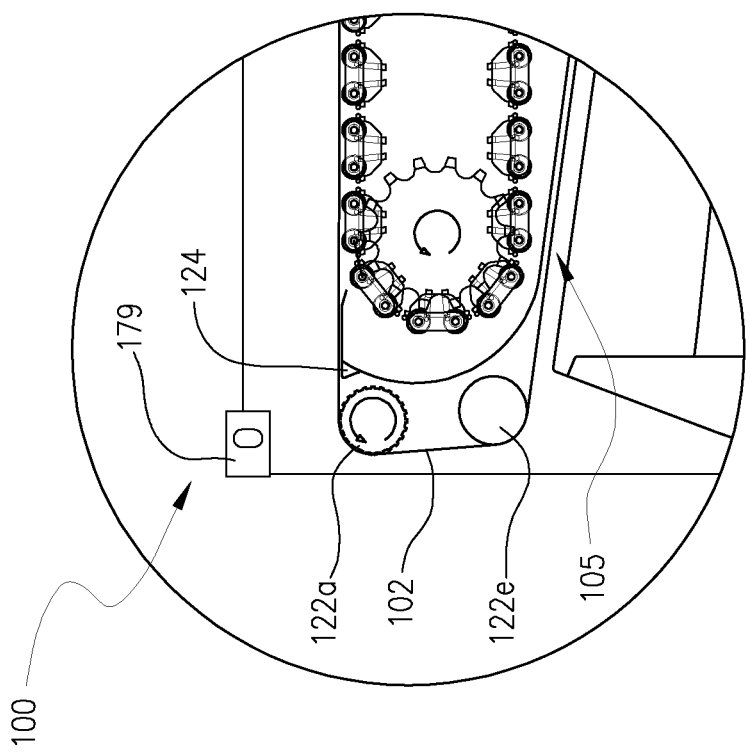
FIG. 17 is an enlarged view of a driven filter belt roller of the liquid removal apparatus of FIG. 7.

FIG. 17 shows an example of a driven filter belt roller (122a) which may assist the transport deck (105) in moving the filter belt (102).

Figure 18:
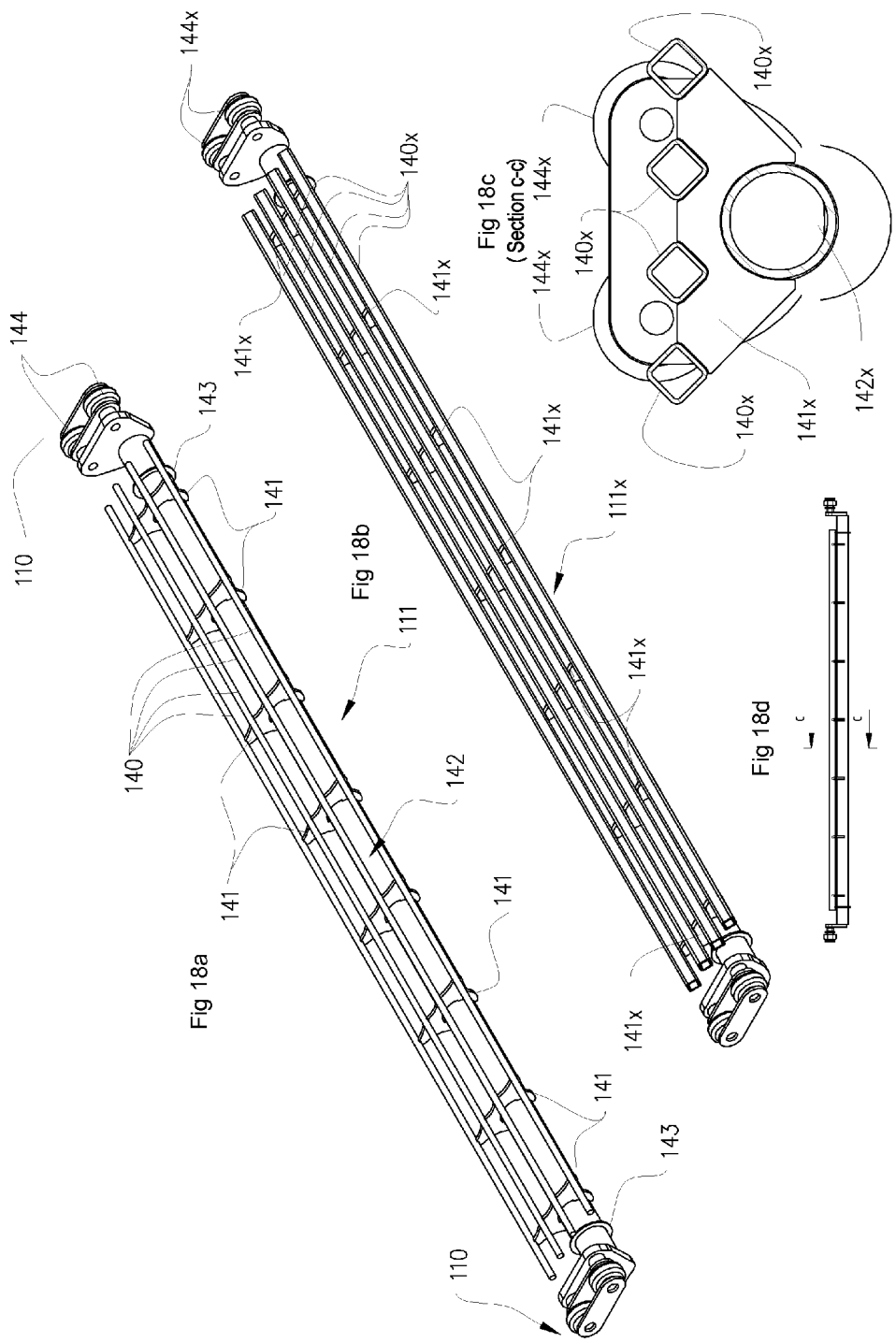
FIGS. 18a and 18b respectively show two alternative embodiments of one of the support beams and connected drive chains that form part of the transport deck of FIGS. 14 and 17.
FIGS. 18c and 18d respectively show a cross-sectional and side elevation views of the transport deck of FIG. 18b.

FIG. 18a shows an enlarged view of a support beam (111) consisting of support bars (140) welded to cross-braces (141) that are in turn welded to a tubular main beam (142). The support bars (140) are aligned with the plane of the central rotational axes of the corresponding drive chain wheels (144). Barrier flanges (143) are provided on the tubular main beam (142) to help prevent filtrate from travelling along main beam (142) toward the drive chain (110). The support beam (111x) shown in FIG. 18 has support bars (140x) that are square in cross-section rather than circular. 'Square' bars (140x) have proven more resilient and effective in testing than circular bars (140).

As mentioned previously, it is important that the drive chains (110) and other bearing components are protected from the slurry (50) which may be abrasive and/or corrosive and could potentially damage the drive chain (110). It may also be important to lubricate the drive chains (110) in the drive chain guide (127). Thus, a lubrication system for the drive chain (110) is provided which inhibits ingress of liquid and/or slurry onto the drive chain (110) and/or drive chain guide (127) and lubricates the chain drive (110). The lubrication system is shown in detail in FIGS. 19-21. The filtrate (52) is shown as clear droplets while lubricating oil (150) is shown as solid black droplets.

Figure 20:
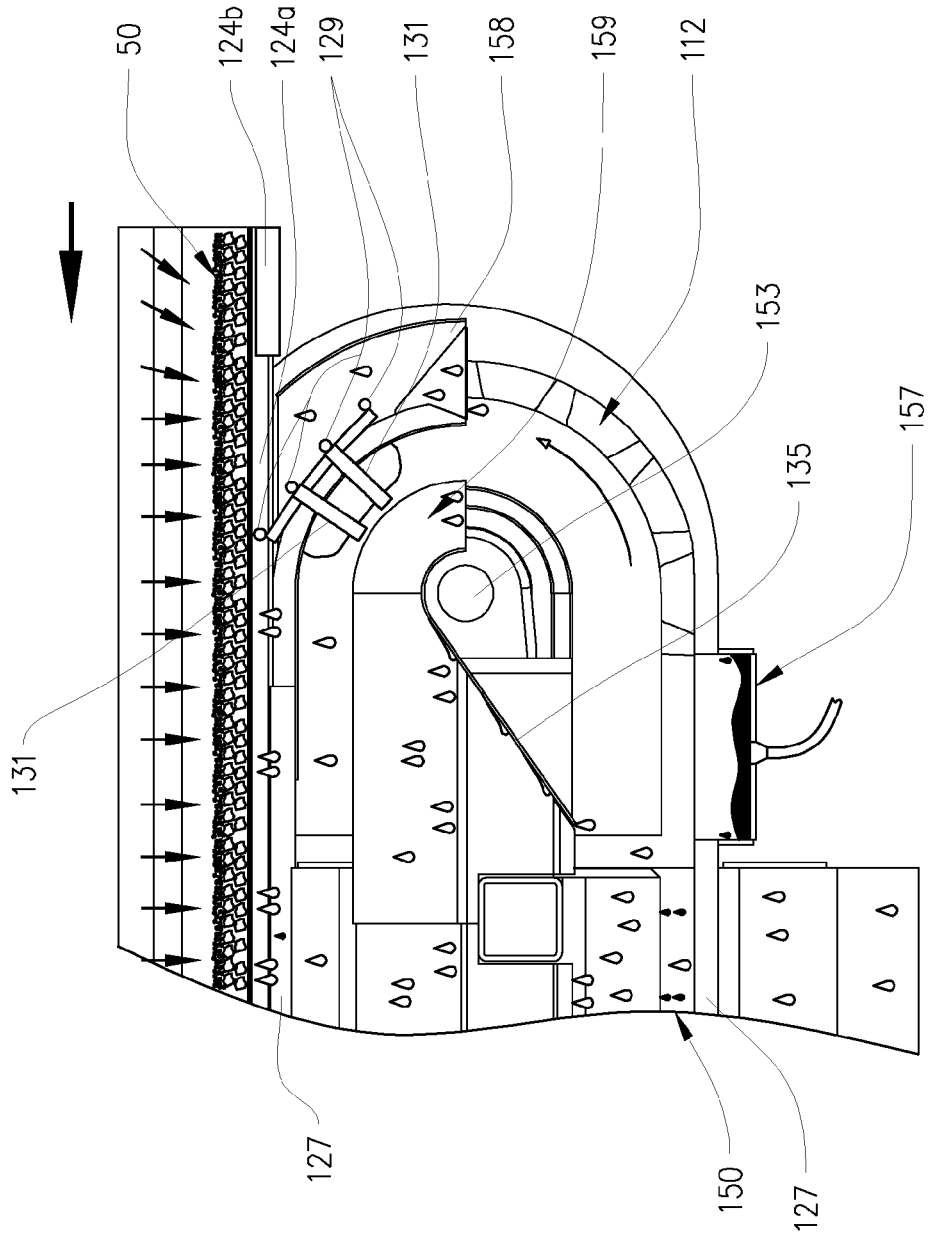
FIG. 20 is an enlarged side elevation of a partial longitudinal cross-section (as indicated in FIG. 10) of the transport deck of FIG. 20.
Figure 21:
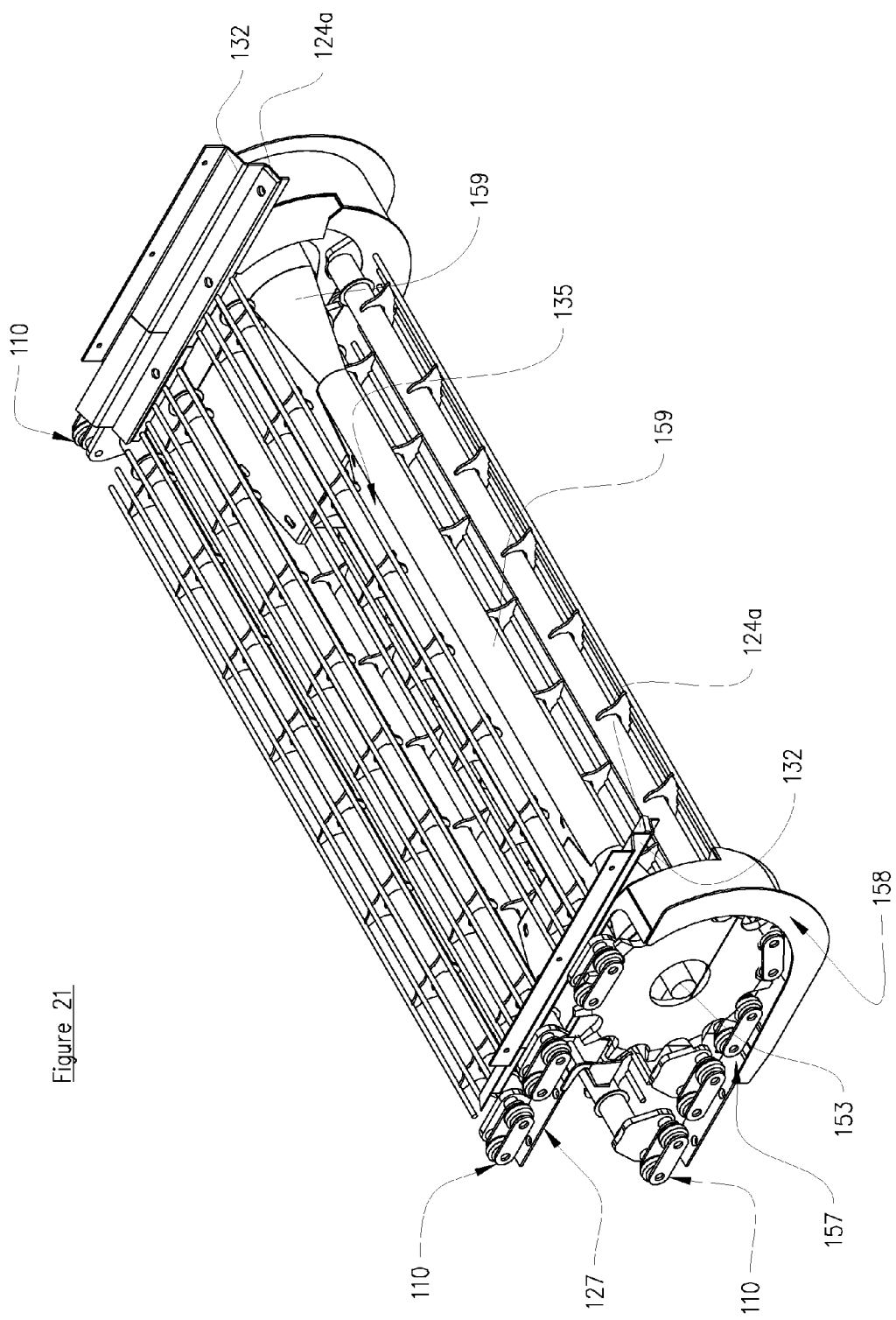
FIG. 21 is an enlarged partial isometric view of one end of the transport deck of FIGS. 20 and 21 showing sealing and lubricating systems.

FIG. 21 is a partial cutaway perspective view of the infeed end of the support system (104) and transport deck (105). The support beams (111y) shown in FIGS. 19 and 20 differ slightly from the support beams (111) shown in FIG. 17.

Figure 11:
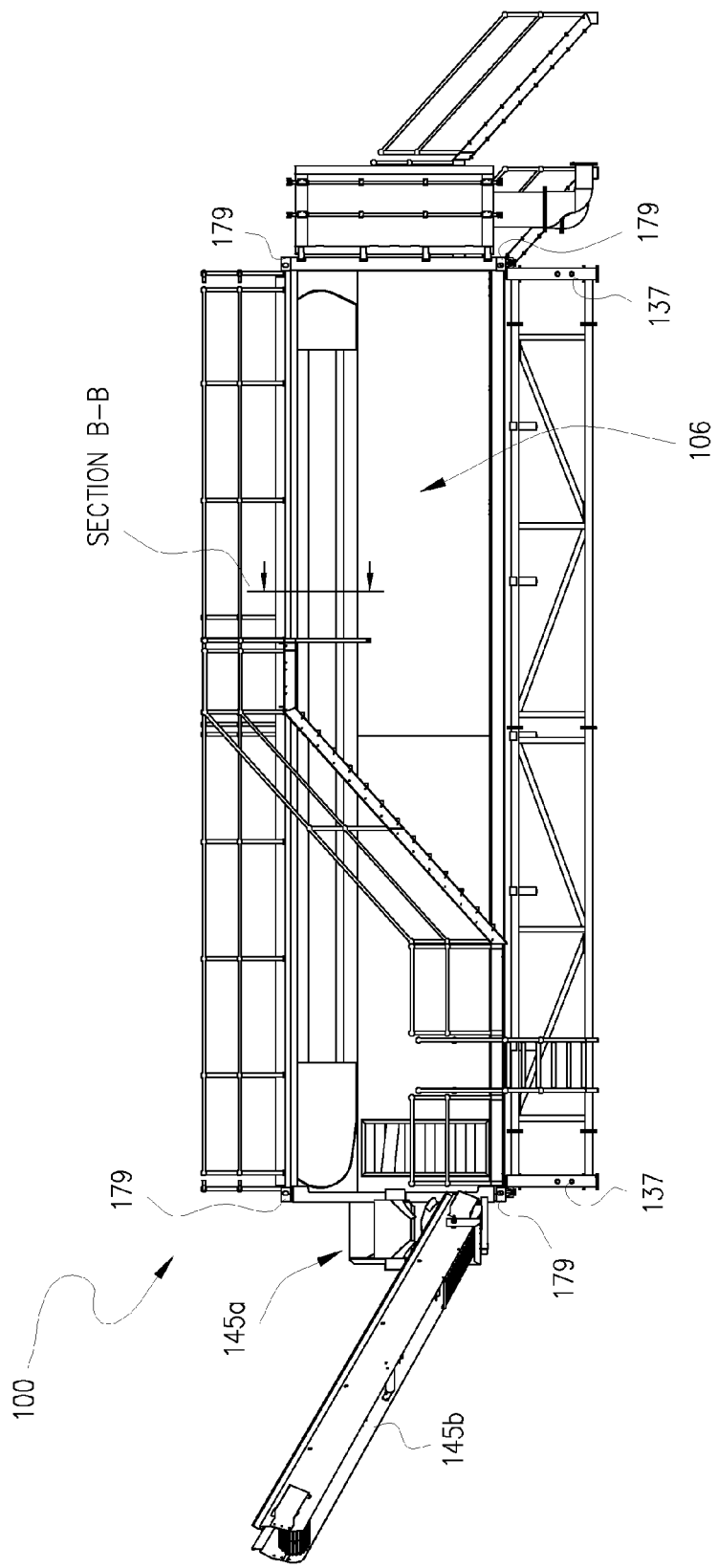
FIG. 11 is a side elevation of the liquid removal apparatus of FIGS. 7-10.
Figure 12:
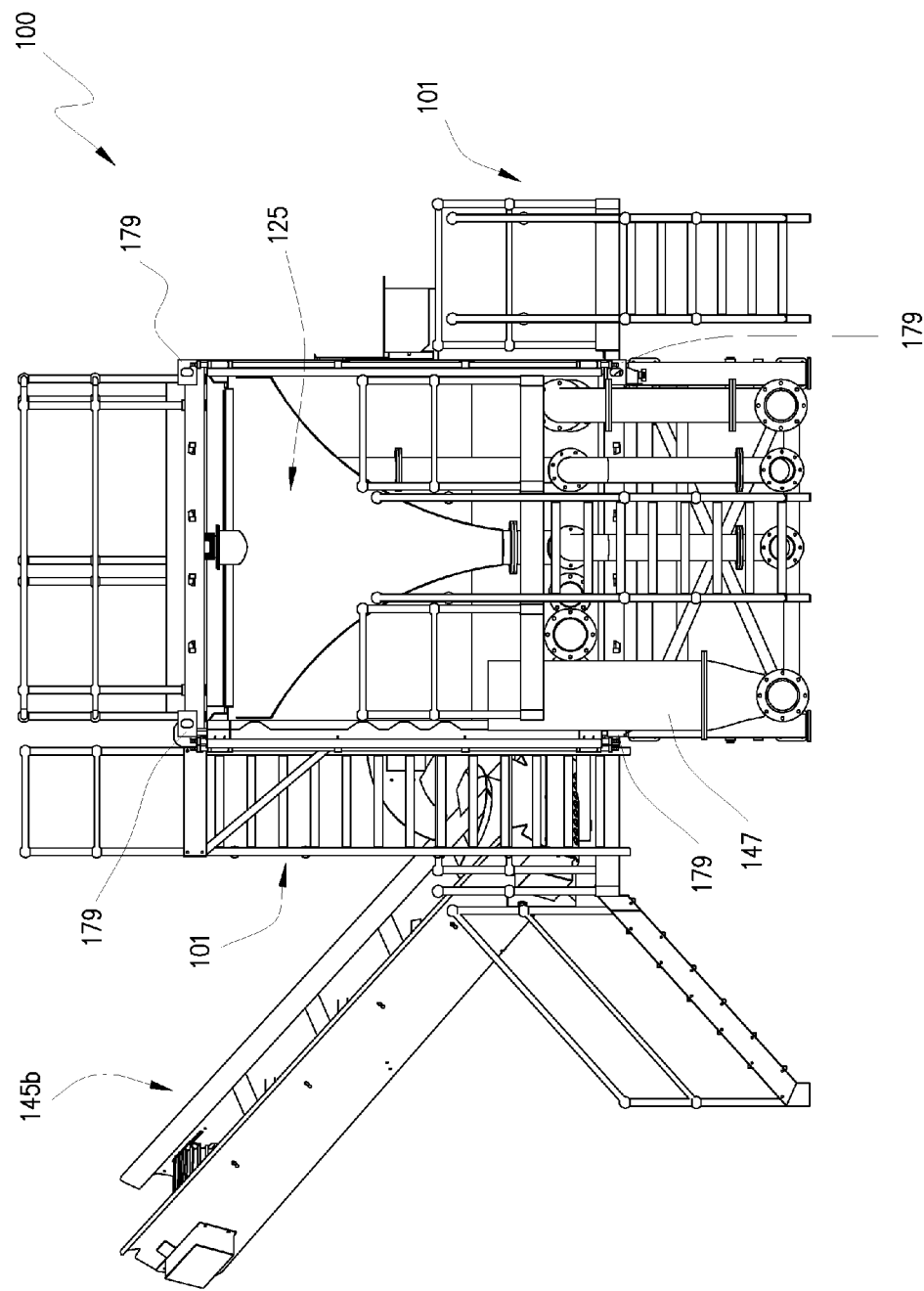
FIG. 12 is an end view of the slurry infeed end of the liquid removal apparatus of FIGS. 7-11.
Figure 13:
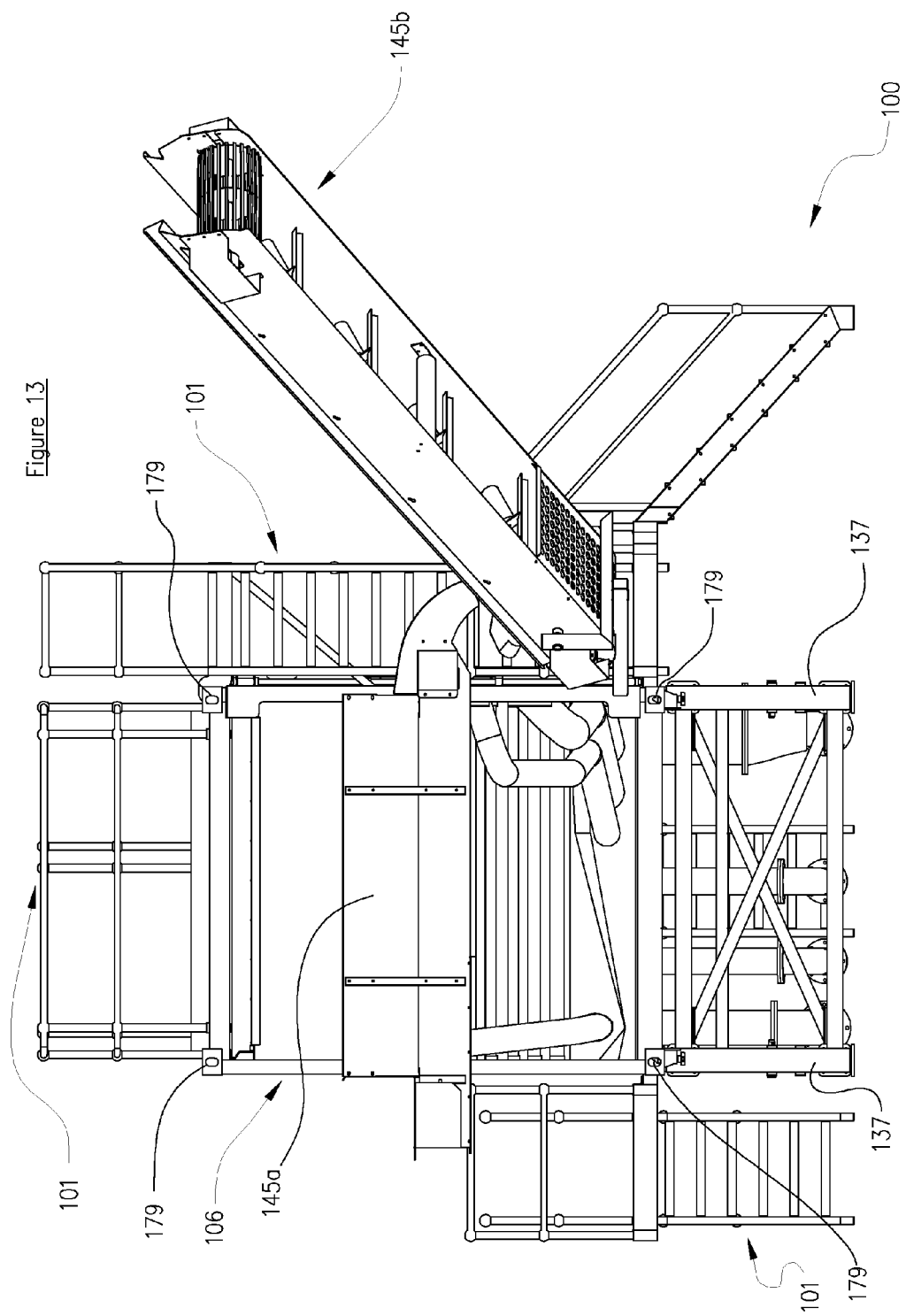
FIG. 13 is an end view of the product outlet end of the liquid removal apparatus of FIGS. 7-12.
Figure 19:
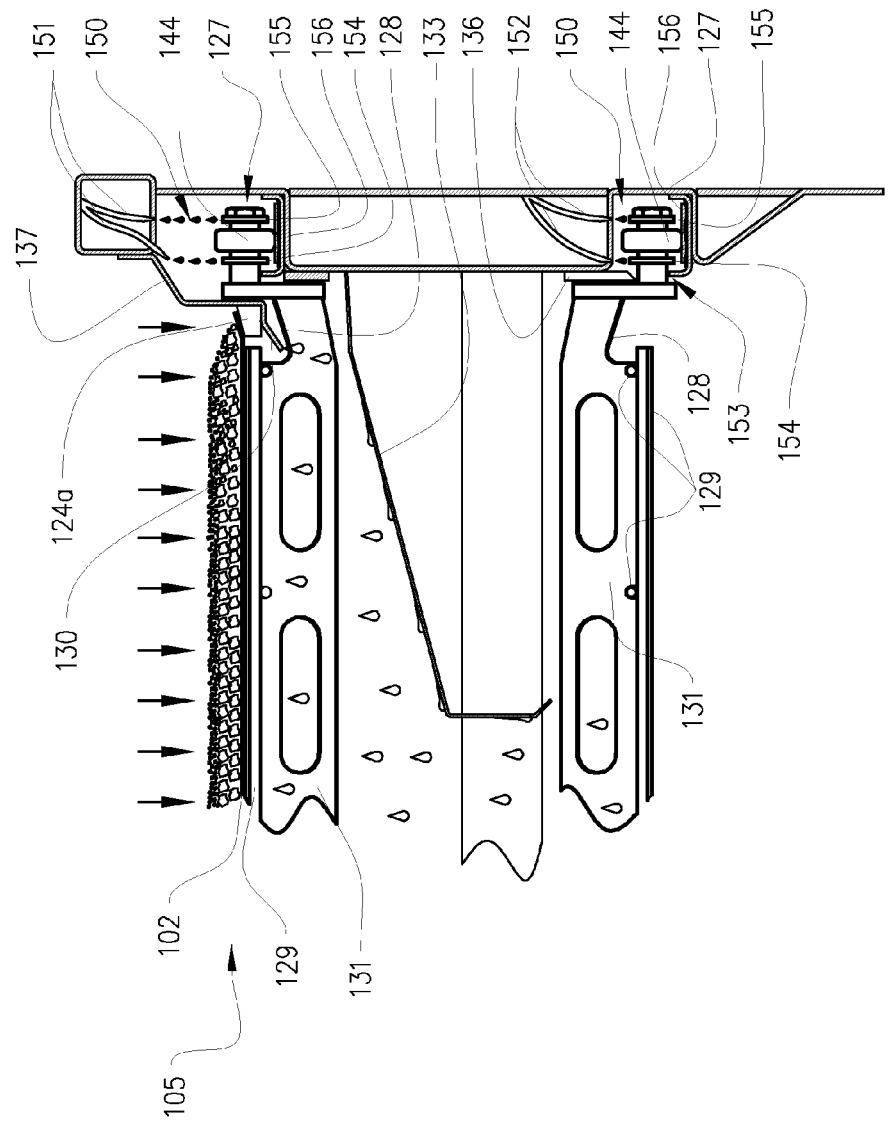
FIG. 19 is an enlarged side elevation of a partial transverse cross-section (as indicated in FIG. 11) of a transport deck.

FIG. 19 is an enlarged side elevation of the transverse cross-section through section B-B shown in FIG. 11. FIG. 20 is a side elevation through the longitudinal cross-section A-A indicated in FIG. 10 and shows one end of the support system (104). FIGS. 19 and 20 show the lubrication system and the path of oil travel over the drive chain (110).

The lubrication system shown includes upper (151) and lower (152) sets of oil input pipes extending from an oil supply (not shown) into the drive chain guides (127) and positioned above the drive chains (110) to drop lubricating oil (150) onto the drive chain axle (153), bearing (154), links (155) and wheels (144) during operation. Multiple oil pipes (151, 152) are provided and spaced along the length of the chain guides (127) to supply sufficient oil (150) to the chains (110). The base of the drive chain guides (127) includes a running wear plate (156) and is 'U'-shaped in transverse cross-section to collect the oil (150) therein and provide a lubricating bath for the drive chain wheels (144) as the drive chain (110) travels in guide (127). The drive chain guides (127) extend between roller sprockets (112) at either end of the transport deck (105) and terminate above an oil sump (157) that drains to an oil separator (not shown) that separates any residual liquid filtrate in the oil. The oil is then passed to a recycling pump (not shown) that re-circulates the oil (150) back to the inlet pipes (151, 152) and back onto the drive chain (110). The sprockets (112) are sealed from the filtrate (52) and slurry (50) by shrouds (158) that also drain to the sump (157).

It will be appreciated that the oil sump (157) may also drain to the supply or to waste depending on the requirements of the operation.

The drive chains (110) and sprockets (112) are sealed from the filtrate (52) and slurry (50) by a sealing system. This sealing system consists of longitudinal upper sealing strips (124a), skirts (132), end strips (124b), deflectors (130), shrouds (158) and axle cover (159). The first aperture (108) is most clearly seen in FIG. 15.

The longitudinal upper sealing strips (124a), deflector (130) and skirts (132) cover the drive chains (110) and guides (127). These strips (124a) are joined at their longitudinal ends to end strips (124b) that extend transversely and together with sealing strips (124a) define the upper periphery of the low pressure chamber (107) and thus the perimeter of the aperture (108). The sealing strips (124a) are inclined downwards toward the support bars (129) such that the lateral edges of the filter belt (102) slide along above the sealing strips (124a). The lateral edges of the filter belt (102) are thus directed slightly upward with the incline of the strips (124a) and help to direct slurry on the edges back toward the centre under gravity and reduce the likelihood of slurry (50) flowing between filter belt (102) and seal (124a) and potentially damaging the seal (124a).

The skirts (132) extend below the sealing strips (124a) to form deflectors (130) extending into a recess (128) in the support beam plates (131) and thus direct liquid toward the centre away from the lower drive chains (110). Further lower deflectors (133) extend below the skirts (132) and further under the transport deck (105) toward the centre of the support system (104) and low pressure chamber (107). An axle cover (159) and deflector (135) extend between the left and right hand side sprockets (112) to respectively cover the drive axle (153) and deflect falling liquid toward the centre of the low pressure chamber (107). A wear strip (136) is also positioned between the lower chain guides (112) and the support beams (111) to minimise wear therebetween.

The sealing system shown in FIGS. 19-21 may thus protect the vulnerable drive components of the liquid removal apparatus (100) from potentially damaging liquid and contaminants.

Figure 22:
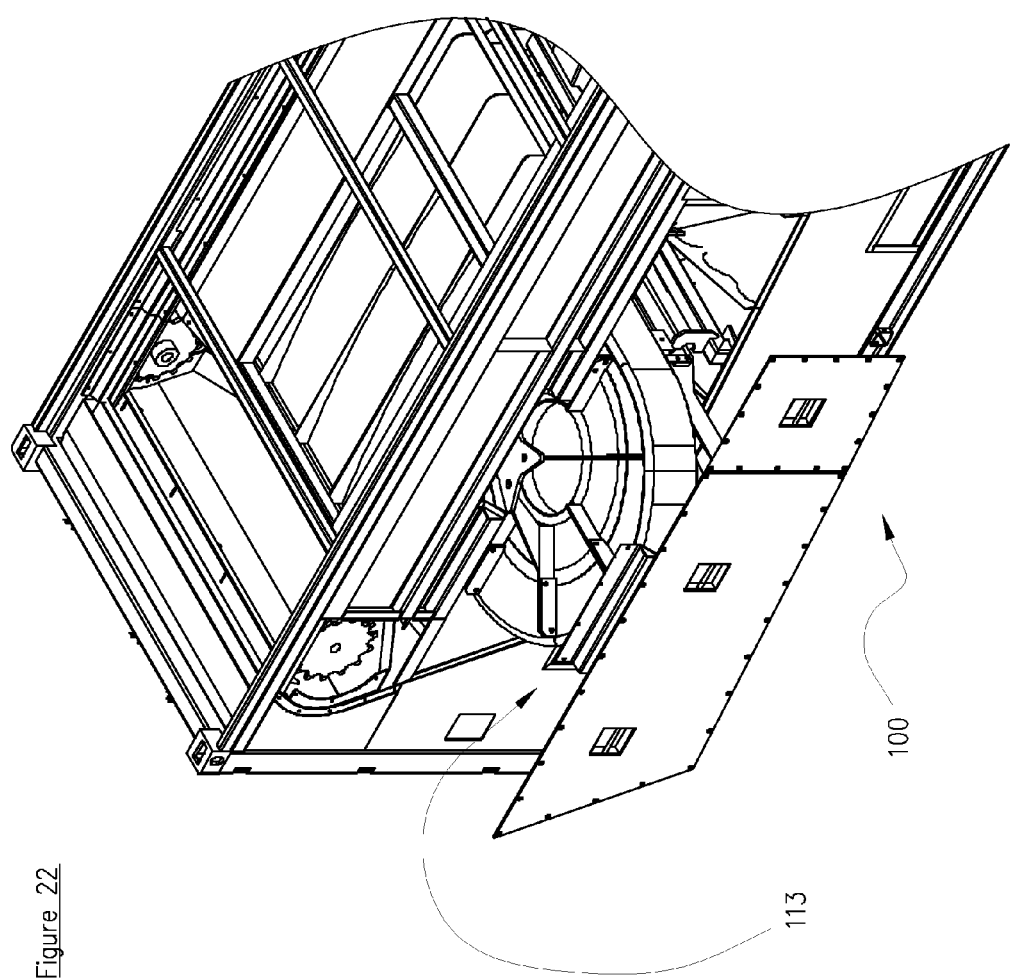
FIG. 22 is an enlarged partial perspective view of the vacuum fan of the liquid removal apparatus of FIGS. 7-13.

FIG. 22 shows the ducted extraction fan (113) that acts to evacuate air form the low pressure chamber (107) to generate the pressure differential across the filter belt (102).

Figure 23:
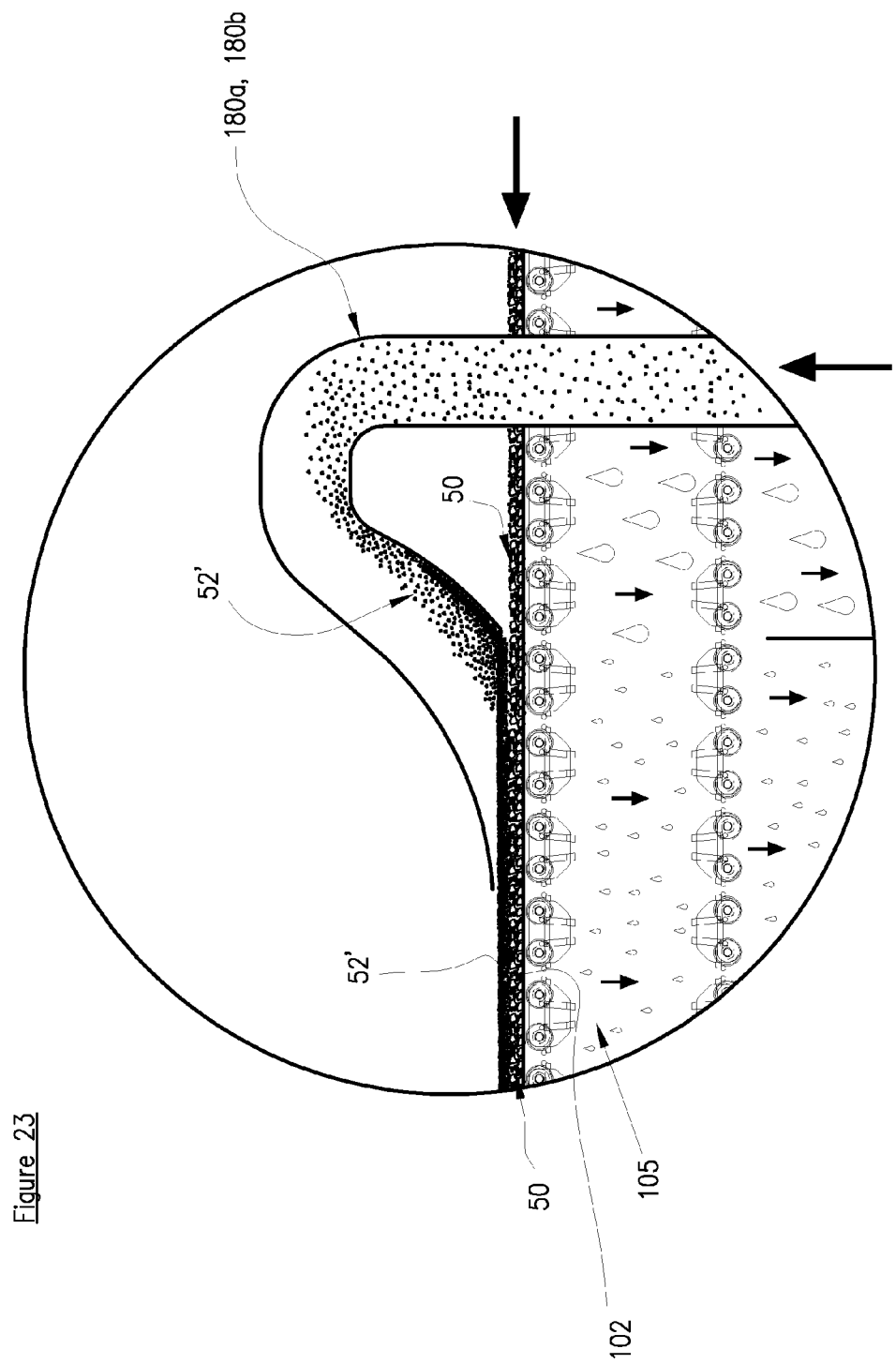
FIG. 23 is an enlarged side elevation of a modification to the liquid removal apparatus that uses a filtrate re-circulation system.

FIG. 23 shows one of the filtrate re-circulation tubes (180a or 180b) (shown in FIG. 7) that passes the liquid filtrate (52) from the corresponding liquid outlet (117) and compartment (182b or 182c respectively) for depositing onto the top of the slurry (50) above the adjacent compartment (182a or 182b respectively). This filtrate (52') may still contain particulate or contaminants which may require more than one filtering process to remove. The filtering of the 'filtrate' (52') is thus enhanced by being deposited on top of the slurry (50) as the larger particles in the slurry (50) act as a filter for the smaller particles in the filtrate (52'). The method of using recirculation tube (180a or 180b) to separate the liquid from the slurry involves:
- applying the slurry across the filter belt (102);
- applying a pressure differential across the filter belt (102);
- collecting liquid filtrate (52) from the loaded belt portion (3) above compartment (182b or 182c), the liquid filtrate (52) being drawn from the slurry by the pressure differential;
- re-applying some of the collected liquid filtrate (52') onto the filter belt (102) above the adjacent compartment (182a or 182b respectively).

The above multi-stage method results in a significant reduction in the quantity of fine particles present in the liquid filtrate by using a 'physical' process. The quantity of flocculant required is vastly reduced from a comparable single-stage process, even for a simple two-stage re-cycling. As polymer flocculant additives are expensive when used on industrial scales, the above method results in significant cost-savings. This multi-stage procedure is useful in liquid removal from composite slurries having a high content of 'large' solids that can act as a filter medium for a finer component, e.g. wood pulps and steel mill waste.

Figure 24:
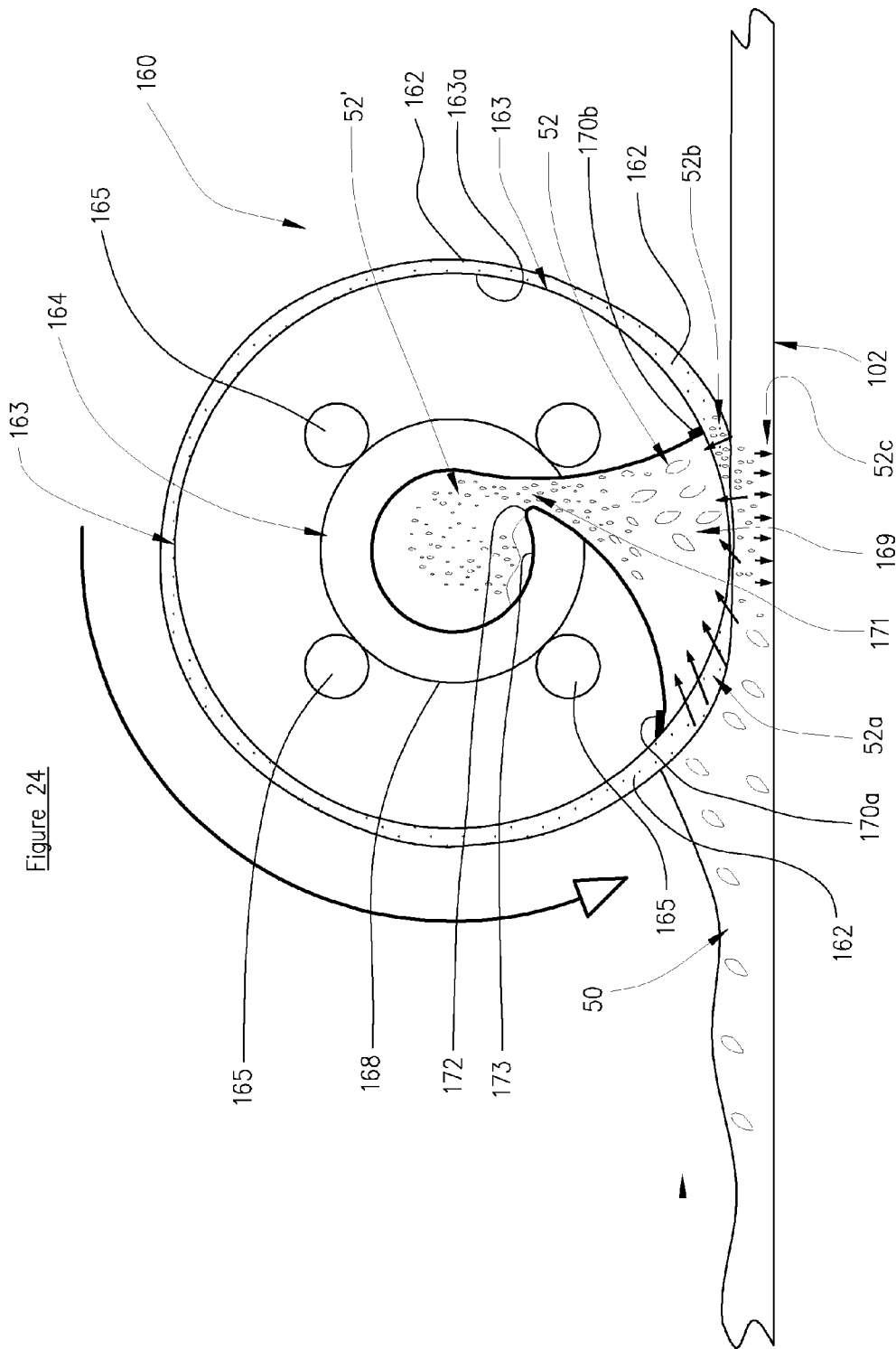
FIG. 24 is a side elevation of a cross-section of a vacuum filter roller of the liquid removal apparatus of FIG. 7.
Figure 25:
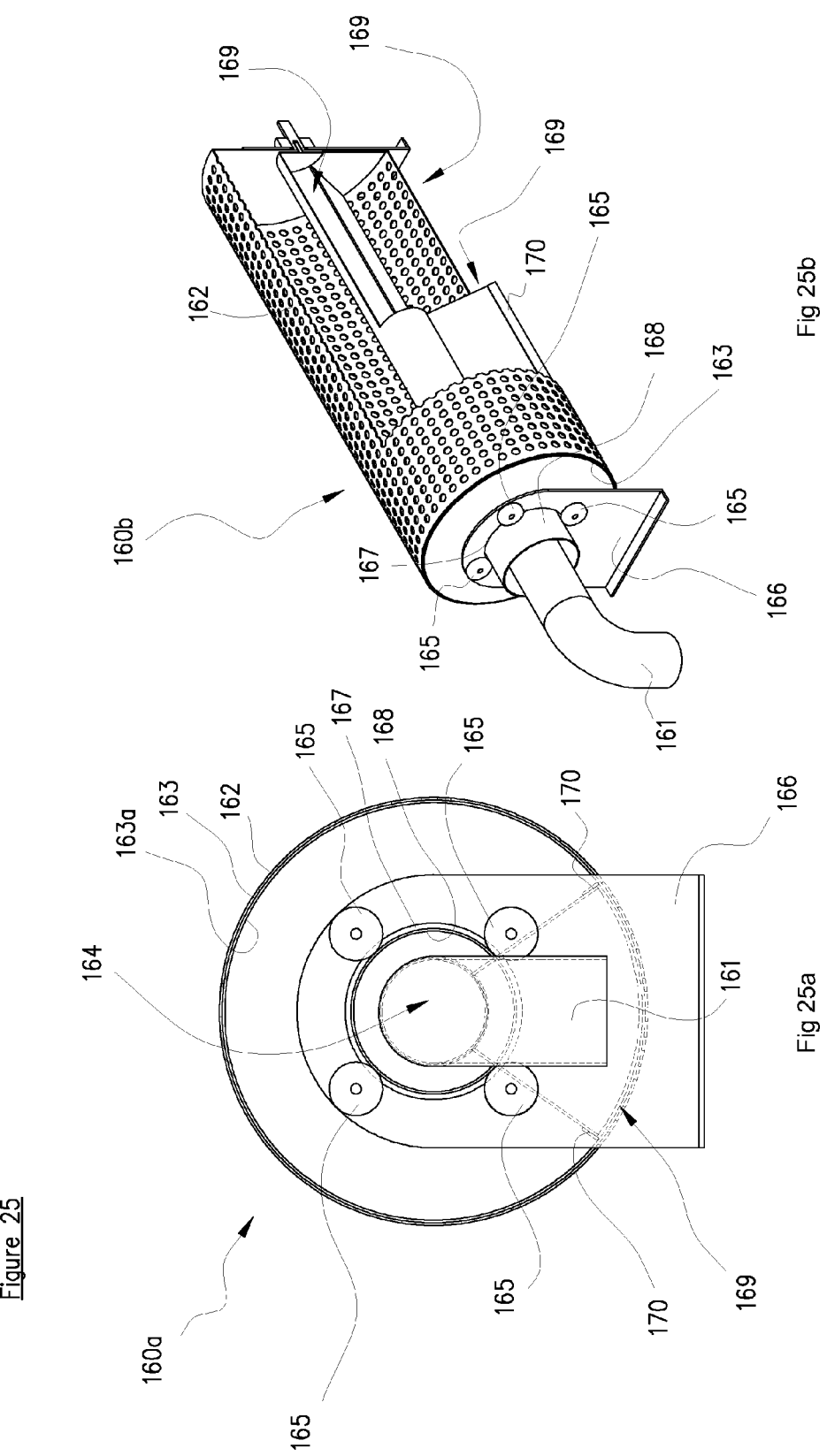
FIGS. 25a & 25b respectively show end and partial perspective views of the vacuum filter roller of FIG. 24.

FIGS. 24 and 25 show a felt vacuum rollers (160) similar to the rollers (160a or 160b) shown in FIG. 7. The felt vacuum roller (160) is a cylindrical roller with an inner vacuum chamber (164), and a rotatable outer surface provided in the form of outer foraminous tube (163). Rotating bearings (165) are fixed to a frame (166) (shown in FIG. 25) which includes an aperture (167) through which a sleeve (168) of the outer tube (163) passes which bears on the bearings (165). The tube (163) is thus rotatable with respect to the vacuum chamber (164) which remains stationary.

The vacuum chamber (164) is connected to the low pressure chamber (107) via duct (161a or 161b) (shown in FIG. 7).

The outer tube (163) has a liquid-absorbent material sleeve provided in the form of felt outer (162) only shown in FIG. 24. The outer tube (163) is perforated or foraminous (see FIG. 25) and the inner vacuum chamber (164) is in fluid communication with a portion of the felt outer (162) via a longitudinal conduit provided in the form of chamber intake (169), The chamber intake (169) extends from the inner vacuum chamber (164) to the rotatable outer tube (163) inner surface (163a) at a position confronting a contact point of the felt outer (162) with the slurry (50) on the filter belt (102). As the filter belt (102) is moved by the transport deck (105), the felt outer (162) is placed in a light frictional contact with the upper slurry surface and the outer tube (163) is rotated solely by this frictional contact.

The felt outer (162) is slightly compressed by the initial contact with slurry (50) and absorbs some of the liquid content (52a). The vacuum pressure in the vacuum chamber (164) draws the liquid (52) (indicated by arrows (52b)) through the felt outer (162) and foraminous outer tube (163) into the vacuum chamber (164) via the chamber intake (169). As the roller rotates, the compressed portion (162x) of the felt material expands and sponges further liquid (52) (indicated by arrows (52b)) from the slurry (50). Furthermore, the slightly compressive nature of the roller (160) presses some liquid (indicated by arrows (52c)) through the filter belt (102) from the slurry (50) in contact with the filter belt (102).

The chamber intake (169) has a longitudinal leading edge sealing strip (170a) and an opposing trailing edge strip (170b) that seal the intake (169) against the interior surface (163a) of the outer tube (163).

The roller (160) shown in FIG. 24 differs from the roller in FIG. 25 in that the intake (169) is formed with an asymmetric transverse cross-section, with a higher leading edge (170a) to correspond to the higher upper surface of the slurry (50) and thereby maximise the liquid absorption as the slurry (50) passes under the roller (160). The chamber intake (169) is connected to the vacuum chamber (164) via a constricted portion (171) formed by a lip (172) which in turn provides a longitudinal recess (173) in the vacuum chamber (164) at a lower gravitational point than the lip (172). As liquid (52') is drawn into the vacuum chamber (164) as a mist or gas it passes through the constriction (171) at a lower pressure and thus some of the liquid will condensate in the vacuum chamber (164) to form droplets, some of which will fall into the recess (173) and are then evacuated to the low pressure chamber (107) via the duct (161).

The vacuum roller (160a or 160b) of FIG. 25 is slightly different to the roller (160) of FIG. 24 in that the intake (169) is formed with a symmetric fan-shaped cross-section so that the roller (160a or 160b) is not 'directional', i.e. the roller (160a, or 160b) can be used regardless of the rotation direction.

The vacuum rollers (160, 160a, 160b) of FIGS. 24-25 have been found to operate at an optimum level with slurries within a certain range of liquid content. Thus, as shown in FIG. 7, the rollers (160a, 160b) may be positioned at a distance along the loaded belt portion (3) matching the desired slurry liquid composition.

In one preferred embodiment, the felt outer (162) of the rollers (160a, 160b) is pre-soaked with a liquid which can thereby improve the initial performance of the liquid removal.

Polymer flocculants typically possess an electrical charge which attracts them to the slurry solids causing them to bind, or 'flocculate'. In applications using such flocculants, the felt vacuum rollers (160a, 160b) may make use of this property by using a felt outer (162) having a highly absorbent material (e.g. wool) with a hard-wearing synthetic guard material with a repulsive electrical charge to the flocculant, e.g. polyester. As a result, the rollers (160a, 160b) may be used to absorb liquid, whilst repelling the solids.

The vacuum rollers (160) are capable of processing a wide variety of slurry types having a fine particulate. However, it has been found that optimum filtering results are achieved only with a flocculant additive present, as without the flocculant, the finer particulate is collected by the felt along with the liquid and thus results in a poorly filtered liquid filtrate evacuated through the vacuum rollers (160).

Figure 26:
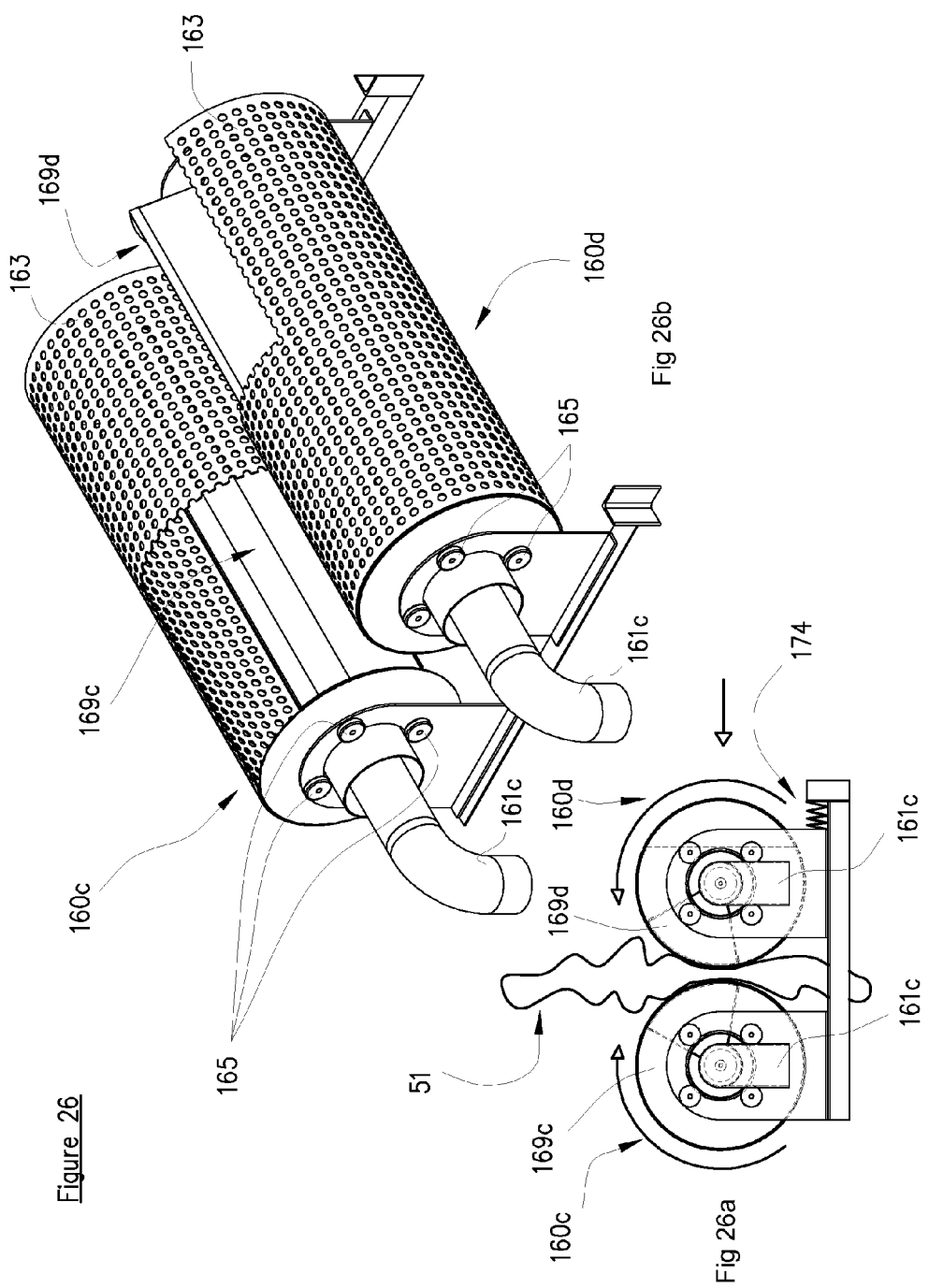
FIGS. 26a & 26b respectively show end and partial perspective views of a dual vacuum filter roller of the liquid removal apparatus of FIG. 7.

FIG. 26 shows the dual set of vacuum rollers (160c, 160d) shown in FIG. 7. The dual vacuum rollers (160c, 160d) are individually the same as the single vacuum rollers (160a, 160b) of FIG. 25. These rollers (160c, 160d) are contra-rotating with opposing intakes (169c, 169d) orientated upwards toward the falling product (51) to capture and treat the product (51) as it is passed therebetween. The rollers (160c, 160d) suck remaining liquid in the slurry (51) into the low pressure chamber (107) via duct (161c). The vacuum roller (160d) is slideably mounted and biased by spring (174) toward the roller (160c) such that the distance between the rollers (160c, 160d) is dynamically adjusted to avoid potential damage if particularly large and/or hard solids in the product (51) pass between the rollers (160c, 160d).

Figure 27:
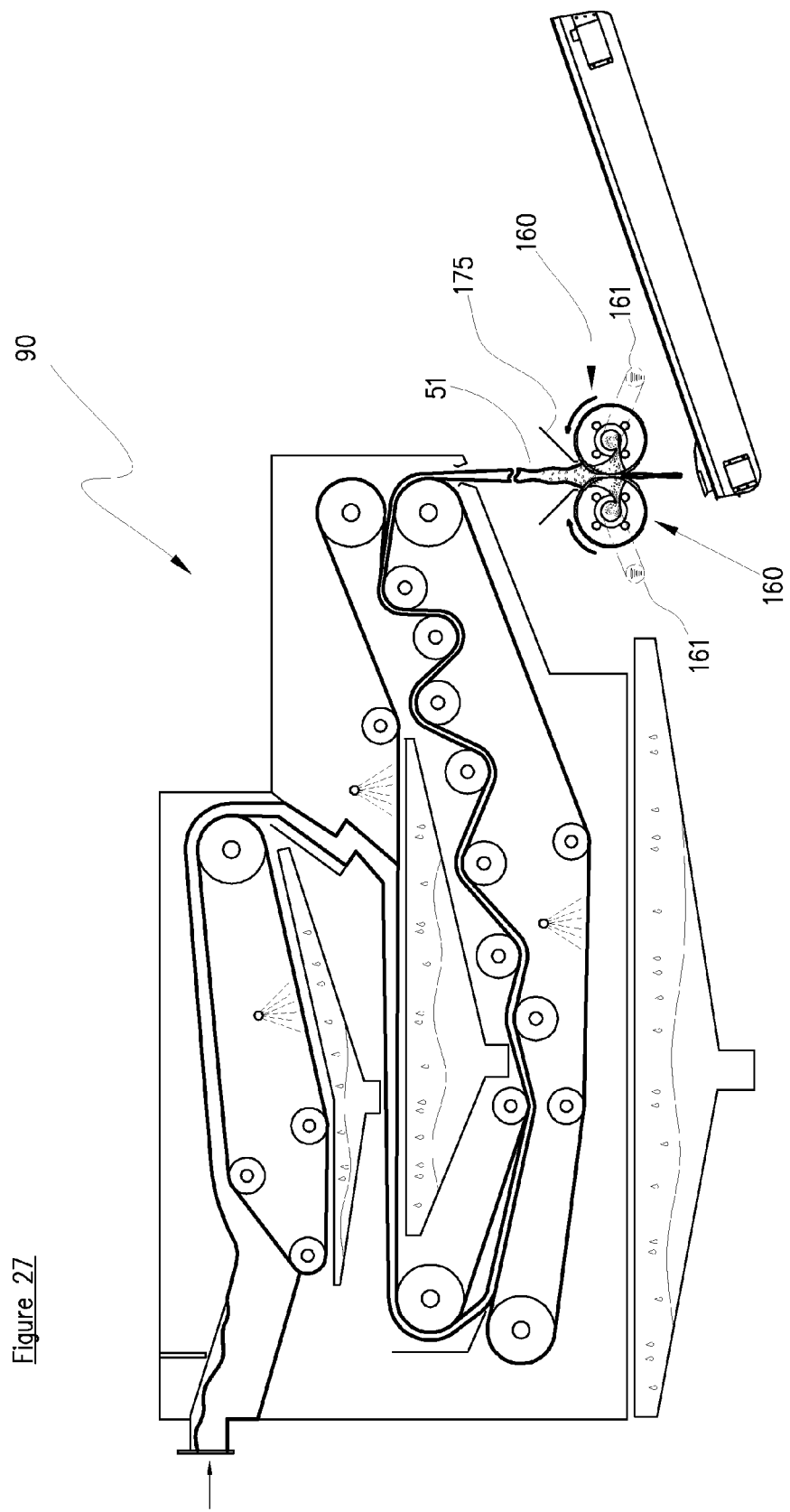
FIG. 27 is a side elevation of a longitudinal cross-section of a belt press liquid removal apparatus using the dual vacuum filter roller of FIGS. 24 and 26.

It will be apparent to one skilled in the art that the rollers (160, 160a, 160b, 160c, 160d) of FIGS. 7, 24, 25, and/or 26 may be applied to a variety of liquid removal/absorption processes in addition to the liquid removal apparatuses of the present invention. As an exemplary example, FIG. 27 shows the dual vacuum rollers (160c, 160d) being used in a belt press (90). A funnel (175) is used to guide the product (51) between the rollers (160).

Figure 28:
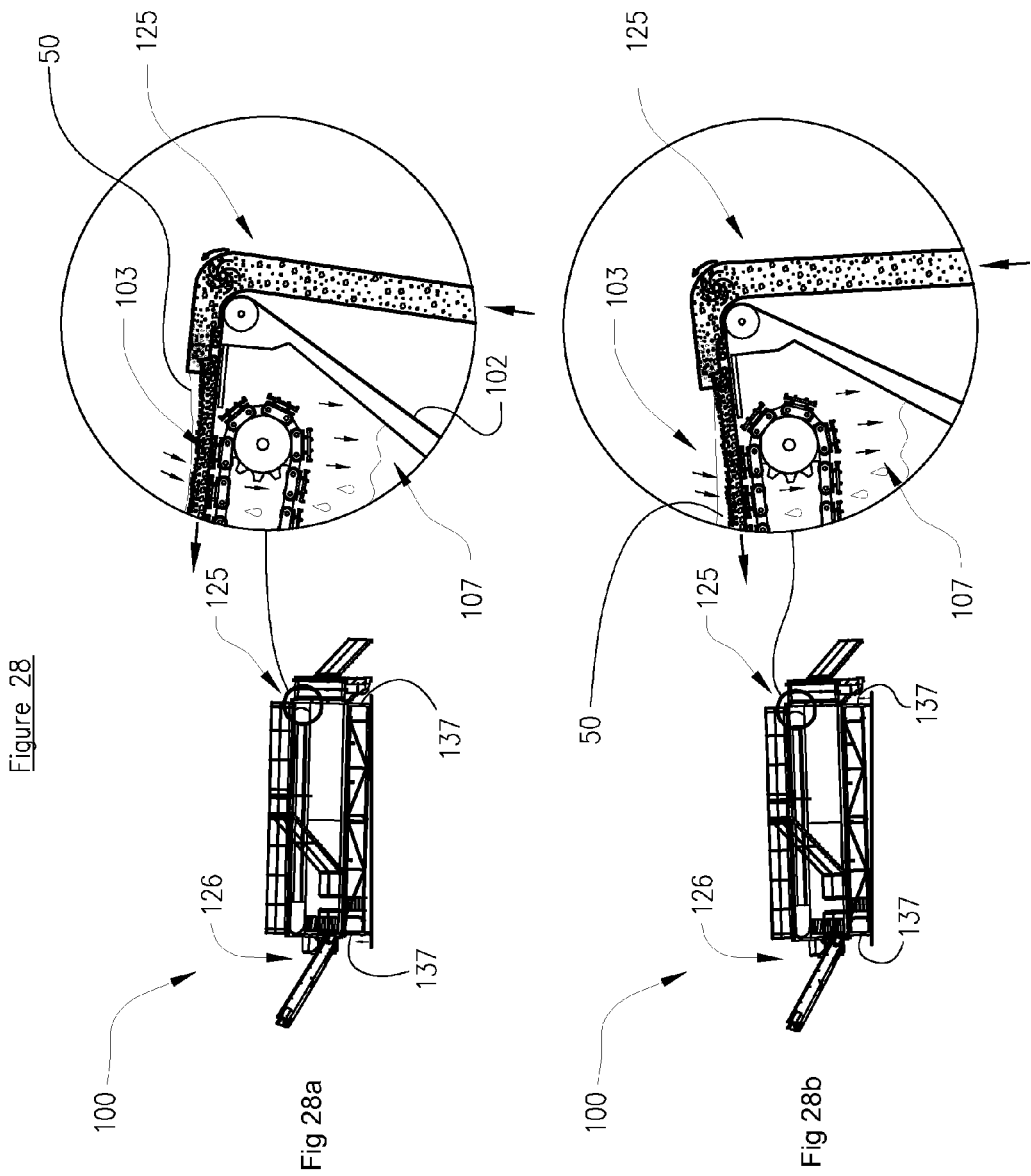
FIG. 28a &28b respectively show the effect of tilting the liquid removal system of FIGS. 7-13 tilted such that the manifold is lower and higher than the product outlet.

FIG. 28 shows the effect of tilting the liquid removal system (102) such that the inlet manifold (125) is lower/higher than the outlet (126), i.e. the loaded belt portion (103) being inclined relative to horizontal. Hydraulic jacks (137) (shown more clearly in FIGS. 7-13) lift or lower one or both ends of the apparatus (100) or alternatively the support system (104) or transport deck (105) to adjust the incline of the loaded belt portion (103). Adjusting the incline will vary the speed and distribution of the slurry (50) on the filter belt (102) under gravity as the slurry spreads such that the upper surface tends to horizontal.

As shown in FIGS. 28a and 28b, the slurry is respectively distributed with a thicker portion formed toward or away from the inlet manifold (125) as the liquid removal apparatus (100) is respectively inclined upwards or downwards from the inlet manifold (125) end. The hydraulic jacks (137) may be connected to a controller and sensors that detect the slurry flow-rate and dynamically adjust the incline of the liquid removal apparatus (100) to accommodate, for example, surges in flow-rate. Surges in slurry flow on a horizontal filter belt (102) result in the slurry moving too quickly/far over the filter belt (102) and thereby potentially reduce the effectiveness of liquid removal. In a preferred embodiment, the liquid removal apparatus (100) is inclined upward from the manifold end when the slurry flow detected is too high and inclined downwards when the slurry flow is too low.

Figure 29:
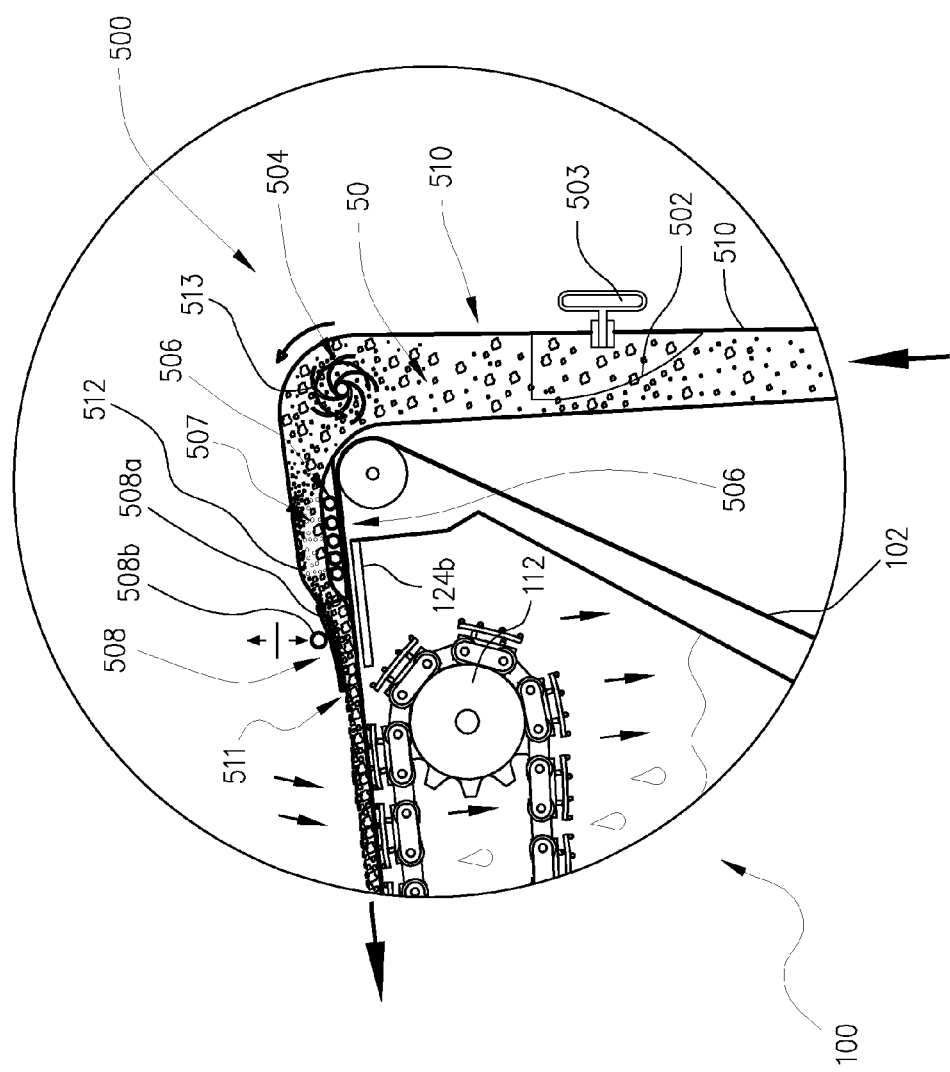
FIG. 29 is an enlarged side elevation of a longitudinal cross-section of a first feed conditioning system of the liquid removal system of FIG. 7.
Figure 30:
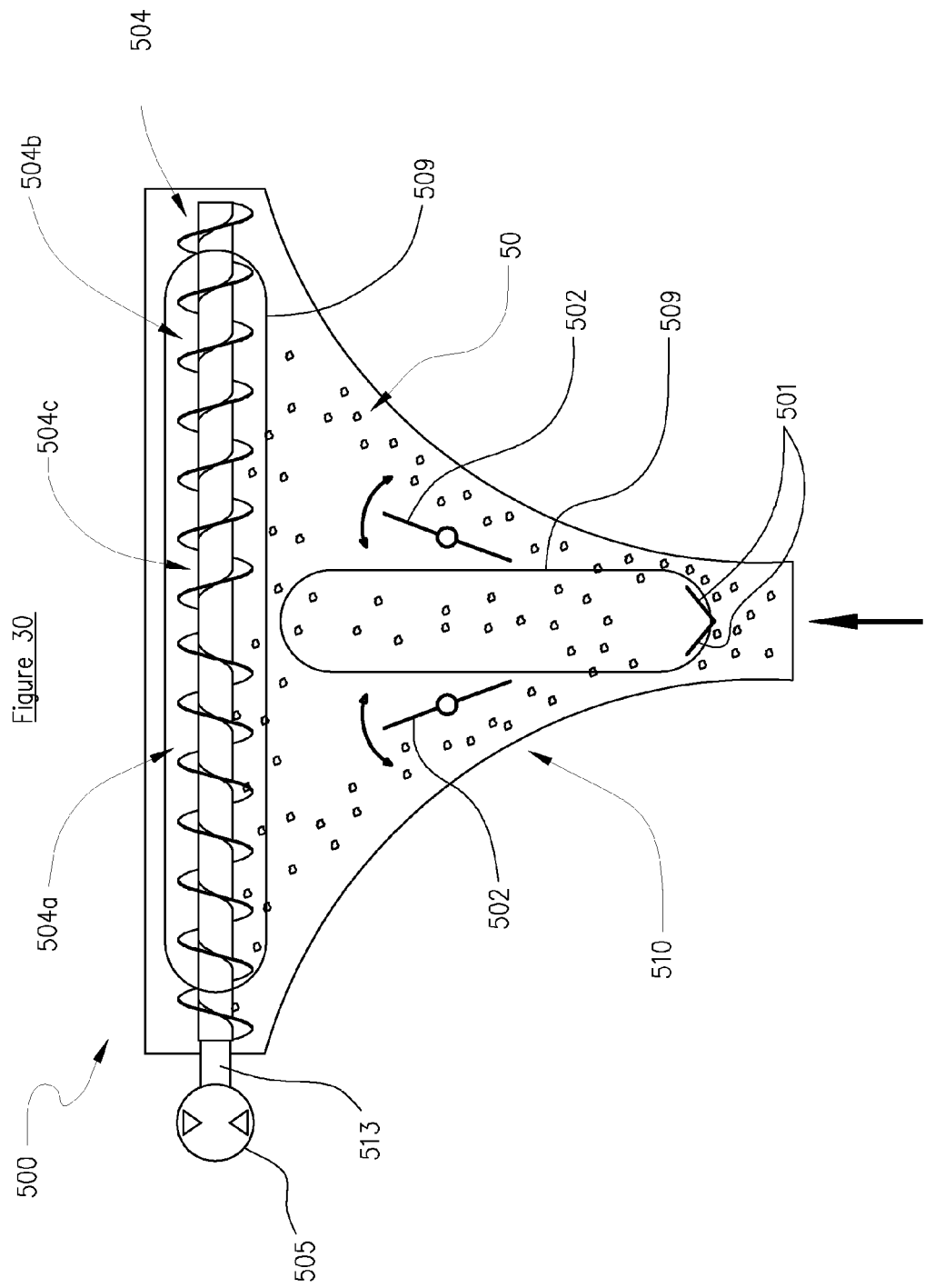
FIG. 30 is a plan elevation of the feed conditioning system shown in FIG. 29.

FIGS. 29 and 30 show a feed conditioning system (500) with an infeed distribution manifold (510). The manifold (510) has a variable nozzle outlet (511) and a dispersion chute (512) extending from the nozzle outlet (511) to the filter belt (102). Inside the manifold (510) is a 'V' shaped mixing plate (501) that mixes the slurry (50). Where a flocculant is added to the slurry (50) the turbulence around the mixing plate (501) may aid in mixing and distributing the flocculant. Two adjustable rotatable directing guides (502) vary the spread of the slurry (50) and can be adjusted externally by handles (503).

The feed conditioning system (500) has a spreader provided in the form of auger sections (504a, 504b) that distribute the slurry (50) laterally and agitate the solids within the slurry (50). The auger sections (504a, 504b) are mounted to a common shaft (513). The spreader (504) rotates about an axis perpendicular to the slurry flow and is powered by a variable speed/direction motor (505). The helical flanges of the augers (504a, 504b) are orientated away from each other from a central shaft position (504c) and will agitate and spread laterally the passing slurry (50). The helical flanges of the augers (504a, 504b) will spread the slurry (50) toward or away from a centre section (504c) depending on whether the shaft (513) is rotated (when viewed from the end closest the motor (505) clockwise or anticlockwise respectively. The helical configuration also prevents solids in the slurry becoming lodged on the spreader (504) in addition to distributing the slurry (50) laterally.

The feed conditioning system (500) also has gas agitator/aerators provided in the form of air stones or piccolo tubes (506) connected to a pressurised gas supply (not shown). The air (507) in the slurry (50) can lift lighter particles in some types of slurry (50) (e.g. finer ash particles or flocked sewage fibres) to the top of the slurry (50) before it is filtered on the filter belt (102) and thereby segregate the slurry (50). This 'segregation' of the slurry (50) means the more easily filtered heavy particles travel along the bottom of the slurry (50) and act as a filter for filtering the liquid from the lighter particles. Moreover, the segregation can assist in preventing clogging of the filter belt (102) by the lighter, generally smaller particles.

A flow-rate control (508) is provided downstream of the gas tubes (506). The flow-rate control (508) includes an adjustable flap (508a) that can be adjusted by varying the position of a bar (508b). The flap (508a) of the flow-rate control (508) acts to control the thickness and flow-rate of the slurry (50) being deposited on the filter belt (102). Viewing windows (509) allow a user to view the slurry (50) and thereby accurately adjust the guides (502) and spreader (504) to achieve the desired spread of slurry (50) on filter belt (102).

Figure 31:
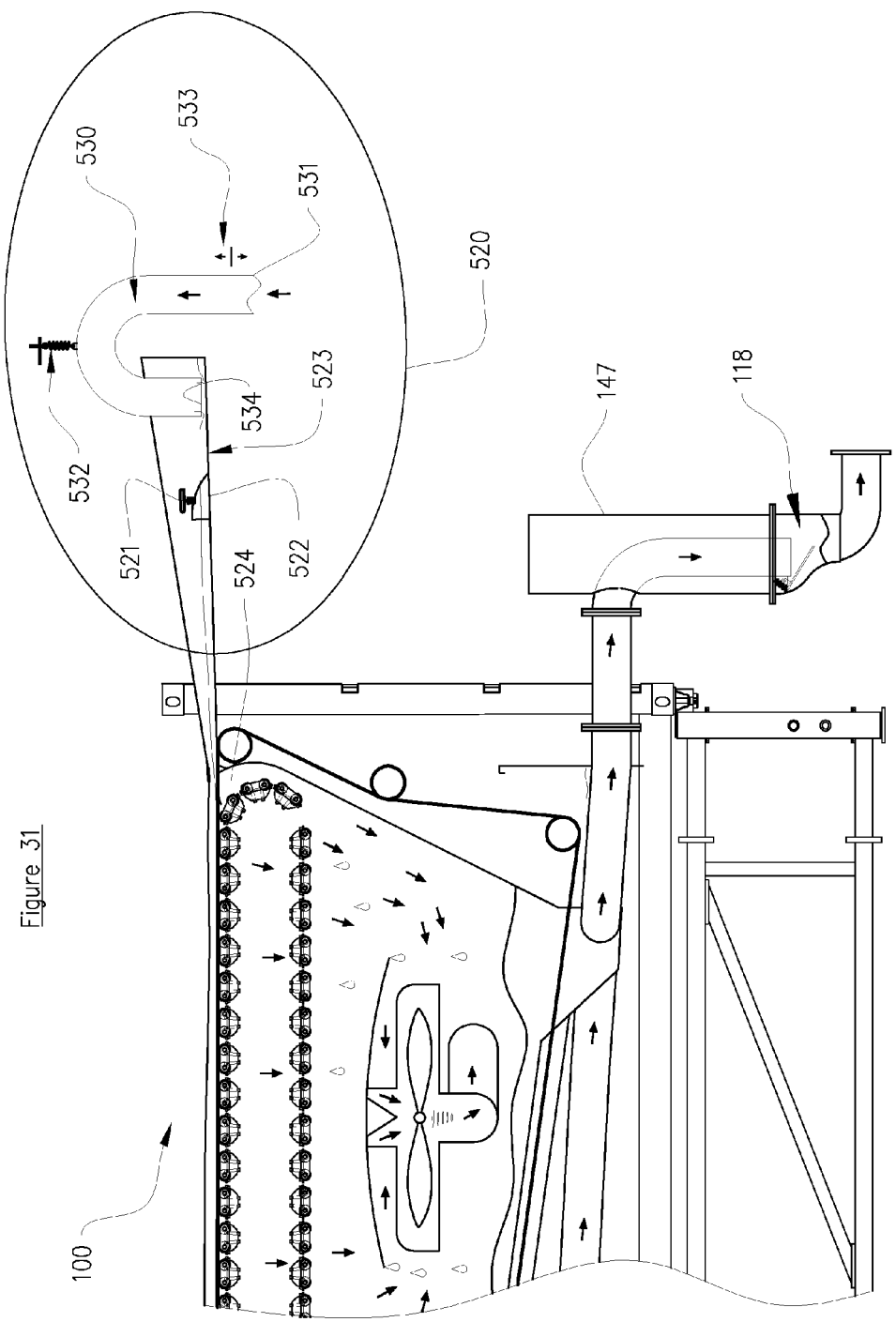
FIG. 31 is a side elevation of a longitudinal cross-section of a second feed conditioning system for use in the liquid removal apparatus of FIGS. 1-13.
Figure 32:
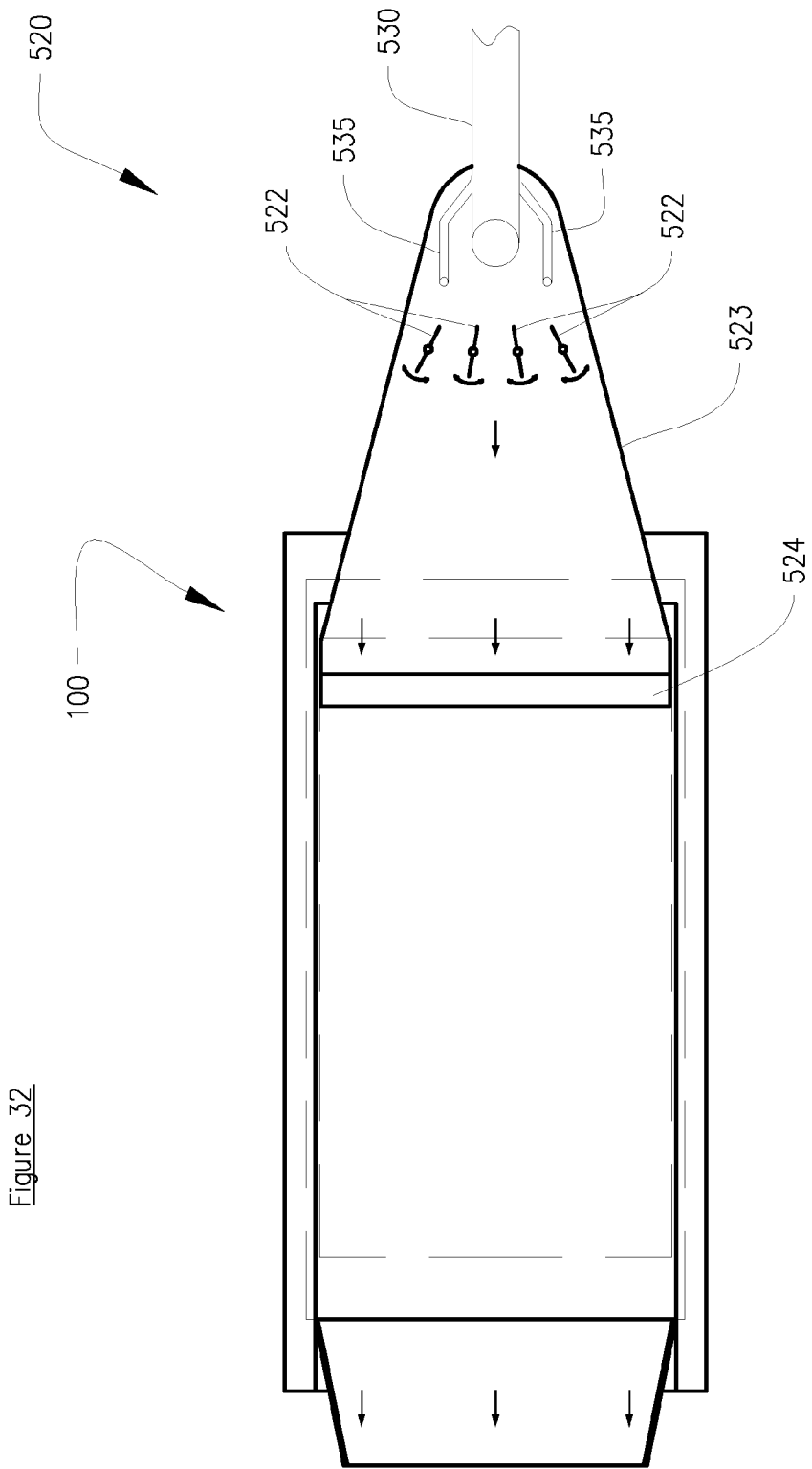
FIG. 32 is a plan elevation of the feed conditioning system shown in FIG. 31.

FIGS. 31 and 32 show another feed conditioning system (520) that is used with relatively dense, granular slurry, e.g. with a high sand content. The feed conditioning system (520)

has similar adjustable (via handle 521) directing guides (522) similar to directing guides (502) shown in FIG. 30. The conditioning system (520) has a manifold (530) connected to a slurry inlet pipe (531). The manifold (530) has height (532) and orientation (533) adjusting mechanisms. The height adjusting mechanism (532) can adjust the distance between manifold nozzle outlet (534) and the base of fan-shaped infeed chute (523) between manifold (530) and liquid removal apparatus (100). The orientation adjusting mechanism (533) varies the angle of manifold nozzle outlet (534) with the base of infeed chute (523).

The infeed chute (523) is inclined relative to horizontal to use gravity in assisting slurry flow toward liquid removal apparatus (100). Lateral manifold nozzle outlet guides (535) further increase spread of the slurry by diverting some of the slurry flow in the manifold (530). The height (532) and orientation (533) adjusting mechanisms respectively provide means to control the spread and direction of the slurry (50), e.g. increasing height of manifold nozzle outlet (534) increases spread while changing orientation of manifold nozzle outlet (534) will change the direction and speed of the slurry flow. A rubber protective sealing strip (524) is provided for preventing granular product from moving into the gap between chute (523) and filter belt (102) and for assisting in filtration.

Figure 33:
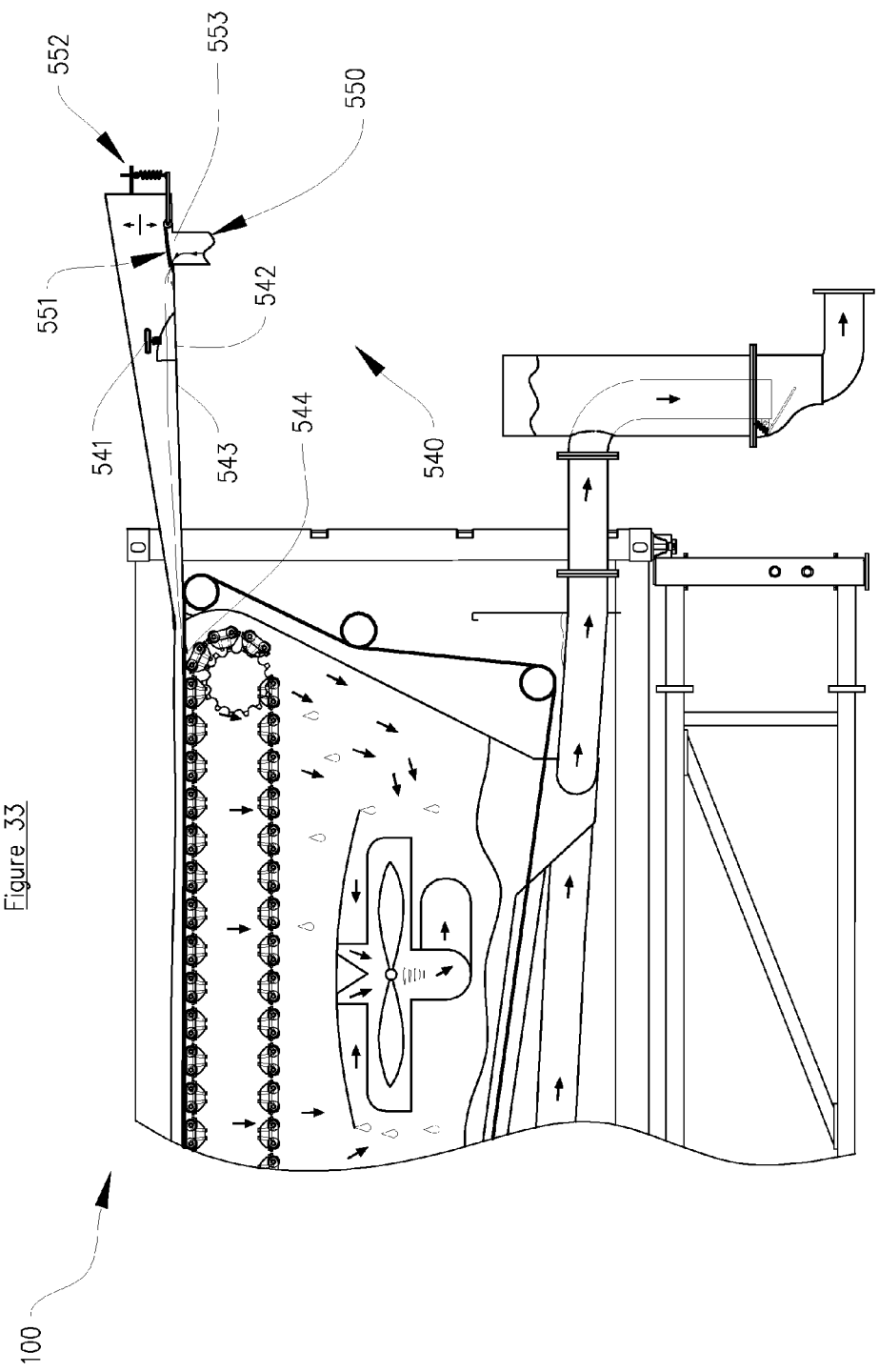
FIG. 33 is a side elevation of a longitudinal cross-section of a third feed conditioning system for use in the liquid removal apparatus of FIGS. 1-13.
Figure 34:
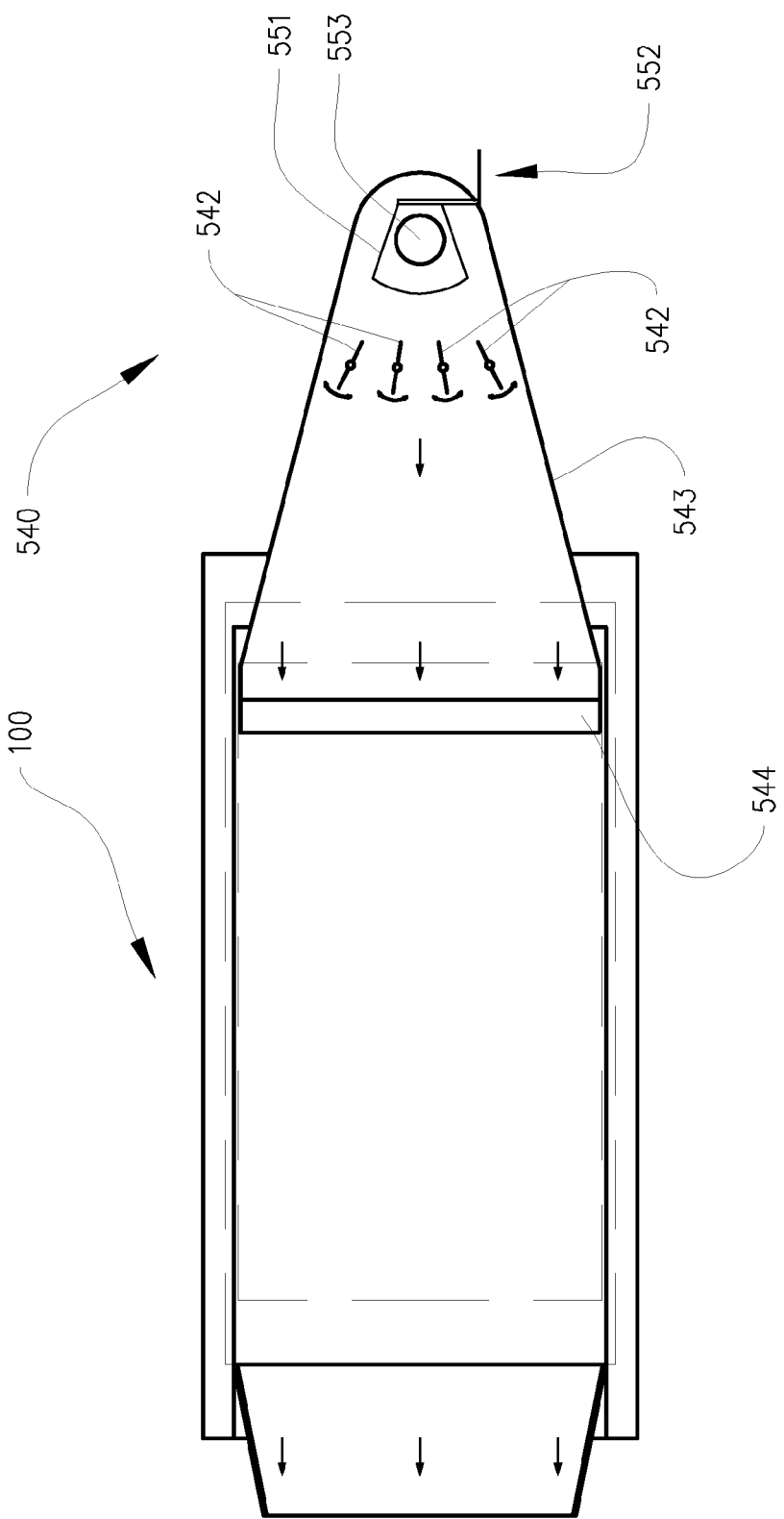
FIG. 34 is a plan elevation of the feed conditioning system shown in FIG. 33.

FIGS. 33 and 34 show another feed conditioning system (540) that is also effective with relatively dense, granular slurry. The feed conditioning system (540) has adjustable (via handle 541) rotatable directing guides (545) and a manifold (550). An adjustable dispersion flap (551) allows the rate and spread of slurry inflow to be controlled. The flap (551) is tensioned and can be adjusted in height above outlet (553) to vary the dispersion of slurry. As with The feed conditioning system (520), the infeed chute (543) is inclined downward towards liquid removal apparatus (100). A rubber protective sealing strip (544) is provided for preventing granular product from moving into the gap between chute (543) and filter belt (102) and for assisting in filtration.

Figure 35:
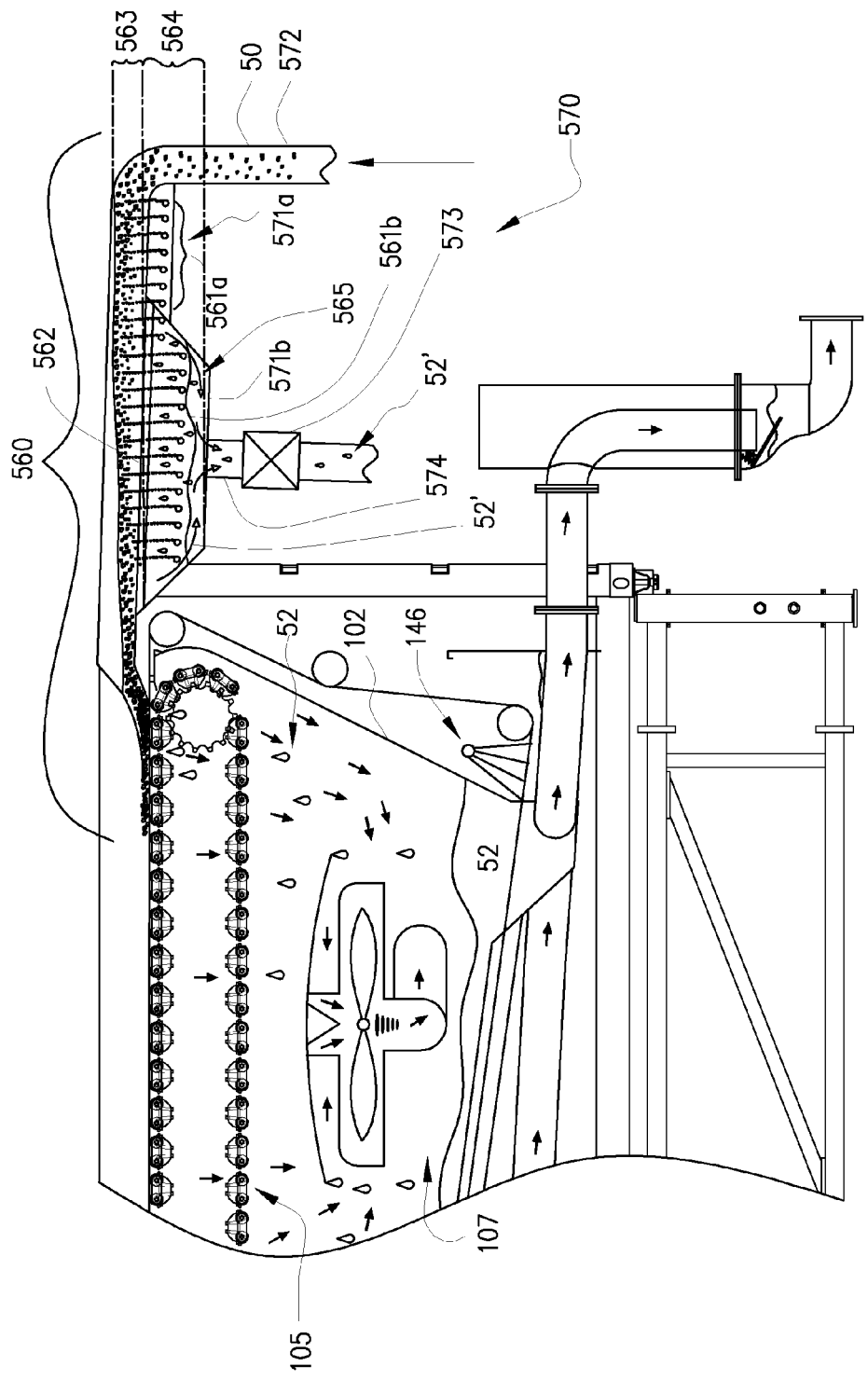
FIG. 35 is a side elevation of a longitudinal cross-section of a fourth feed conditioning system for use in the liquid removal apparatus of FIGS. 1-13.

FIG. 35 yet shows another feed conditioning system (560) that 'pre-filters' large quantities of the liquid in suitable slurries, e.g. biological sludge, to 'thicken' the slurry (50) before being filtered. A flocculant additive is typically added to flocculate the particulate in the slurry (50) to aid filtration and manipulation of the smaller particles. The conditioning system (560) has aerators (561) located in a pre-filter chamber (571) formed as part of a manifold (570). The pre-filter chamber (571) is fluidly connected to the infeed slurry via manifold inlet (572). The aerators (561) provide a stream of air bubbles that lift the lighter particulate in the slurry (50). The pre-filter chamber (571) is formed from two parts, a first 'lifting' portion (571*a*) which has aerators (561*a*) configured to aerate the slurry (50) and lift the smaller lighter particles of the solids content in the slurry (50).

The 'lifted' slurry then passes to an 'extraction' chamber (571*b*) which is a recess (565) covered by a gas permeable membrane provided in the form of wedge-wire screen (562) extending over the recess (565). The wedge-wire screen (562) is a grating with the grating elements shaped as wedges (i.e. triangular in transverse cross-section). The wedge-wire screen (562) is configured with an apex of each wedge pointing downwards toward drainage chamber (571*b*). The upper surface of the wedge-wire screen (562) is orientated upwards, thus presenting as a flat grating upper surface impassable to the slurry solids. The screen (562) however remains porous to the streams of air bubbles from aerators (561*b*).

A valve (573) is opened to drain liquid in the drainage chamber (571*b*) via extraction outlet (574). The wedge-wire screen (562) is interposed between upper slurry strata (563) of solids and liquids and lower strata (564) of liquids only. A liquid extraction outlet (574) is positioned below the wedge-wire screen (562) for extracting the liquid (52'). The air bubbles from the aerators (561) thus bias the solids to the upper strata (563) while the lower strata (564) of liquid is contained in the drainage chamber (563) and is extracted.

The aerators (561), wedge-wire screen (562) and liquid extraction outlet (574) collectively form a 'segregation mechanism', configured to constrain the slurry solids to the upper strata (563) within the pre-filtering chamber (571).

The wedge-wire screen (562) permits the liquid to flow into the recess (565) but prevents any settled solids from passing into the recess (565) and extraction outlet (574). The smaller lighter particulate or floc falling onto the wedge-wire screen (562) also doesn't pass through as the air bubbles from aerators provide an 'air barrier' in the gaps in the wedge-wire screen (562). The filtered liquid (52') may be re-circulated for further filtration or, if sufficiently filtered, may be used elsewhere.

This conditioning system (560) thus provides a way to pre-filter large quantities of liquid from a slurry (50) before passing to the filter belt (102), thereby improving efficiency of the liquid removal apparatus (100). The conditioning system (560) is generally suitable for a range of slurries which contain relatively low density particulate, (e.g. biological sludge, coal dust and steel mill swarf) and can be attached to the liquid removal apparatus (100) if/when required.

Figure 36:
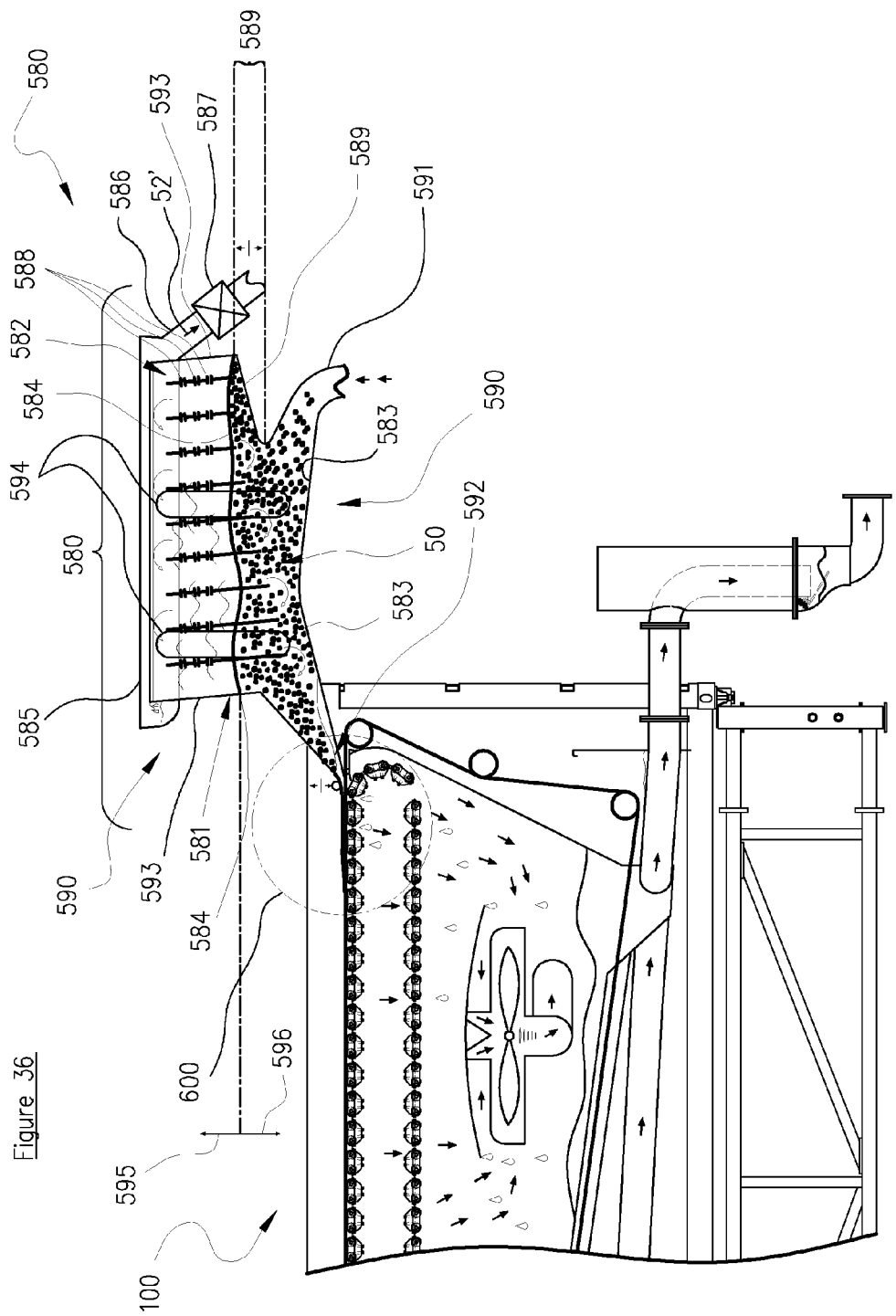
FIG. 36 is a side elevation of a longitudinal cross-section of a fifth feed conditioning system for use in the liquid removal apparatus of FIGS. 1-13.

FIG. 36 shows an alternative feed conditioning system (50) which is also used to pre-filter or 'thicken' the infeed slurry (50). The conditioning system (580) is useful in slurries with a fine particulate component that coagulates with flocculant effectively. The conditioning system (580) may of course also be used with other slurry-types by performing a general settling-tank role. The conditioning system (580) has a manifold (590) with a pre-filtering chamber (581) connected to a slurry inlet pipe (591). The pre-filter chamber (581) has a series of nine baffles that are inclined from vertical. The first baffle is indicated by arrow (582).

A flocculant additive is added to the slurry (50) and the slurry (50) is pumped into the pre-filter chamber (581) where the larger and/or denser particulate settles on the base (583) of the chamber (581) and passes to manifold nozzle outlet (592) of liquid removal apparatus (100). The manifold nozzle outlet (592) provides a constriction which restricts the volume flow-rate therethrough. Thus, the slurry (50) collects in the pre-filter chamber (581) above the nozzle outlet (592) if the volume flow-rate of slurry from inlet (591) exceeds the volume flow-rate through the nozzle outlet (592).

The lighter particulate and flocculant rises through baffles (582) and a suspended liquid-permeable, solids barrier of coagulated flocked solids forming a floc filter barrier or 'blanket' (indicated by dashed line 584). The floc filter barrier (584) allows liquid content (52') to pass through but stops the rising particulate which collects in the floc filter barrier (584). Each baffle (582) has apertures (588) allowing slurry transfer therethrough. The baffles (582) impede and attenuate the slurry flow and thereby reduce the turbulence through the pre-filter chamber (581) and thus help the filter barrier (584) form and the solids settle. It will be appreciated that if the flow-rate through pre-filter chamber (581) is too high, the turbulence may destroy the floc filter barrier (584).

The pre-filtering chamber (581) also has a tapered 'expansion' section (589) with a variable horizontal cross-sectional area. As slurry flow rates vary, the floc filter barrier (584)

moves up or down the expansion section (589) with a corresponding variation in the surface area occupied by the floc filter barrier (584).

The filtered liquid (52') rises over the walls (593) of the pre-filtering tank (581) and into an overflow channel (585). Extraction of this liquid (52') is via a liquid extraction outlet provided in the form of outlet pipe (586) controlled by a valve (587).

Viewing windows (594) are provided in the thickener tank (581) for allowing monitoring of the height and integrity of the floc filter barrier (584).

In operation, once the liquid removal apparatus (100) is initiated and slurry flows into the pre-filtering chamber (581), the flocculant additive binds with the slurry solids and the heavier flocked solids settle to the chamber floor (583) and pass out of the manifold nozzle outlet (592). The more turbulent upper part of the slurry flow impinges on the baffles (582) and a floc filter barrier (584) forms at a level defined by the competing forces of the slurry flow up-thrust and the buoyancy of the floc filter barrier (584) against the effects of gravity. Filtered liquid (52') is able to pass freely through the floc filter barrier (584) until it reaches the overflow channel (585) and outlet pipe (586).

The slurry flow through the pre-filtering chamber (581) may be adjusted to maintain a dynamic equilibrium, in which a manageable rate of slurry output from the manifold (590) (with a high settled-solids content) is maintained in balance by the flow rate of liquids (52') through the floc filter barrier (584) and the corresponding height of the floc filter barrier (584) within the expansion section (589). The feed conditioning system (580) thus segregates the slurry into upper strata (595) of liquid (52') and lower strata (596) of slurry (50) solids and liquids. The floc filter barrier ( ) is interposed between the strata ( ) and defines the boundary between strata ( ). The upper and lower strata are indicated in FIG. 36 by arrows (595, 596) extending from a dashed line passing through the approximate level of the floc filter barrier (584). It will be appreciated that floc filter barrier (584) may not be horizontal and will vary in height depending on slurry flow in the corresponding part of the pre-filtering chamber (581)

It will be appreciated that in alternative embodiments a floating or static liquid-permeable membrane maybe used instead of the floc filter barrier (584).

The inclination of the feed conditioning system (580) can be adjusted to vary the flow through the manifold outlet (592) and thus adjust the amount of liquid filtrate passing through floc filter barrier (584).

The feed conditioning systems (560 and 580) thus provide a mechanism for pre-filtering a significant portion of the liquid content from infeed slurries with a high liquid content, thereby reducing the level of liquid removal required by the subsequent liquid removal apparatus (100).

It will be appreciated that the feed conditioning systems (500, 520, 540, 560 and 580) as aforementioned may also be used with other liquid removal apparatuses apart from that described herein. Furthermore, in some applications the feed conditioning systems (500, 520, 540, 560 and 580) may be used independently as a liquid removal apparatus or as a pre-filter for other machines or processes.

FIG. 36 also shows a slurry cake former (600) which is shown in more detail in FIGS. 37 and 38 and described below. This slurry cake former (600) can also used with the feed conditioning systems (500, 520, 540, 560) if required.

Figure 37:
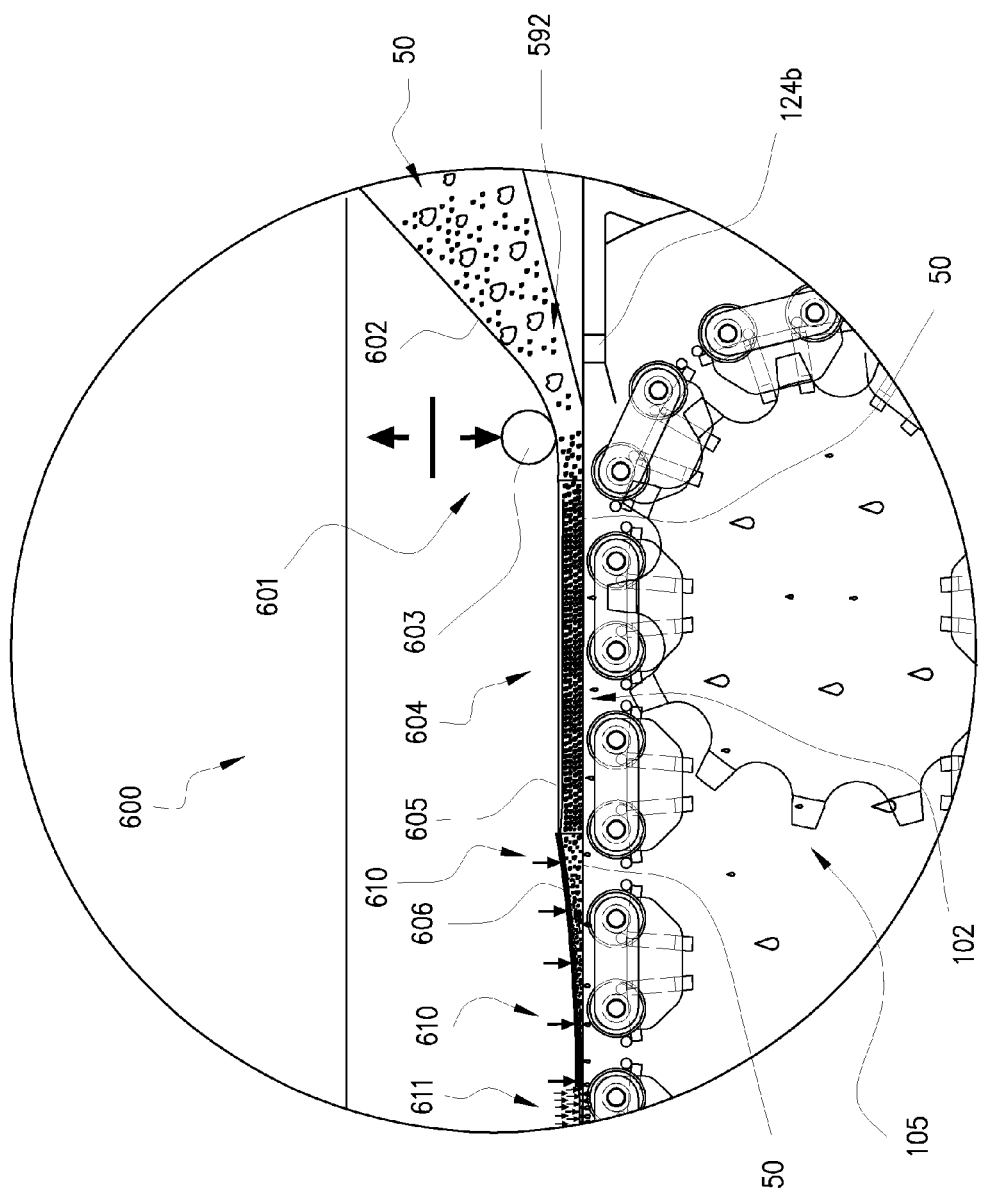
FIG. 37 is an enlarged side elevation of a first slurry cake former forming part of the feed conditioning system shown in FIG. 36.

With reference to FIG. 37, an embodiment of a slurry cake former (600) is shown which includes an adjustable flow-rate control (601) which controls the thickness and rate of slurry flow deposited onto the filter belt (102) from manifold nozzle outlet (592). The flow-rate control (601) is effectively a variable aperture nozzle, or valve. In the embodiment shown in FIGS. 36-38 the flow rate control (601) consists of a plate or flap (602) that extends across the width of the housing (106) and filter belt (102). A flow-rate control bar (603) holds the flap (602) in place and can be adjusted to vary the distance to the filter belt (102) and therefore also the volume flow-rate of slurry (50) flowing from manifold nozzle outlet (592).

As shown in FIG. 37, the slurry cake former (600) also has a former (604) consisting of an adjustable rigid conduit (605) positioned above a portion of the filter belt (102). This former (604) guides the slurry (50) from the flow-rate control (601) and manifold nozzle outlet (592) to form a block or 'cake' of slurry (50). The former (604) can thus be shaped to control the shape, width, thickness and features of the slurry 'cake' (50) that is filtered.

The required thickness of the slurry (50) will vary depending on the type of slurry and how effective the pressure differential is on liquid removal, e.g. a relatively dense slurry may need to be deposited in a thinner layer than a less dense slurry. The shape of the former conduit (605) can also be selected to affect the way the nature of the distribution of liquid removal over the width and/or length of the filter belt (102), e.g. the former conduit (605) may have ridges, guides or slots. The shape of the cake (50) created by the former (604) will consequently affect the shape of the resultant product (51) after liquid removal.

The slurry cake former (600) also has a flexible surface wiper (606) that extends from the former conduit (604) toward the filter belt (102). This surface wiper (606) is shown enlarged in FIG. 38 which shows its effect on the slurry cake. The surface wiper (606) produces an elongate tapered slot (607) between the lower wiper surface and the upper filter belt surface (102*b*). Consequently, the surface wiper (606) applies a compressive force onto the upper surface of the slurry/particulate-product, forcing some liquid through the slurry solids and filter belt (102). The wiper (606) also applies a frictional, abrasive force to the upper surface of the slurry (50), causing the upper layer of particles to shear from their adjacent lower layer.

Figure 38:
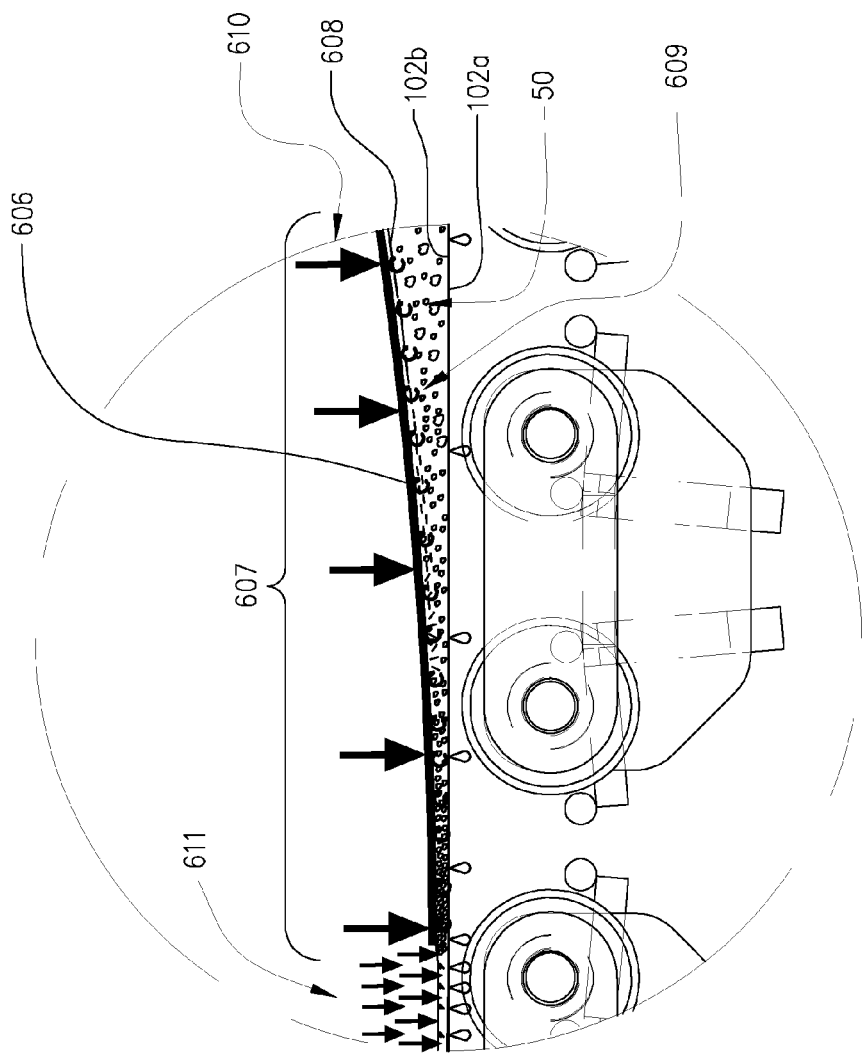
FIG. 38 is an enlarged side elevation of a surface wiper of the feed conditioning system shown in FIGS. 36 and 37.

The friction caused by the boundary layer contact between the wiper (606) and the slurry (50) effectively 'peels' or rolls the surface layer against the direction of filter belt movement as shown be the series of rotational arrows (609) in FIG. 38. Thus, as a result, the slurry closest to the wiper moves at a slower velocity than the slurry layers beneath. Small cracks and fissures (represented by broken line (608)) are thereby generated in the upper slurry surface. These surface cracks (608) provide air and liquid channels through the slurry (50) and prevent the upper surface forming an effectively air impenetrable layer. Large, downward pointing arrows (610) represent the pressure differential force acting on the wiper (606) and slurry (50) underneath.

The surface wiper (606) also acts to control the thickness of slurry (50) that is subject to the large pressure differential force (represented by small black arrows (611)).

The surface wiper ( ) and rigid conduit ( ) not only shape and control the slurry (50) but also reduce the overall localised differential pressure experienced by the slurry beneath. The slurry exiting the manifold nozzle (592) thus undergoes an initially 'gentle' initial liquid removal which enables the product filtrate cake (50) to be compacted without the violent effects of the full vacuum pressure pulling the fine particles through the filter belt (102). In slurries where a flocculant is used, this initial 'gentle' separation also reduces the likelihood of the flocculant being removed with the liquid relative to a larger vacuum. Floc formation is thus more effective as the concentration of flocculant and corresponding floc in the slurry increases with the initial reduction in liquid content.

Figure 39:
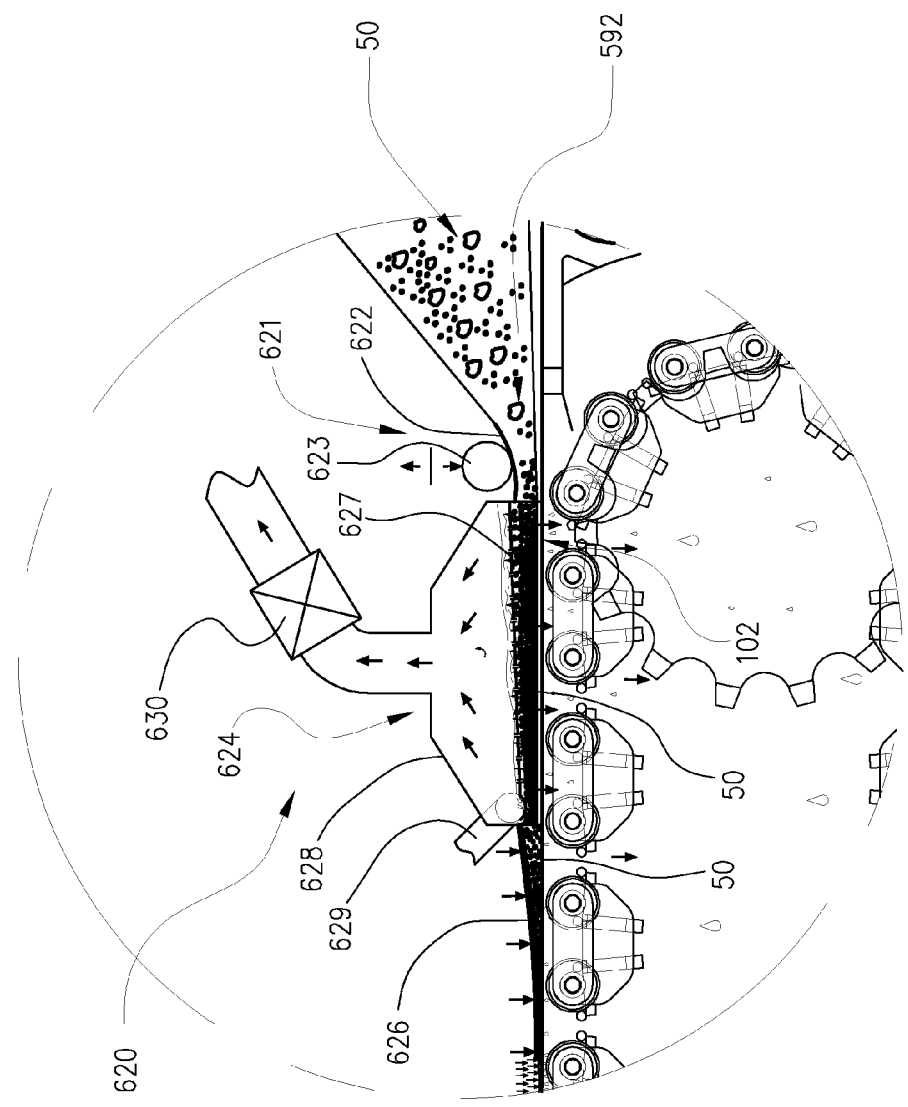
FIG. 39 is a side elevation of a longitudinal cross-section of a second slurry cake former for use in the liquid removal apparatus of FIGS. 7-13.

FIG. 39 shows an alternative slurry cake former (620) in the form of vacuum former (624), operating on a substantially different mechanism to the former (604) shown in FIG. 37. The vacuum former (624) has a flow-rate control (621) with flap (622) and adjusting bar (623) that forms a variable aperture nozzle connected to manifold nozzle outlet (592). The vacuum former (624) also has a surface wiper (626) the same as surface wiper (606) shown in FIG. 38. The vacuum former (620) is useful for use in slurries that are coarse but still bind well, e.g. some types of clay. The vacuum former (624) incorporates a permeable membrane in the form of wedge-wire screen (627) and a vacuum hood (628) that is sealed at either end respectively against the surface wiper (626) and flow-rate control flap (622). An excess liquid outlet (629) is provided to extract liquid passing through wedge-wire screen (627).

A vacuum pressure is thus formed both above and beneath the slurry (50) in the former (624), the upper vacuum sucking upper surface liquid through wedge-wire screen (627) while the lower vacuum removes liquid as previously described. The vacuum hood (628) has a regulating valve (630) that controls the upper vacuum force. Thus, in addition to removal of a degree of liquid from the slurry surface, the vacuum former (624) reduces the overall localised differential pressure experienced by the slurry beneath vacuum former (624) from the pressure conditioning system (109) (via the low-pressure chamber (107)). The slurry exiting the manifold nozzle (592) thus undergoes a more 'gentle' initial liquid removal. This enables the product filtrate cake (50) to be compacted without the violent effects of the full vacuum pressure pulling the fine particles through the filter belt (102). Furthermore, as aforementioned, such a 'gentle' initial separation provides subsequent filtration benefits in floc formation. Such a vacuum former (624) is typically used in liquid removal from slurries that have a fine particulate and a flocculant such as biological sludge, coal and steel mill dust/swarf and some fine sands.

Figure 40:
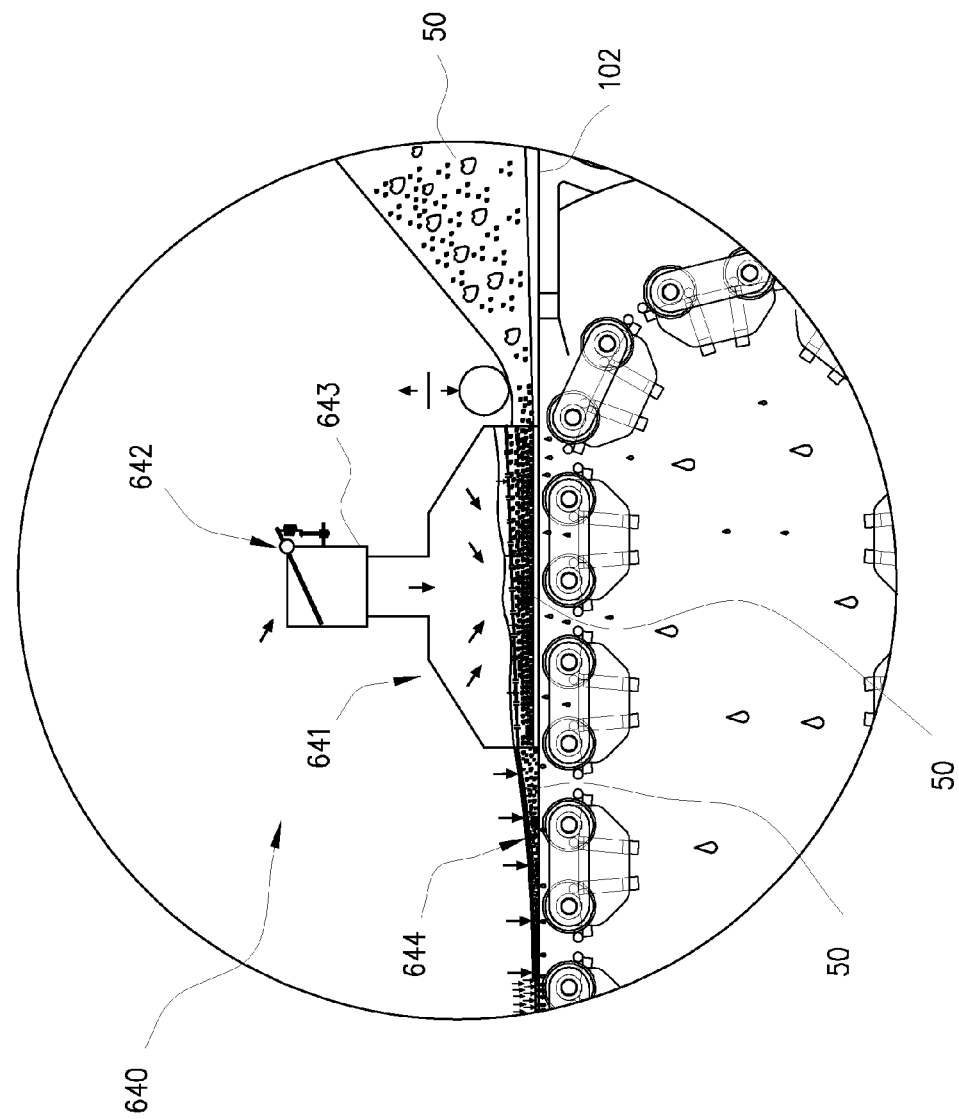
FIG. 40 is a side elevation of a longitudinal cross-section of a third slurry cake former for use in the liquid removal apparatus of FIGS. 7-13.

FIG. 40 shows another slurry cake former in the form of an attenuated atmospheric pressure slurry former (640) which uses a passive pressure hood (641) in place of the vacuum hood (628) shown in FIG. 39. This passive pressure hood (641) has an inlet valve (642) that is biased closed to block inlet duct (643). The valve (642) opens to atmosphere when the lower vacuum (109) operates to draw liquid from the slurry (50). However, as the flap valve (642) also controls the amount of atmospheric pressure air entering hood (641), the pressure differential across the filter belt (102) and slurry (50) can also be controlled by varying the bias of the flap valve (642) and thus the volume of air permitted to enter the hood (641).

The valve (642) is thus configured so that the pressure differential across the slurry (50) underneath hood (641) is less than that across the slurry (50) exiting the slurry cake former (640) from surface wiper (644). The magnitude of the vacuum force beneath the slurry (50) is being partially attenuated by force of the valve closure the slurry exiting the manifold nozzle (592) and thus undergoes a more gentle initial liquid removal. Such a passive pressure former (624) is typically used in liquid removal from slurries that have both large and fine particulate where the fine particulate is vulnerable to being drawn through the filter belt with the liquid when initially subjected to the pressure differential. Such slurries include e.g. fly-ash, wood pulp and fine sand.

Figure 41:
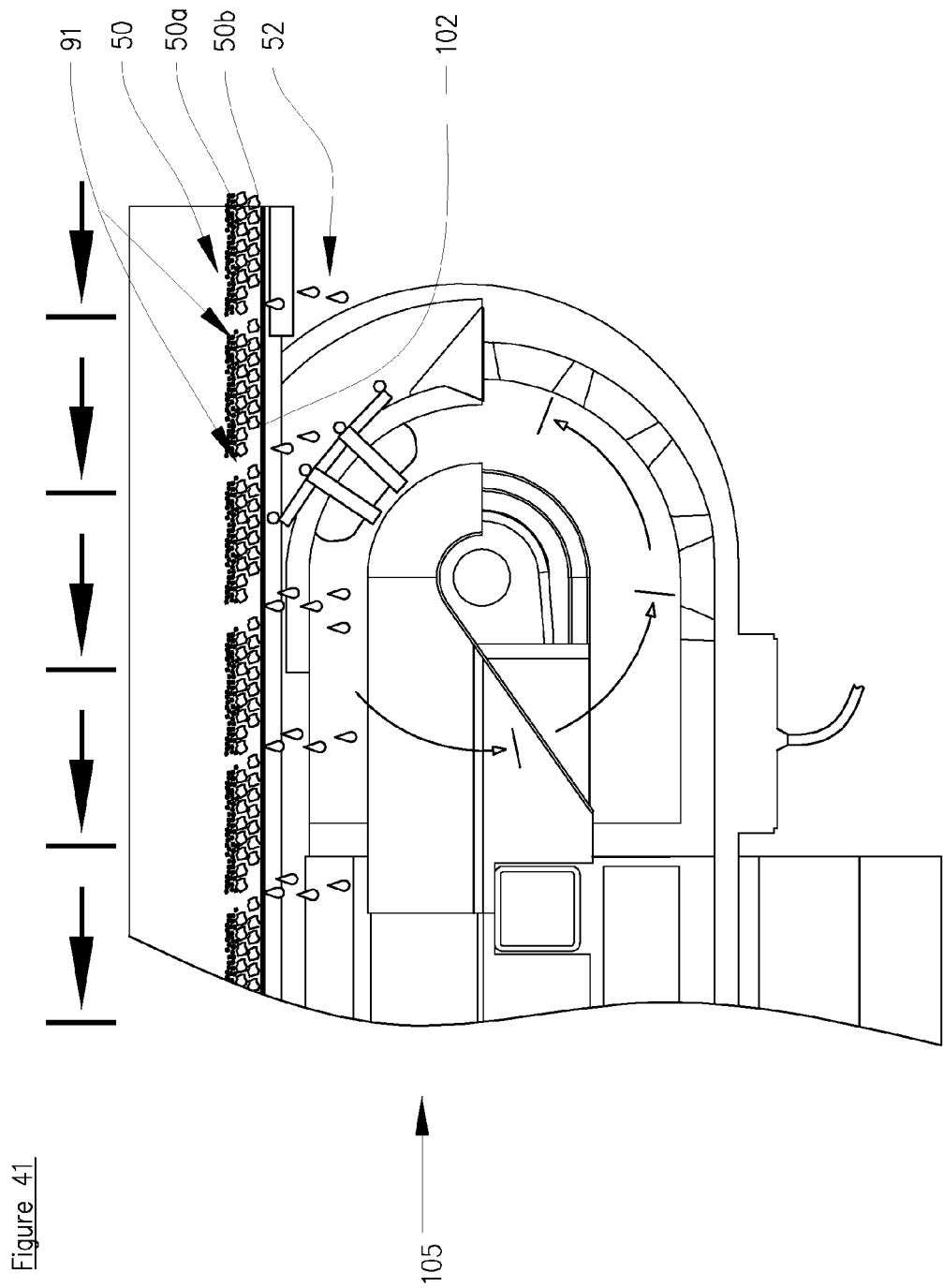
FIG. 41 is a side elevation of a longitudinal cross-section of part of one end of a transport deck of the liquid removal apparatus of FIGS. 7-13 showing the effect of varying drive roller speed.

FIG. 41 shows the effect on the slurry (50) of driving the transport deck (105) and filter belt (102) of the liquid removal apparatus (100) intermittently, i.e. in 'pulses'—as indicated symbolically by the stop arrow symbols running right to left. This method of liquid separation from a composite slurry of liquid and solids uses liquid removal apparatus (100) and may be utilised in a variety of applications including the liquid removal apparatus of the present invention. In its broadest form, the method involves:

moving the filter belt (102) over the first aperture (108) at a first velocity;

applying the slurry (50) to the first side of the filter belt (102);

applying a pressure differential between the first (102a) and second (102b) sides of the filter belt (102), and cyclically varying said first velocity of the moving filter belt membrane (102) to apply a variable pulsed impetus to the slurry (50).

Applying the variable impetus causes the slurry product to sway or shake. The slurry (50b) closest to the filter belt (102) has the least inertia to the cyclic impetus pulse. Consequently, the changes in velocity cause the uppermost levels (50a) of the product to undergo greater momentum changes leading to the creation of surface cracks (91) and the like. This provides access channels (91) in the slurry (50) through which the slurry liquid (52) is forced by the pressure differential. The slurry (50) has two layers consisting of an upper layer of smaller, lighter particulate floc (50a) and a lower layer of larger particulate (50b). When the transport deck (105) is driven intermittently, the cracks (91) form in the slurry (50) through which liquid (52) is drawn. This 'agitation' of the slurry (50) assists in removing liquid that may be present in the upper layers (50a) that could not otherwise be drawn through lower layer (50b). Liquid may collect on the upper layers (50a) if for example liquid is removed from the lower layers (50b).

Figure 42:
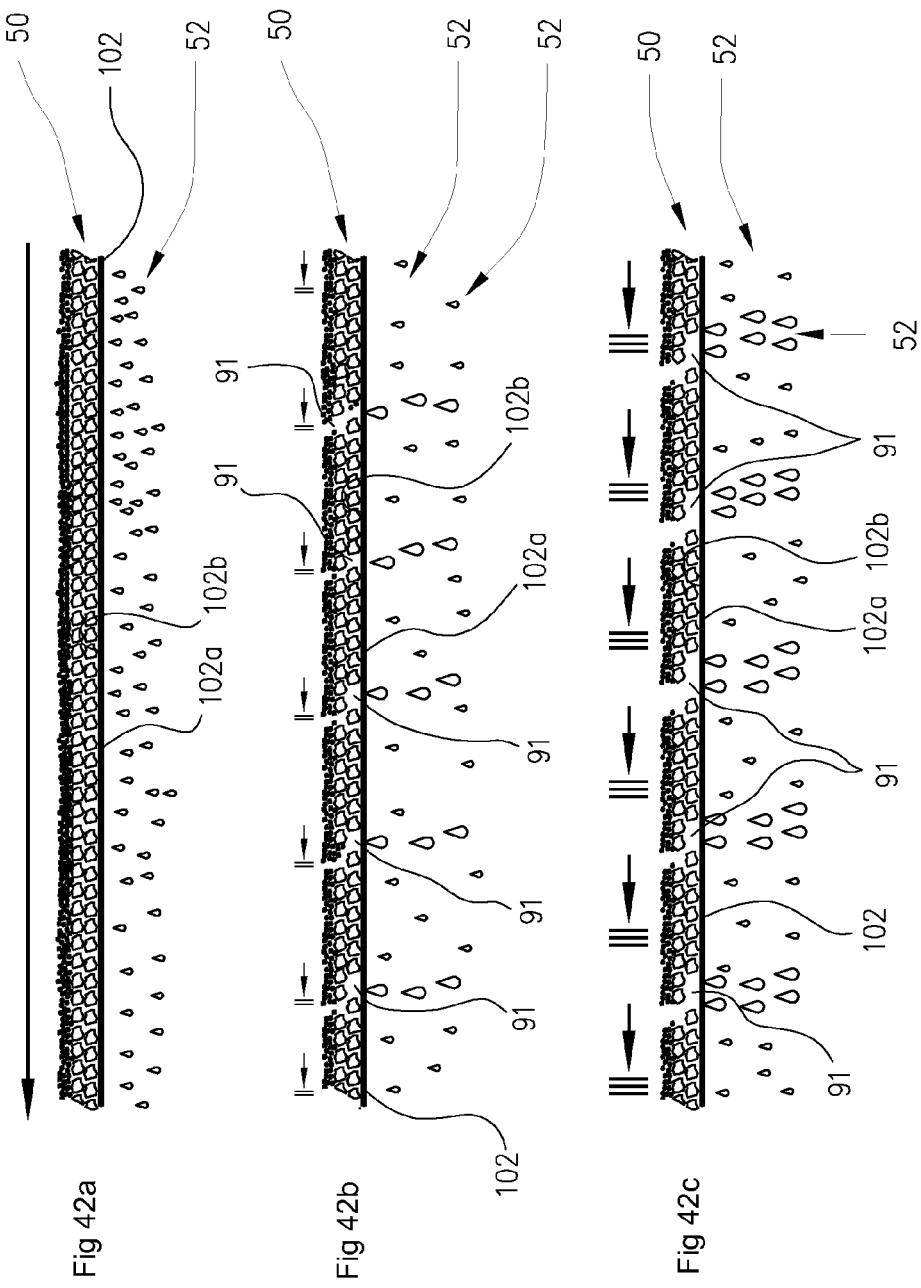
FIGS. 42a, 42b & 42c show various effects on the slurry of varying drive roller speed in the liquid removal apparatus of FIGS. 7-13.

FIG. 42 shows the formation of the slurry (50) caused by driving the transport deck and filter belt (102) at:

a constant speed (FIG. 42a);

a slow drive speed with intermittent pulses (FIG. 42b), and a fast drive speed with intermittent pulses (FIG. 42c).

Breaks or cracks (91) will form in the slurry (50) when the filter belt (102) is driven intermittently (FIG. 42b, FIG. 42c) and accelerates the removal of liquid (52) therethrough compared to the absence of any cracks (91) or other surface irregularities or discontinuities. The crack formation will vary depending on the slurry particulate size and composition, liquid content and pulse configuration. For example, cracks will not normally form in free-flowing granular particulates such as sand. It will also be appreciated that in suitable slurries the cracks formed will be relatively larger if the drive speed is fast and the period between pulses is relatively long, i.e. the momentum of the slurry is maximised. It has been found defective to apply a relatively low cyclic frequency to the velocity-change pulses.

Figure 43:
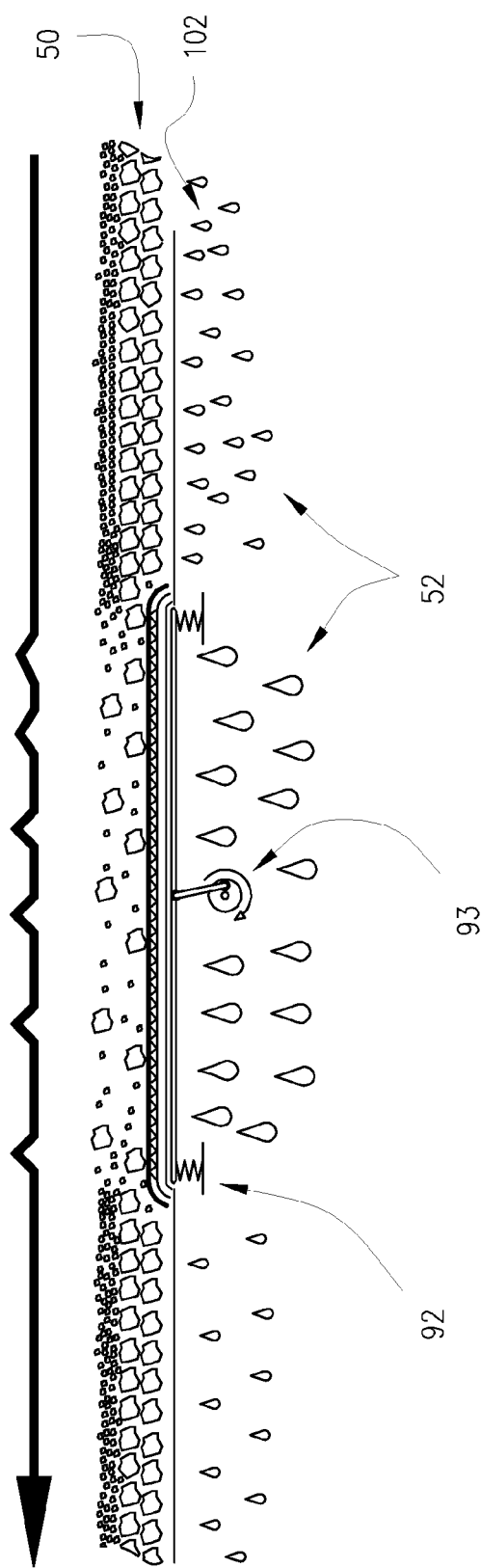
FIG. 43 shows a symbolic diagram of a possible agitation mechanism for use with the liquid removal apparatus of FIGS. 7-13.

FIG. 43 shows an alternative method for agitating slurry on the filter belt (102) to agitate and disrupt the continuity of the slurry formation and thereby create breaks (91) that enhance liquid removal. The variable impetus is provided by mechanical agitation or vibration of the filter belt (102) in the plane orthogonal to the filter belt (102) movement. This agitation is provided by a vibrating platform (92) under the filter belt (102) operated by a rotating eccentric crank (93) or the like.

Figure 44:
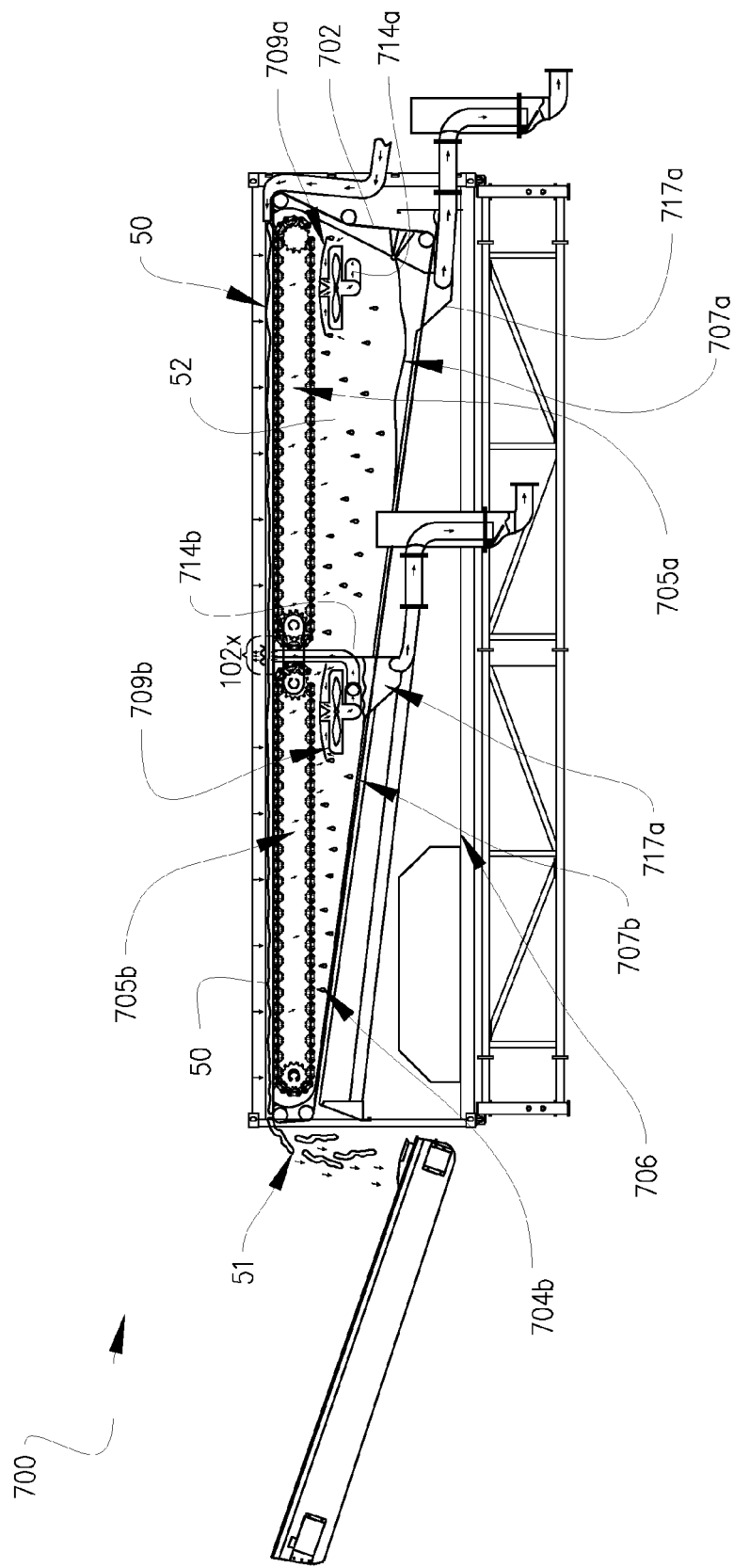
FIG. 44 is a side elevation of a longitudinal cross-section of a liquid removal apparatus according to a fifth preferred embodiment of the present invention.

A liquid removal apparatus (700) according to another preferred embodiment is shown in FIG. 44 and differs from the previous embodiments in the inclusion of a permeable membrane support systems (704) with twin transport decks (705a, 705b) in a single housing (706). Twin transport decks/low-pressure chambers ((705a, 705b/707a, 707b) permits the application of two different pressure differentials along the filter belt (102). In one embodiment, the second low pressure chamber (707b) is maintained at a lower pressure relative to atmosphere than the first low pressure chamber (707a). Consequently, the lower pressure differential in the first chamber (707a) allows for a less aggressive liquid extraction phase to remove the majority of the liquid from slurry (50) without contaminating the liquid filtrate (52) with fine particles or removing excessive flocculant. The second low pressure chamber (707b) may then apply a higher pressure differential to the slurry (50') to extract the remaining liquid.

A single filter belt (102) extends over both transport decks (705a, 705b). The first low pressure chamber (707a) of the 'dual' liquid removal apparatus (700) operates as per the earlier described embodiments (1, 100, 200, 300). However, the second low pressure chamber (707b) evacuates air via duct (714b) upwards through a center portion (102x) of the filter belt (102) extending between the two transport decks (705a, 705b). This evacuation of air through the intermediate filter belt portion (102x) acts as a conditioning system that aerates the product (50) passing from above the first transport deck (705a) to the second transport deck (705b) and lifts the fine particulate therein to the top of the slurry before being subject to the pressure differential across the filter belt (102) over the second transport deck (705b). As discussed above, when utilising a single transport deck, the slurry flow onto the loaded belt portion is subjected to violent pressure forces and thus the fine particulate in the slurry can be forced through filter belt before the flocculant (where used) has time to bind the fine particulate into larger floc. Thus, utilising two transport decks at different pressure differentials, as in the aforementioned embodiment, allows the slurry to be pre-filtered with a lower force over first transport deck (705a) before being subject to a stronger force on the second transport deck (705b).

The aforementioned 'twin-deck' embodiment is particularly useful in processing slurries that have a high quantity of fine particulate component that requires flocculant to bind together. Such slurries may include, by way of example, Anaerobic or aerobic sludge, sewerage or other biological sludge, steel mill swarf, coal ash, slurries with a high content of fine sand.

Figure 45:
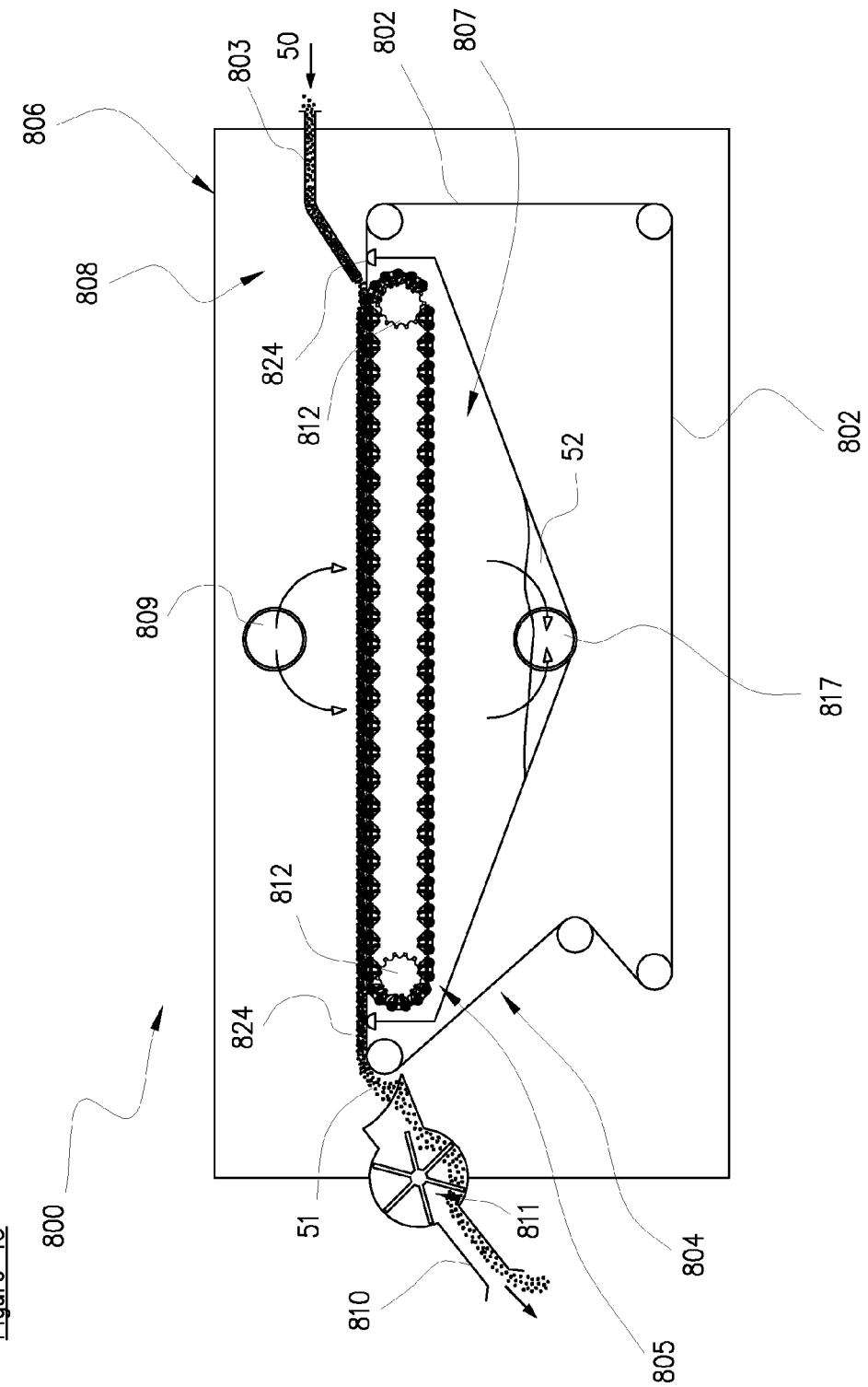
FIG. 45 is a side elevation of a longitudinal cross-section of a liquid removal apparatus according to a sixth preferred embodiment of the present invention.

FIG. 45 shows yet another embodiment of a liquid removal apparatus according to one aspect of the present invention. The liquid removal apparatus (800) shown differs from the apparatus (1) of FIGS. 1-4 as the housing (806) is sealed from atmosphere and forms a super-atmospheric or 'high pressure' chamber (808) into which air or gas is pumped via gas inlet (809). The low pressure chamber (807) and transport deck (805) operate as per the embodiment shown in FIGS. 1-4 with the gas outlet (817) evacuating to atmosphere. The low pressure chamber (807) has peripheral seals (824) (only end seals shown) extending about the upper periphery and in sealing contact with the filter belt (802). The transport deck (805) has driving rollers (812) and is entirely located within the housing (807).

The housing (806) and high pressure chamber (808) is maintained in a sealed state by ingress of slurry (50) via pressurised infeed manifold (803) and egress of the product (51) from the housing (806) via a duct (810) with rotary sealing valve (811). The apparatus (800) can be used to create a much higher pressure differential across filter belt (802) or to process slurries which contain liquids/solids that will gasify if not maintained at a super-atmospheric pressure. Moreover, it may be desirable to pass specific gases through slurries with predetermined compositions to achieve a desired chemical reaction. A sealed housing (806) enables such reactions to occur without contamination or interference from the environmental atmosphere.

To maintain this environmental sealing, it is necessary to prevent leakage via the slurry/product infeed and outflow. It will be appreciated several methods are applicable in addition to those shown in FIG. 45. The inlet manifold (803) may be simply sealed by the slurry itself provided a sufficient pressurised supply is maintained.

Figure 46:
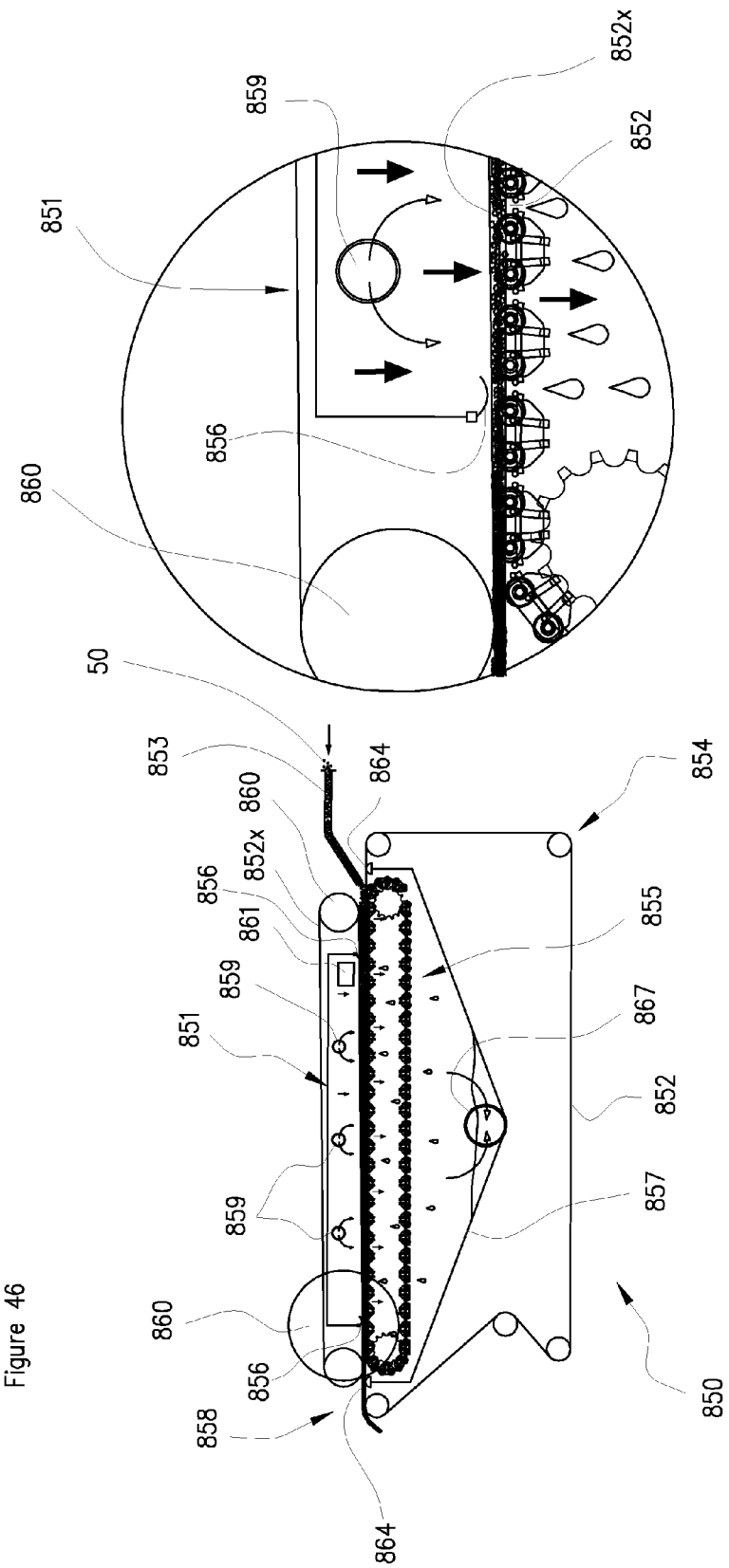
FIG. 46 is a side elevation of a longitudinal cross-section of a liquid removal apparatus according to a seventh preferred embodiment of the present invention.

FIG. 46 shows a liquid removal apparatus (850) with a modification to the liquid removal apparatus (800) shown in FIG. 45. The liquid removal apparatus (850) includes a permeable member support system (854) which functions as per the embodiment shown in FIG. 1. The transport deck (855) is entirely located within a low pressure chamber (857) with gas outlet (867) and seals (864) in sealing contact with the filter belt (852). The filter belt (852) extends about the low pressure chamber (807) and over the transport deck (855). Slurry (50) is fed to the filter belt (852) via feed distribution manifold (853).

Three gas inlets (859) are located in a high-pressure chamber (851) sealed against a gas permeable membrane formed as upper filter belt (852x) (shown more clearly in FIG. 46b) that covers the upper surface of the slurry (50). The upper filter belt (852x) passes about idler rollers (860) such that the upper filter belt (852x) is able to move with the lower filter belt (852) and transport deck (855). Alternatively, at least one of the rollers (860) may be independently driven. The high-pressure chamber (851) has flexible seals (856) that extend around the lower perimeter of the high-pressure chamber (851) and are in sealing contact against the inner side of the upper filter belt (852x). The high-pressure chamber (851) is configured to taper or incline the upper filter belt (852x) so that the separation between upper (852x) and lower (852) filter belts reduces toward the outfeed end (858). The upper (852x) and lower (852) belts thus progressively compress the slurry therebetween to add to the liquid removal resulting from the pressure differential between high (851) and low (857) pressure chambers.

The liquid removal apparatus (800) has a pressure regulator (861) that monitors the pressure in the low (857) and high (851) pressure chambers and thus also the differential pressure across the filter belts (852, 852x). The regulator (861) can be programmed to control the differential pressure to maintain at a particular level or to dynamically adjust the differential pressure in response to feedback from sensors (not shown) which may measure various parameters, e.g. slurry solid-to-liquid ratio, strain on filter belt, weight of slurry (50).

The use of a high-pressure chamber (851) obviates the need for pressurising the entire housing (806) as in the liquid removal apparatus (800) of FIG. 45.

Figure 47:
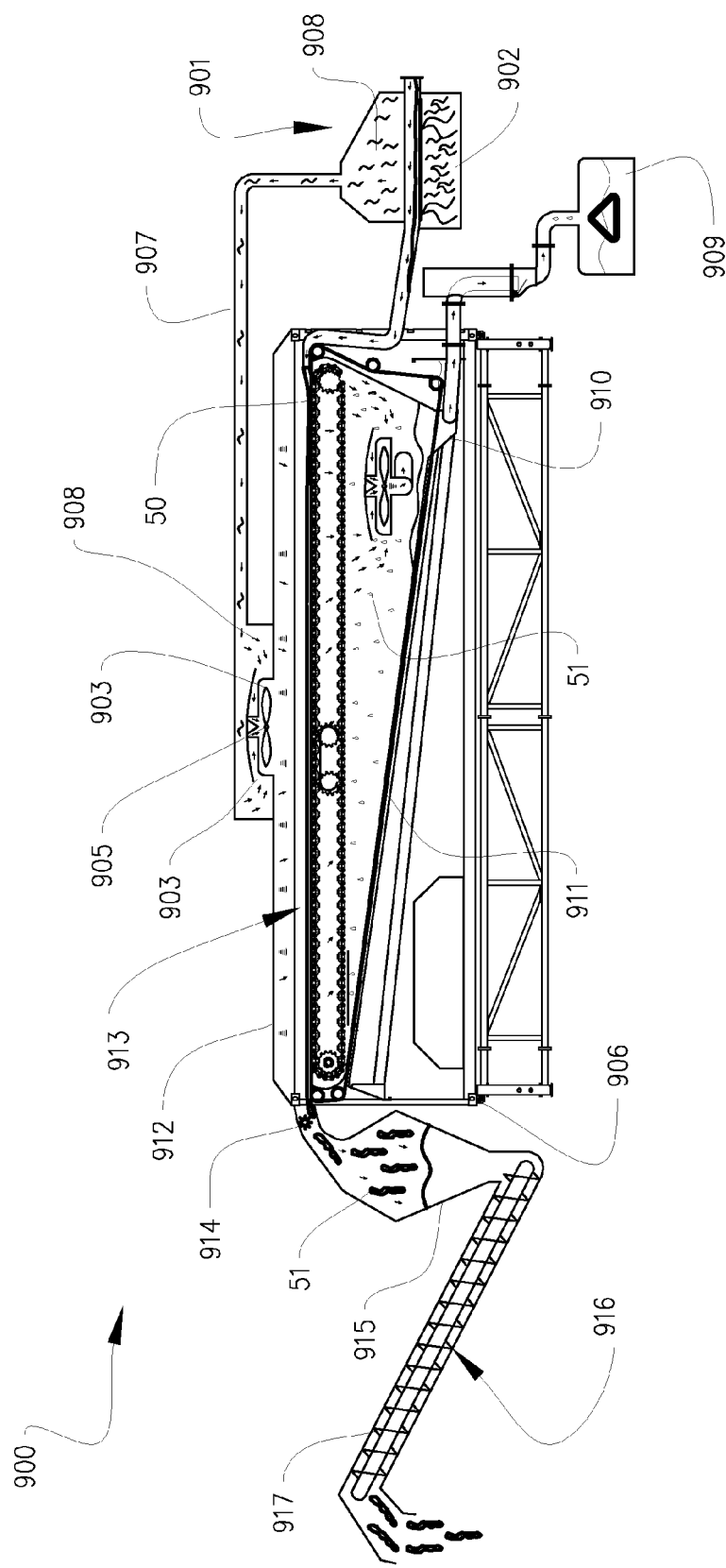
FIG. 47 is a side elevation of a longitudinal cross-section of a liquid removal apparatus according to an eighth preferred embodiment of the present invention.

FIG. 47 shows a liquid removal apparatus (900) according to one preferred embodiment for use with a slurry composition such as a carrier particulate bonded to, or carrying, petroleum or other chemicals that require heating to be released from adhering to the carrier particulate. The liquid removal apparatus (900) can also be used for slurries with components that must be contained under pressure to prevent environmental contamination, or gasification, e.g. chemical leachate from mine waste.

The liquid removal apparatus (900) is particularly useful in bitumen or 'oil-recovery' operations from 'oil-sands'. An existing difficulty with economic recovery of oil from oil-sands stems from the need to input high levels of energy (via heating of the sands to liberate the oil/tar from bonding with the sand) to extract the oil. The energy efficient liquid-extraction properties of the present invention together with the apparatus described below enable oil extraction to be performed on oil-sands with significantly less input energy.

The liquid removal apparatus (900) has similar components to the super-atmospheric liquid removal apparatus (800) of FIG. 45 but differs in the inclusion of a feed conditioning system (901) that utilises heat (902) to initiate separation of bitumen oil tar adhered to the non-petrochemical slurry (50) constituents (typically water, sand and clay) before it is filtered by liquid removal apparatus (900). A pressure sealing hood (912) is placed over the top of housing (906) to form a high-pressure chamber (913) with gas inlet (903) and fan (905) which extracts heated gas from the feed conditioning system (901) via duct (907) and passes the heated gas (908) into the high-pressure chamber (913).

The introduction of heated gas (908) into the high-pressure chamber (913) maintains the elevated temperature of the slurry (50) which thus continues to separate into solid and liquid components. Moreover, capturing the heat (902) from the initial slurry heating and then reusing the heated air from the same liquid extraction process further aides in reducing the total energy required to separate a unit quantity of oil sands. The pressure differential applied to the slurry product (50) has the associated advantageous effect of reducing the energy required to reduce the oil tar's viscosity sufficiently to become flowable.

The liquid component (52) is removed from the slurry (50) in the same way as the aforementioned liquid removal apparatus (100) via low pressure chamber (911) and is passed to a holding tank (909) via liquid outlet (910).

The outfeed end has an optional rotary sealing valve (914) similar to the valve (811) shown in FIG. 45. The product (51) collects in a sealing tank (915) which serves to further seal the outfeed end of the housing (906). Below the sealing tank (915) the product (51) is fed up a conveyor (916) that utilises an auger (917) to move the product (51) while helping to maintain the seal of the housing (906). The liquid removal apparatus (900) thus provides a sealed, heated, high-pressure housing (906, 913).

Figure 48:
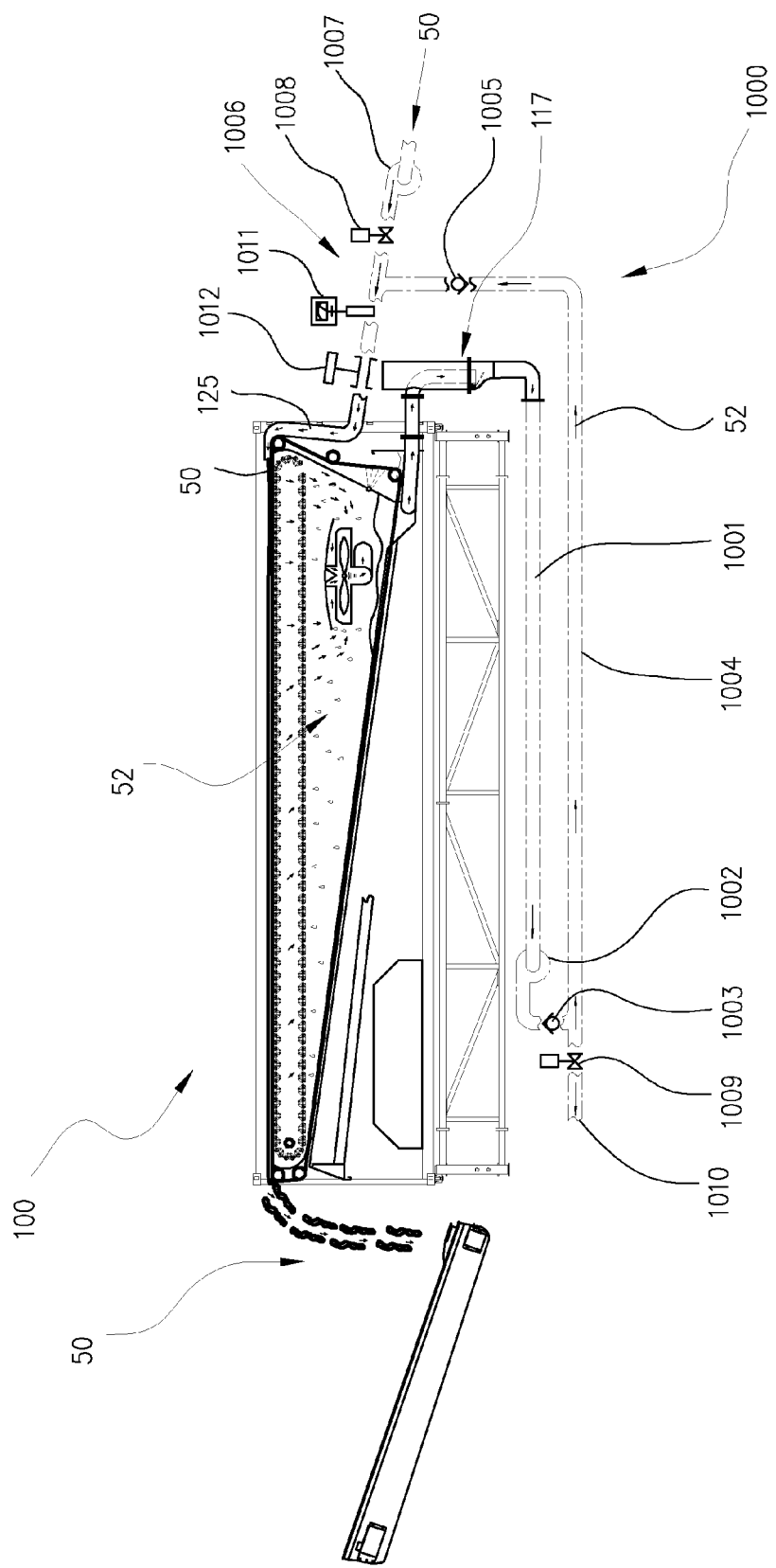
FIG. 48 is a schematic diagram of a filtrate recirculation system connected to the liquid removal system of FIGS. 8-13.
Figure 49:
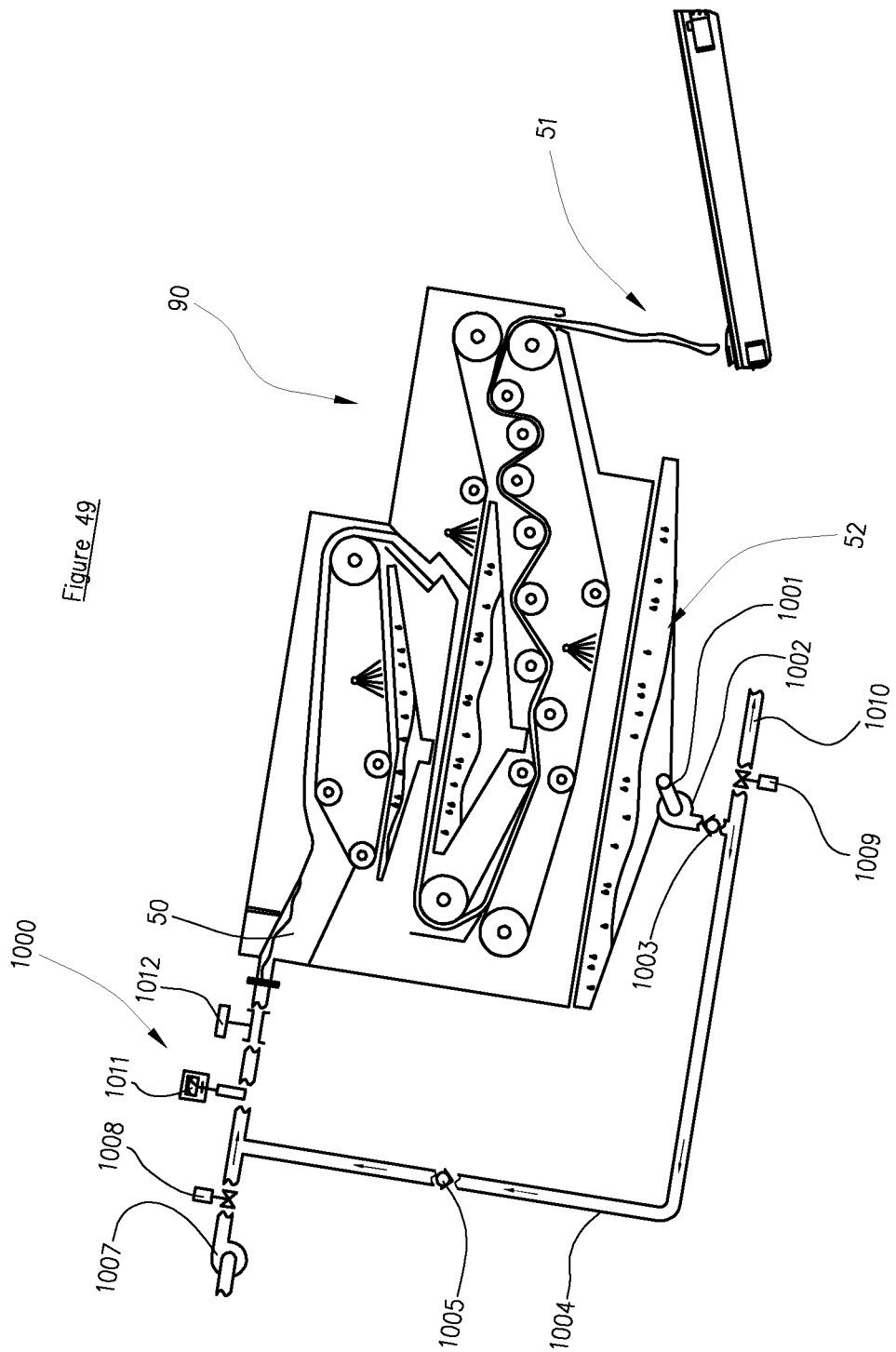
FIG. 49 is a schematic diagram of the filtrate recirculation system of FIG. 48 used with a belt press liquid removal system.

FIGS. 48 and 49 show a filtrate recirculation system (1000) according to one preferred embodiment of the present invention used with the aforementioned liquid removal apparatus (100) and liquid removal belt press (90) respectively. Prior art liquid separation apparatuses, presses and the like are generally configured to accommodate slurry with a solids percentage within a particular range. While reductions in the solids content do not pose significant difficulties, any unexpected increase in the solids percentage are far more difficult to accommodate. The ability to detect such fluctuations, adapt and continue liquid separation during such fluctuations offers clear commercial benefits. Instead of a necessity to interrupt or cease functioning until the solid input percentage is restored to an acceptable level, the present invention utilises a dynamic means of addressing the issue.

The recirculation system (1000) includes a recirculation conduit provided in the form of piping (1001) and recirculation pipe (1004). The piping (1001) extends from a liquid outlet (117) via recirculation pump (1002) and one-way valve (1003) for selectively blocking flow from pump (1002). The one-way valve (1003) is connected to recirculation pipe (1004) that extends back to the slurry inlet manifold (125) and includes another one-way valve (1005) for selectively blocking pipe (1004) to prevent addition of filtrate into the slurry infeed (1006). The slurry infeed (1006) includes a pump (1007) for pumping the slurry (50) into manifold (125) and a two-way valve (1008) for selectively blocking flow to and from the pump (1007).

A two-way valve (1009) is connected to recirculation pipe (1010) that can be opened in conjunction with closing valve (1005) to selectively cut the recirculation of filtrate (52) and pass the filtrate (52) out of pipe (1010) for other use. A solids level meter (1011) is provided to measure the solids content of the slurry passing through. A magnetic flow meter (1012) is provided to measure the flow-rate of slurry infeed. A controller (not shown) is connected to solids meter (1011), flow meter (1012) and each valve (1003, 1005, 1008, 1009) and regulates the slurry infeed depending on the feedback received from the flow meter (1012) and solids meter (1011).

In operation, the filtrate recirculation system (1000) uses the solids meter (1011) and flow meter (1012) to dynamically measure the solids content of the slurry infeed. The filtrate recirculation system (1000) re-circulates filtrate into the infeed slurry to maintain a consistent solid-to-liquid ratio entering liquid removal apparatus (100) or belt press (90) and thereby allows the liquid removal apparatus (100) or belt press (90) to operate at a generally consistent rate to produce a consistent product (51).

Figure 50:
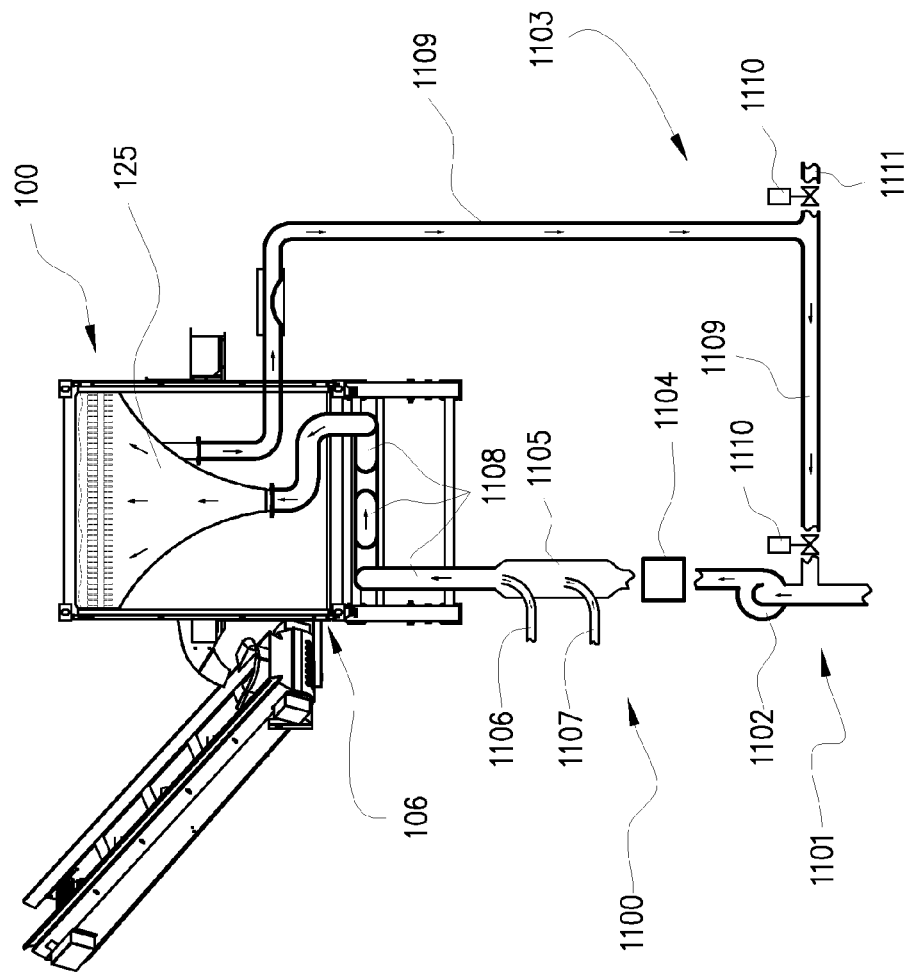
FIG. 50 is an end view of a slurry additive system according to another aspect of the present invention.
Figure 51:
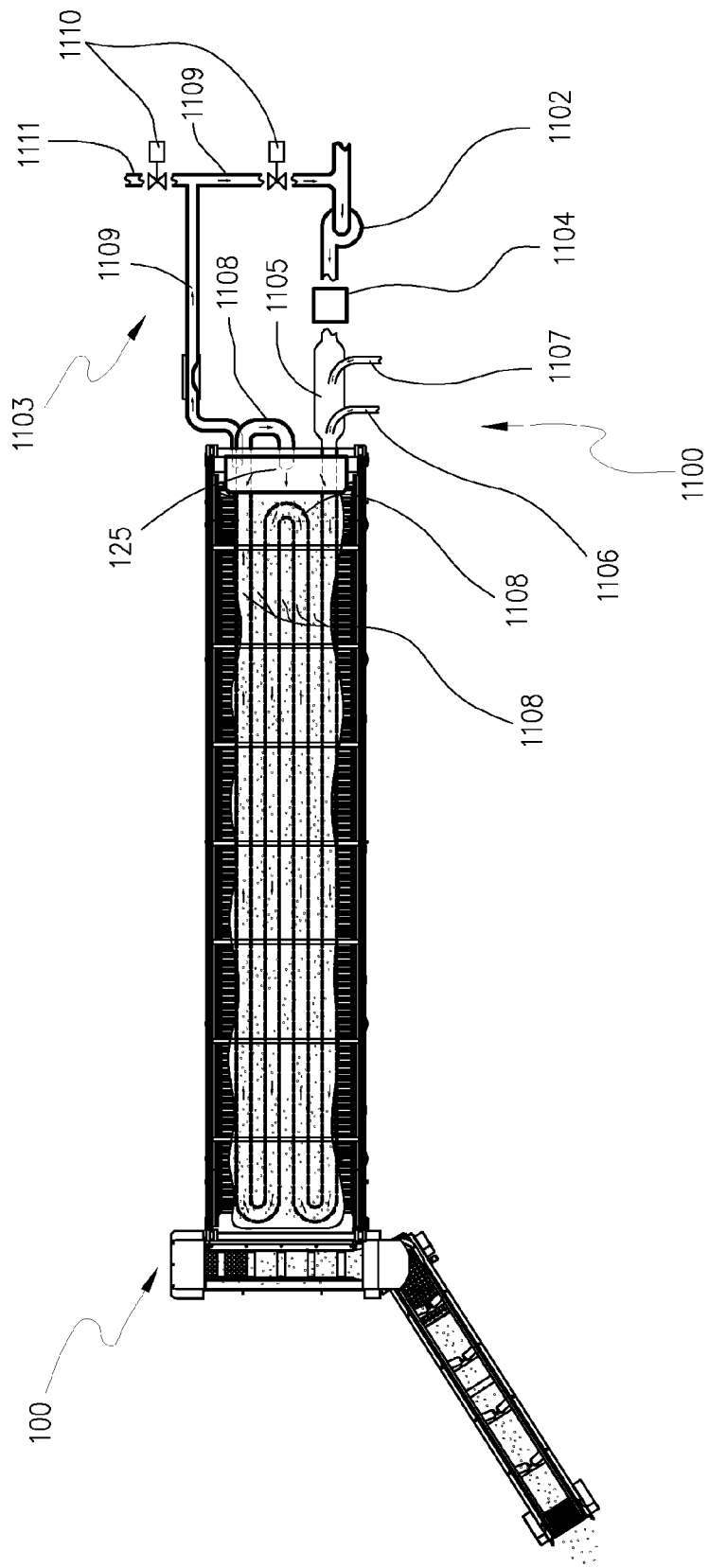
FIG. 51 is a plan view of a slurry additive system of FIG. 50.

FIGS. 50 and 51 show a slurry additive system (1100) connected to a liquid removal apparatus (100) for controlling introduction of an additive to the infeed slurry (50). The additive is typically a flocculant or other pre-conditioning additive. In liquid removal from wood-pulp an additive of PolyEthylene Oxide (PEO) or PolyEthelyne Glycol (PEG) is used along with air to react with the wood pulp to promote water release and flocculate the pulp particulate.

The slurry additive system (1100) is connected in line with a slurry infeed (1101) with pump (1102) and a recirculation system (1103). A flow meter and solid meter are included and are represented by box (1104). An additive injection chamber (1105) is provided between the slurry infeed (1101) and inlet manifold (125). The injection chamber (1105) has two infeeds, the first (1106) for air and the second (1107) for PEO, PEG or flocculant. The air infeed (1106) is needed for injecting air so that the PEO/PEG can react with the slurry but may be selectively closed when using types of flocculant that do not require air to function.

The pipe (1108) between additive chamber (1105) and manifold (125) passes underneath the housing (106) in a circuitous path to maximise the time the additive works in the slurry before reaching manifold (125) while still being within the volumetric footprint of the apparatus (100). The meters (1104) measure the flow-rate and solids content through the slurry infeed (1101) and a controller (not shown) accordingly regulates the quantity of additive and air through infeeds (1106, 1107 respectively).

The recirculation system (1103) has a recirculation pipe (1109) and two valves (1110) that control the direction of recirculation, i.e. to slurry infeed (1101) or out of the system via pipe (1111).

The slurry additive system (1100) thus provides a way for additives such as a flocculant or PEO to be added to the slurry to precondition the slurry without requiring a separate mixing tank. The liquid removal apparatus (100) thus has an enhanced functionality while still being highly portable. The slurry additive system (1100) can be used with all of the liquid apparatuses (1, 100, 200, 300, 700, 800, 900).

FIGS. 52a and 52b respectively show two possible embodiments of a transport deck (1150, 1160 respectively) of the present invention that may assist in liquid removal. The transport decks (1150, 1160) each incorporate the transport deck (105) shown in FIGS. 7-13 and in addition have a series of rollers (1151, 1161) that support a filter belt (102). The rollers (1151, 1161) may be passive or driven. As a pressure differential is applied between the first (102a) and second (102b) sides of the filter belt (102) the first side (102a) is drawn into contact with the rollers (1151, 1161) to form raised (1152, 1162) and lowered (1153, 1163) portions. The raised (1152, 1162) and lowered (1153, 1163) undulating portions respectively apply tension and compression to the slurry product (51', 51) on the filter belt (102) and thus respectively stretch and compress the slurry product (51', 51). The slurry product (51) is thus cracked when stretched on the raised portions (1152, 1162) to form cracks through which liquid in the slurry product (51') can flow. The slurry product (51) is compressed in the lowered portions (1153, 1163) and liquid is thus forced from the slurry product (51). The transport decks (1150, 1160) may thus provide further enhanced liquid removal than a comparable flat transport deck.

The transport deck (1150) in the embodiment shown in FIG. 52a locates the rollers (1161) above the transport deck (105) while the rollers of the transport deck (1160) shown in FIG. 52b are located between the outfeed end of the transport deck (105) and the low pressure chamber seal (124).

The rollers (1161) of the transport deck (1160) have longitudinal ridges (1164) that extend along the length of each roller (1161). Such ridges (1164) increase the curvature change undertaken by the filter belt passing over the ridge (1161), thus magnifying the stretching and cracking of the slurry product (51') on the raised portions (1162).

In another embodiment shown in FIG. 53, the rollers (1150, 1160) may be formed as rollers (1170s, 1170b) which have undulating enlarged (1172) and constricted (1171) portions configured to apply tension and compression to the slurry product (51) respectively.

It should be appreciated that the liquid removal apparatuses (1, 100, 200, 300, 700, 800, 900), feed conditioning systems (500, 520, 540, 560, 580), conditioners (600, 620), filtrate recirculation system (1000) and slurry additive system (1100) can be used singly or in selected combinations to achieve a number of different liquid removal configurations and the description herein should be read in the context that such components may be used interchangeably with each other to suit a particular liquid removal application. For example, in a soil remediation process according to one aspect of the invention, the liquid removal apparatus (100) may be used with the feed conditioning system (580) shown in FIG. 36. The contaminated soil may be mixed with a high volume of solvents, water or other carrier liquids and a flocculant. The soil slurry may then be passed through the feed conditioning system (580) to remove the bulk of the liquid and corresponding carried contaminants. The remainder of the contaminants can then be removed in the liquid filtrate It will also be appreciated that the materials used in the construction of the liquid removal apparatuses (1, 100, 200, 300, 700, 800, 900), feed conditioning systems (500, 520, 540, 560, 580), conditioners (600, 620), filtrate recirculation system (1000) and slurry additive system (1100) can be selected to suit the application. For example, in one embodiment liquid may need to be removed from a composite slurry having a corrosive component and/or which requires a corrosive additive to process. In such an embodiment, the materials used in the construction may be selected to be corrosion-resistant, e.g. fibre-glass, high-density plastics, carbon fibre or alternatively, metals treated with a corrosion-resistant protective coating.

Aspects of the present invention have been described by way of example only and it should be appreciated that modifications and additions may be made thereto without departing from the scope thereof.

What is claimed:

1. A liquid removal apparatus adapted to at least partially separate liquid from an infeed composite slurry of liquid and solids, the apparatus including:
    a movable, permeable membrane, hereinafter termed a 'filter belt', having a first side and an opposing second side, at least a portion, hereinafter termed the 'loaded belt portion', of said second side configured to receive said slurry;
    a permeable membrane support system configured to provide movable support for said loaded belt portion, said support system including;
        at least one transport deck located adjacent or in contact with at least part of said first side of the filter belt below the loaded belt portion;
    a housing configured to allow a pressure differential to be applied between the first and second sides of the filter belt, such that said first side is at a low pressure with respect to the second side; said housing including:
        at least one low-pressure chamber with a first aperture in sealing contact with said first side of the movable filter belt below the loaded belt portion,
    a pressure conditioning system for applying said differential pressure via the housing to generate a lower pressure on said first side of the filter belt than the second side;
    wherein the at least one transport deck is entirely located within said low pressure chamber and includes:
        at least one continuous flexible drive member, and
        at least one deflector for shielding a lower portion of said flexible drive member from the slurry and/or separated liquid, said deflector being located underneath the filter belt.

2. A liquid removal apparatus as claimed in claim 1, wherein the pressure conditioning apparatus further includes a high-pressure chamber configured to allow an elevated pressure with respect to the first side of the filter belt to be applied to the second side of the filter belt.

3. A liquid removal apparatus as claimed in claim 1, wherein the transport deck includes:
    at least two of said flexible drive members;
    a plurality of transverse support beams.

4. A liquid removal apparatus as claimed in claim 3, wherein said flexible drive members are formed as a pair of endless roller chains constrained in parallel orbits by two or more rollers, with said plurality of transverse support beams attached therebetween and rotatable about said constrained orbit by at least one driven roller provided with a drive sprocket.

5. A liquid removal apparatus as claimed in claim 4, wherein an upper-most run of the support beam and roller chain assembly runs in a plane directly across the first aperture in the low pressure chamber.

6. A liquid removal apparatus as claimed in claim 3, further including one of more supplementary layers interposed between the filter belt and support beams.

7. A liquid removal apparatus as claimed in claim 1, wherein the filter belt travels in a continuous endless loop with a substantially planar upper run-portion providing said loaded belt portion for receiving the slurry.

8. A liquid removal apparatus as claimed in claim 1, wherein a gas outlet to the low-pressure chamber is positioned above a liquid outlet and said liquid outlet is releasably sealed by a pressure relief valve exhausting to atmosphere and wherein a head of liquid filtrate required to open the relief valve is directly proportional to a closure force of a resiliently biased valve member sealing said pressure relief valve.

9. A liquid removal apparatus as claimed in claim 1, wherein said liquid removal apparatus housing includes a low-pressure chamber with two or more compartments located between an infeed point of said slurry onto said loaded belt portion and a discharge point, each compartment configured to collect liquid filtrate beneath a predetermined portion of the loaded belt portion, wherein collected liquid filtrate from at least one compartment is re-applied to a further predetermined portion of the loaded belt portion closer to said discharge point.

10. A liquid removal apparatus as claimed in claim 9, wherein liquid filtrate collected in one said compartment is re-applied to a further predetermined portion of the loaded belt portion corresponding to another said compartment closer to said discharge point.

11. A liquid removal apparatus as claimed in claim 1, further including one or more liquid absorption vacuum rollers.

12. A liquid removal apparatus as claimed in claim 11, wherein a said vacuum roller is configured as a cylindrical roller with an inner vacuum chamber and a rotatable outer surface provided with a liquid-absorbent material sleeve, said inner vacuum chamber being in communication with at least a portion of said absorbent sleeve.

13. A liquid removal apparatus as claimed in claim 1, adapted to at least partially separate liquid from an infeed composite slurry of liquid and solids, the apparatus including:
   a permeable membrane having a first side and an opposing second side;
   a housing configured to allow a pressure differential to be applied between the first and second sides of the permeable membrane, such that said first side is at a low pressure with respect to the second side; said housing including:
      at least one low-pressure chamber with a first aperture in sealing contact with said first side of the movable permeable membrane;
   a pressure conditioning system for applying said differential pressure via the housing to generate a lower pressure on the first permeable membrane side than the second permeable membrane side;
   further including a feed conditioning system configured to manipulate the slurry infeed onto said filter belt, said feed conditioning system including an infeed distribution manifold configured to laterally distribute the infeed slurry across the filter belt;
   wherein the infeed distribution manifold is used in combination with one or more of:
      a surface wiper, positioned adjacent an outlet of the infeed distribution manifold, configured to apply an at least partially compressive, frictional force onto an upper surface of slurry solids exiting the outlet;
      a rigid cake former, positioned adjacent the distribution manifold outlet and configured to at least partially compress and extrude slurry solids exiting the manifold outlet into a particulate product cake;
      a vacuum former;
      an attenuated atmospheric pressure slurry former;
      flow rate control, configured to controllably attenuate the flow of slurry onto the permeable membrane from the manifold.

14. A liquid removal apparatus as claimed in claim 1, further including at least one belt manipulation roller, positioned beneath, and in intimate contact with, the first side of the filter belt, wherein movement of the filter belt across the at least one belt manipulation roller causes the slurry to traverse an undulating path generating compression and tension within the slurry.

15. A liquid removal apparatus as claimed in claim 3, including at least four deflectors, formed from:
   two upper deflectors shielding corresponding upper portions of said flexible drive members, and
   two lower deflectors shielding corresponding lower portions of said flexible drive.

* * * * *